United States Patent
Ahamed et al.

(10) Patent No.: US 11,377,558 B2
(45) Date of Patent: Jul. 5, 2022

(54) STRETCHABLE, DEGRADABLE AND SELF-HEALING POLYMERS THROUGH A COMBINATION OF IMINE BONDS AND METAL COORDINATION

(71) Applicant: University of Windsor, Windsor (CA)

(72) Inventors: Mohammed Jalal Ahamed, Windsor (CA); Simon Rondeau-Gagne, LaSalle (CA); Julia Pignanelli, LaSalle (CA)

(73) Assignee: University of Windsor, Windsor (CA)

( * ) Notice: Subject to any disclaimer, the term of this patent is extended or adjusted under 35 U.S.C. 154(b) by 1 day.

(21) Appl. No.: 17/005,845

(22) Filed: Aug. 28, 2020

(65) Prior Publication Data

US 2021/0061958 A1 Mar. 4, 2021

Related U.S. Application Data

(60) Provisional application No. 62/894,036, filed on Aug. 30, 2019.

(51) Int. Cl.
| | |
|---|---|
| C08L 83/08 | (2006.01) |
| C08K 3/11 | (2018.01) |
| C08G 77/388 | (2006.01) |
| C08J 3/24 | (2006.01) |
| C08G 77/26 | (2006.01) |
| C08G 18/83 | (2006.01) |
| C08G 69/48 | (2006.01) |
| C08F 8/30 | (2006.01) |

(52) U.S. Cl.
CPC ............ *C08L 83/08* (2013.01); *C08G 77/388* (2013.01); *C08J 3/24* (2013.01); *C08K 3/11* (2018.01); *C08F 8/30* (2013.01); *C08G 18/833* (2013.01); *C08G 69/48* (2013.01); *C08G 77/26* (2013.01)

(58) Field of Classification Search
CPC combination set(s) only.
See application file for complete search history.

(56) References Cited

U.S. PATENT DOCUMENTS

| | | | |
|---|---|---|---|
| 2017/0331057 A1* | 11/2017 | Chung | H01L 51/0036 |
| 2020/0308407 A1* | 10/2020 | Liang | C08J 7/08 |
| 2021/0040268 A1* | 2/2021 | Li | C08G 77/395 |

FOREIGN PATENT DOCUMENTS

WO WO 2019/169670 * 12/2019

OTHER PUBLICATIONS

"Stretchable Self-Healing Polymer Dielectrics Cross-linked Through Metal-Ligand Coordination" authored by Rao et al. and published in JACS (2016) 138, 6020-6027.*
"Distinct Mechanical and SelfHealing Properties in Two Polydimethylsilxoane Coordination Polymers with Fine-tuned Bond Strength" authored by Wang et al. and published in Inorg Chem (2018) 57, 3232-3242.*
"Self-Healable Dielectric Polydimethylsiloxane Composite Based on Zinc-imidazole Coordination Bond" authored by Oh et al. and published in Macromol. Res. (2019) 27(5), 435-443.*
B. Grzybowski, D. Qin, R. Haag and G. M. Whitesides, Sensors Actuators B. Chem., 2000, 81-85.
J. Pignanelli, K. Schlingman, T. B. Carmichael, S. Rondeau-Gagné and M. J. Ahamed, Sensors Actuators A. Phys., 2019, 285, 427-436.
D. F. Evans, J. Chem. Soc., 1959, 2003-2005.
B. Weber and F. A. Walker, Inorg. Chem., 2007, 46, 6794-6803.
L. Zheng, X. Fang, K. Lil, H. Song, X. Xin, H.-K. Fun, K. Chinnakali and I. Abdul Razak, J. Chem. Soc., Dalt. Trans., Mar. 1999, 2311-2316.
C. E. Diesendruck, N. R. Sottos, J. S. Moore and S. R. White, Angew. Chem. Int. Ed., 2015, 54, 2-22.
B. M. D. Hager, P. Greil, C. Leyens, S. Van Der Zwaag and U. S. Schubert, Adv. Mater., 2010, 5424-5430.
D. Y. Wu, S. Meure and D. Solomon, Prog. Polym. Sci., 2008, 33, 479-522.
R. P. Wool, Soft Matter, Apr. 2008, 400.
Y. Zhao, W. Zhang, L. P. Liao, H. M. Wang and W. J. Li, Phys. Procedia, 2011, 18, 216-221.
A. B. W. Brochu, S. L. Craig and W. M. Reichert, J. Biomed. Mater. Res.—Part A, 2011, 96, 492-506.
K. Imato, M. Nishihara, T. Kanehara, Y. Amamoto, A. Takahara and H. Otsuka, Angew. Chem. Int. Ed., 2012, 51, 1138-1142.
T. F. O'Connor, K. M. Rajan, A. D. Printz and D. J. Lipomi, J. Mater. Chem. B, Mar. 2015, 4947-4952.
Y. Yang and M. W. Urban, Chem. Soc. Rev., 2013, 42, 7446-67.
S. R. White, N. R. Sottos, P. H. Geubelle, J. S. Moore, M. R. Kessler, S. R. Sriram, E. N. Brown and S. Viswanathan, Nature, 2001, 409, 794-797.
J. Yang, M. W. Keller, J. S. Moore, S. R. White, N. R. Sottos, J. Yang, M. W. Keller, J. S. Moore, S. R. White and N. R. Sottos, Macromolecules, 2008, 41, 9650-9655.
F. Herbst, D. Döhler, P. Michael and W. H. Binder, Macromol. Rapid Commun., 2013, 34, 203-220.
Y. Heo, M. H. Malakooti and H. A. Sodano, J. Mater. Chem. A, Apr. 2016, 17403-17411.
D. Habault, H. Zhang and Y. Zhao, Chem. Soc. Rev., 2013, 42, 7244-7256.
A. Nasresfahani and P. M. Zelisko, Polym. Chem., Aug. 2017, 2942-2952.
A. Chao, I. Negulescu and D. Zhang, Macromolecules, 2016, 49, 6277-6284.

(Continued)

*Primary Examiner* — Marc S Zimmer
(74) *Attorney, Agent, or Firm* — Stites & Harbison, PLLC; David W. Nagle, Jr.

(57) ABSTRACT

In a preferred embodiment, there is provided a self-healing polymer composition preferably for use in manufacturing a dielectric layer of a capacitive pressure sensor, and which comprises a central atom and a polymer having a main chain and one or more terminal moieties coupled to the main chain, wherein said one or more terminal moieties are selected to operate as ligands to form a coordination complex with the central atom, and preferably, the ligands and the central atom are selected to form the coordination complex after being subject to an external force sufficient to remove coordinate covalent bonds therebetween.

22 Claims, 28 Drawing Sheets

(56) References Cited

OTHER PUBLICATIONS

Z. Tang, J. Huang, B. Guo, L. Zhang and F. Liu, Macromolecules, 2016, 49, 1781-1789.
N. Holten-Andersen, A. Jaishankar, M. J. Harrington, D. E. Fullenkamp, G. Dimarco, L. He, G. H. McKinley, P. B. Messersmith and K. Y. C. Lee, J. Mater. Chem. B, Feb. 2014, 2467.
J.-C. Lai, X.-Y. Jia, D.-P. Wang, Y.-B. Deng, P. Zheng, C.-H. Li, J.-L. Zuo and Z. Bao, Nat. Commun., 2019, 1164-1173.
Y. Chen, A. M. Kushner, G. A. Williams and Z. Guan, Nat. Chem., Apr. 2012, 467-472.
C. Wang, N. Liu, R. Allen, J. B. H. Tok, Y. Wu, F. Zhang, Y. Chen and Z. Bao, Adv. Mater., 2013, 25, 5785-5790.
M. Pepels, I. Filot, B. Klumperman and H. Goossens, Polym. Chem., Apr. 2013, 4955.
J. Liu, C. S. Y. Tan, Z. Yu, N. Li, C. Abell and O. A. Scherman, Adv. Mater., 2017, 29, 1605325.
G. Cai, J. Wang, K. Qian, J. Chen, S. Li and P. S. Lee, Adv. Sci., Apr. 2017, 1600190.
X. Liu, C. Lu, X. Wu and X. Zhang, J. Mater. Chem. A, May 2017, 9824-9832.
W. Huang, K. Besar, Y. Zhang, S. Yang, G. Wiedman, Y. Liu, W. Guo, J. Song, K. Hemker, K. Hristova, I. J. Kymissis and H. E. Katz, Adv. Funct. Mater., 2015, 25, 3745-3755.
Y. J. Tan, J. Wu, H. Li and B. C. K. Tee, ACS Appl. Mater. Interfaces, Oct. 2018, 15331-15345.
S. Zhang and F. Cicoira, Adv. Mater., 2017, 29, 1703098.
E. T. Thostenson and T. W. Chou, Adv. Mater., 2006, 18, 2837-2841.
M. U. Ocheje, M. Selivanova, S. Zhang, T. H. Van Nguyen, B. P. Charron, C.-H. Chuang, Y.-H. Cheng, B. Billet, S. Noori, Y.-C. Chiu, X. Gu and S. Rondeau-Gagné, Polym. Chem., Sep. 2018, 5531.
J. Y. Oh, S. Rondeau-Gagné, Y.-C. Chiu, A. Chortos, F. Lissel, G.-J. N. Wang, B. C., Schroeder, T. Kurosawa, J. Lopez, T. Katsumata, J. Xu, C. Zhu, X. Gu, W.-G. Bae, Y. Kim, L. Jin, J. W. Chung, J. B.-H. Tok and Z. Bao, Nature, 2016, 539, 411-415.
J. Ko, Y. J. Kim and Y. S. Kim, ACS Appl. Mater. Interfaces, Aug. 2016, 23854-23861.
Y. L. Rao, A. Chortos, R. Pfattner, F. Lissel, Y. C. Chiu, V. Feig, J. Xu, T. Kurosawa, X. Gu, C. Wang, M. He, J. W. Chung and Z. Bao, J. Am. Chem. Soc., 2016, 138, 6020-6027.
W. H. Binder, Macromol. Rapid Commun., 2019, 40, 1-7.
T. P. Haider, C. Völker, J. Kramm, K. Landfester and F. R. Wurm, Angew. Chem. Int. Ed., 2019, 58, 50-62.
W. Jacob and R. Mukherjee, Inorganica Chim. Acta, 2006, 359, 4565-4573.
P. Mal, D. Schultz, K. Beyeh, K. Rissanen and J. R. Nitschke, Angew. Chem. Int. Ed., 2008, 47, 8297-8301.
A. Rajput and R. Mukherjee, Coord. Chem. Rev., 2013, 257, 350-368.
C.-H. Li, C. Wang, C. Keplinger, J.-L. Zuo, L. Jin, Y. Sun, P. Zheng, Y. Cao, F. Lissel, C. Linder, X.-Z. You and Z. Bao, Nat. Chem., Aug. 2016, 618-624.
Z. H. Williams, E. D. Burwell, A. E. Chiomento, K. J. Demsko, J. T. Pawlik, S. O. Harris, M. R. Yarolimek, M. B. Whitney, M. Hambourger and A. D. Schwab, Soft Matter, 2017, 13, 6542-6554.
F. García, J. Pelss, H. Zuilhof and M. M. J. Smulders, Chem. Commun., 2016, 52, 9059-9062.
C. D. Meyer, C. S. Joiner and J. F. Stoddart, Chem. Soc. Rev., 2007, 36, 1705-1723.
E. C. Constable, G. Baum, E. Bill, R. Dyson, R. Van Eldik, D. Fenske, S. Kaderli, D. Morris, A. Neubrand, M. Neuburger, D. R. Smith, K. Wieghardt, M. Zehnder and A. D. Zuberbühler, Chem. Eur. J., May 1999, 498-508.
J. Wang, B. Djukic, J. Cao, A. Alberola, F. S. Razavi and M. Pilkington, Inorg. Chem., 2007, 46, 8560-8568.
B. Sandmann, B. Happ, S. Kupfer, F. H. Schacher, M. D. Hager and U. S. Schubert, Macromol. Rapid Common., 2014, 36, 604-609.
D. Mozhdehi, S. Ayala, O. R. Cromwell, Z. Guan, D. Mozhdehi, S. Ayala, O. R. Cromwell and Z. Guan, J. Am. Chem. Soc., 2014, 136, 16128-16131.
M. Ciaccia, R. Cacciapaglia, P. Mencarelli, L. Mandolini and S. Di Stefano, Chem. Sci., Apr. 2013, 2253-2261.
P. Kovaříček and J. M. Lehn, J. Am. Chem. Soc., 2012, 134, 9446-9455.
M. Zeng, L. Li and S. B. Herzon, J. Am. Chem. Soc., 2014, 136, 7058-7067.
P. B. Shah, S. Bandopadhyay and J. R. Bellare, Polym. Degrad. Stab., 1995, 47, 165-173.
M. Irimia-Vladu, E. D. Głowacki, G. Voss, S. Bauer and N. S. Sariciftci, Mater. Today, 2012, 15, 340-346.
C. M. Boutry, A. Nguyen, Q. O. Lawal, A. Chortos, S. Rondeau-Gagné and Z. Bao, Adv. Mater., 2015, 27, 6954-6961.
T. Lei, M. Guan, J. Liu, H.-C. Lin, R. Pfattner, L. Shaw, A. F. McGuire, T.-C. Huang, L. Shao, K.-T. Cheng, J. B.-H. Tok and Z. Bao, Proc. Natl. Acad Sci., 2017, 114, 5107-5112.
T. Lei, X. Chen, G. Pitner, H. S. P. Wong and Z. Bao, J. Am. Chem. Soc., 2016, 138, 802-805.
C. Edwards and R. Marks, Clin. Dermatol., 1995, 13, 375-380.
Z. Lei, Q. Wang, S. Sun, W. Zhu and P. Wu, Adv. Mater., 2017, 29, 1700321.
H. Kim, G. Kim, T. Kim, S. Lee, D. Kang, M. S. Hwang, Y. Chae, S. Kang, H. Lee, H. G. Park and W. Shim, Small, 2018, 14, 1-10.
A. Chhetry, H. Yoon and J. Y. Park, J. Mater. Chem. C, May 2017, 10068-10076.
X. Liang, T. Zhao, D. Zhu, F. Han, J. Li, G. Zhang, L. Ling, R. Sun, D. Ho, S. Zhao, C.-P. Wong and F. Liu, Chem. Eur. J., 2018, 24, 16823-16832.
J. Pignanelli, B. Billet, M. Straeten, M. Prado, K. Schlingman, S. Rondeau-Gagné and M. J. Ahamed, Imine and Metal-Ligand Dynamic Bonds in Soft Polymers for Autonomous Self-Healing Capacitive-Based Pressure Sensors, Soft Matter, 2019, 15, 7654-7662.
J. Pignanelli, Z. Qian, X. Gu, M. J. Ahamed and S. Rondeau-Gagné, Modulating the thermomechanical properties and self-healing efficiency of siloxane-based soft polymers through metal-ligand coordination, New J. Chem., 2020, 44, 8977-8985.
Y. Wang, J. He, S. Aktas, S. A. Sukhishvili and D. M. Kalyon, Rheological behavior and self-healing of hydrogen-bonded complexes of a triblock Pluronics copolymer with a weak polyacid, J. Rheol., 2017, 61, 1103-1119.
Y. Yang and M. W. Urban, Self-healing polymeric materials, Chem. Soc. Rev., 2013, 42, 7446-7467.
T. Aida, E. W. Meijer and S. I. Stupp, Functional Supramolecular Polymers, Science, 2012, 335, 813-817.
S. J. Benight, C. Wang, J. B. H. Tok and Z. Bao, Stretchable and self-healing polymers and devices for electronic skin, Prog. Polym. Sci., 2013, 38, 1961-1977.
Q. Hua, J. Sun, H. Liu, R. Bao, R. Yu, J. Zhai, C. Pan and Z. L. Wang, Skin-inspired highly stretchable and conformable matrix networks for multifunctional sensing, Nat. Commun., Sep. 1-11, 2018.
I. L. Hia, V. Vahedi and P. Pasbakhsh, Self-Healing Polymer Composites: Prospects, Challenges, and Applications, Polym. Rev., 2016, 56, 225-261.
J. A. Syrett, C. R. Becer and D. M. Haddleton, Self-healing and self-mendable polymers, Polym. Chem., Jan. 2010, 978-987.
H. Ying, Y. Zhang and J. Cheng, Dynamic urea bond for the design of reversible and self-healing polymers, Nat. Commun., May 1-9, 2014.
Y. Yang, X. Ding and M. W. Urban, Chemical and physical aspects of self-healing materials, Prog. Polym. Sci., 2015, 49-50, 34-59.
S. M. Kim, H. Jeon, S. H. Shin, S. A. Park, J. Jegal, S. Y. Hwang, D. X. Oh and J. Park, Superior Toughness and Fast Self-Healing at Room Temperature Engineered by Transparent Elastomers, Adv. Mater., 2018, 30, 1-8.
Z. Xu, Mechanics of metal-catecholate complexes: The roles of coordination state and metal types, Sci. Rep., Mar. 7-9, 2013.
J. Zhao, R. Xu, G. Luo, J. Wu and H. Xia, Self-healing poly(siloxane-urethane) elastomers with remoldability, shape memory and biocompatibility, Polym. Chem., Jul. 2016, 7278-7286.

(56) References Cited

OTHER PUBLICATIONS

B. S. Cash, J. J. Kubo, T. Bapat and A. P. Sumerlin, Room-Temperature Self-Healing Polymers Based on Dynamic-Covalent Boronic Esters, Macromolecules, 2015, 2098.
Y. L. Liu and T. W. Chuo, Self-healing polymers based on thermally reversible Diels-Alder chemistry, Polym. Chem., Apr. 2013, 2194-2205.
R. Hoogenboom, Hard autonomous self-healing supramolecular materials—A contradiction in terms?, Angew. Chem., Int. Ed., 2012, 51, 11942-11944.
D. Y. Zhu, M. Z. Rong and M. Q. Zhang, Self-healing polymeric materials based on microencapsulated healing agents: From design to preparation, Prog. Polym. Sci., 2015, 49-50, 175-220.
J. A. Syrett, G. Mantovani, W. R. S. Barton, D. Price and D. M. Haddleton, Self-healing polymers prepared via living radical polymerisation, Polym. Chem., Jan. 2010, 102-106.
Y. L. Rao, V. Feig, X. Gu, G. J. Nathan Wang and Z. Bao, The effects of counter anions on the dynamic mechanical response in polymer networks crosslinked by metal-ligand coordination, J. Polym. Sci., Part A: Polym. Chem., 2017, 55, 3110-3116.
S. Bode, M. Enke, R. K. Bose, F. H. Schacher, S. J. Garcia, S. Van Der Zwaag, M. D. Hager and U. S. Schubert, Correlation between scratch healing and rheological behavior for terpyridine complex based metallopolymers, J. Mater. Chem. A, Mar. 2015, 22145-22153.
J. M. Sirrine, S. A. Schexnayder, J. M. Dennis and T. E. Long, Urea as a monomer for isocyanate-free synthesis of segmented poly(dimethyl siloxane) polyureas, Polymer, 2018, 154, 225-232.
D. D. Zhang, Y. B. Ruan, B. Q. Zhang, X. Qiao, G. Deng, Y. Chen and C. Y. Liu, A self-healing PDMS elastomer based on acylhydrazone groups and the role of hydrogen bonds, Polymer, 2017, 120, 189-196.
B. Zhang, P. Zhang, H. Zhang, C. Yan, Z. Zheng, B. Wu and Y. Yu, A Transparent, Highly Stretchable, Autonomous Self-Healing Poly(dimethyl siloxane) Elastomer, Macromol. Rapid Commun., 2017, 38, 1-9.
L. Liu, S. Liang, Y. Huang, C. Hu and J. Yang, A stretchable polysiloxane elastomer with self-healing capacity at room temperature and solvatochromic properties, Chem Commun., 2017, 53, 12088-12091.
H. Liu, H. Zhang, H. Wang, X. Huang, G. Huang and J. Wu, Weldable, malleable and programmable epoxy vitrimers with high mechanical properties and water insensitivity, Chem. Eng. J., 2019, 368, 61-70.
R. K. Pan, J. L. Song, G. B. Li, S. Q. Lin, S. G. Liu and G. Z. Yang, Copper(II), cobalt(II) and zinc(II) complexes based on a tridentate bis(benzimidazole)pyridine ligand: synthesis, crystal structures, electrochemical properties and antitumour activities, Transition Met. Chem., 2017, 42, 253-262.
K. Yamaguchi, S. Kume, K. Namiki, M. Murata, N. Tamai and H. Nishihara, UV-Vis, NMR, and time-resolved spectroscopy analysis of photoisomerization behavior of three- and sixazobenzene-bound tris(bipyridine)cobalt complexes, Inorg. Chem., 2005, 44, 9056-9067.
D. E. Przybyla and J. Chmielewski, Metal-triggered collagen peptide disk formation, J.Am. Chem. Soc., 2010, 132, 7866-7867.
A. F. Wells, Structural Inorganic Chemistry, Clarendon Press, Oxford, 5th edn, 1984, p. 1288.
R. D. Shannon, Revised Effective Ionic Radii and Systematic Studies of Interatomie Distances in Halides and Chalcogenides, Acta Crystallogr., 1976, A32, 751-767.
J. Cui, F. M. Nie, J. X. Yang, L. Pan, Z. Ma and Y. S. Li, Novel imidazolium-based poly(ionic liquid)s with different counterions for self-healing, J. Mater. Chem. A, May 2017, 25220-25229.
M. L. Tong and X. M. Chen, Synthesis of Coordination Compounds and Coordination Polymers, Synthesis of Coordination Compounds and Coordination Polymers, Elsevier B.V., 2017.

* cited by examiner

STRETCHABLE, DEGRADABLE AND SELF-HEALING POLYMERS THROUGH A COMBINATION OF IMINE BONDS AND METAL COORDINATION

RELATED APPLICATIONS

This application claims the benefit under 35 USC 119(e) to U.S. Provisional Application Ser. No. 62/894,036 filed Aug. 30, 2019, the entire contents of which are incorporated herein by reference.

FIELD OF THE INVENTION

This invention relates to a self-healing polymer and a process for preparing a self-healing polymer, and which preferably includes providing a pre-polymer with a terminal imine moiety and forming a metal coordination complex with the pre-polymer and a transition metal.

BACKGROUND OF THE INVENTION

Self-healing is an interesting property, inspired from the natural healing in living organisms, that can be synthetically enabled in a wide variety of materials. Best described as the ability of a specific material to regenerate itself upon damage (mechanical, thermal or chemical), self-healing can occur through different strategies/mechanisms and with/without the need for an external trigger. Self-healing has shown important promise for enhancing the durability and robustness of materials for various applications including healthcare, structural and biomedical engineering, advanced manufacturing and electronics. Therefore, research in self-healing materials has significantly intensified in the last decade with the design and preparation of a wide variety of new materials capable of regenerating themselves upon damage.

In recent years, a wide variety of strategies have been designed and used to enable self-healing in materials. Among others, the use of healing agents uniformly dispersed in an elastomeric matrix is one of the most common and efficient method to trigger self-healing upon mechanical stress. Another promising strategy relies on the rational design of self-healing materials through the use of chemical bonds capable of fission/recombination upon damage. This strategy, based on the dynamic crosslinking of polymers, has the advantage of being intrinsic, i.e. no external agent required for the regeneration. However, depending on the chemistry used, an external trigger (photoirradiation, thermal annealing, solvent annealing, etc.) can be necessary. For example, to point out only a few, the use of dynamic imine bonds, metal coordination with ligand moieties, hydrogen bonds, and disulfide bonds have been shown to lead to an efficient self-healing. In the field of electronics, the application of self-healing materials through dynamic bonds has led to the fabrication of multiple devices, including pressure sensors, strain sensors, and thin-film transistors. A variety of self-healable conductors, semiconductors, and dielectrics materials have also been developed to access self-healing electronics.

However, despite the promises of self-healing materials, their large-scale use and application is still challenging. First, the need for an external trigger to enable the self-healing can limit the application of the materials and can be a significant drawback. Moreover, with the current environmental crisis created by non-degradable plastics, the application of materials that can regenerate themselves and be more robust might not help to reduce the environmental burden. Finally, the large-scale preparation of the materials can be costly, especially when expensive reactant or healing agents are required. Therefore, the development of inexpensive, degradable and autonomous self-healing materials is critical.

SUMMARY OF THE INVENTION

A possible non-limiting object of the present invention is to provide a self-healing polymer composition, which may permit self-healing without necessarily requiring an external stimulus, and to significantly retain or recover an original structure.

Another possible non-limiting object of the present invention is to provide a self-healing polymer composition, which may permit a modulated stretchability depending on one or more parameters or conditions in the preparation or components of the composition, and which may permit preparation without necessarily requiring an expensive catalyst or significantly high energy or cost requirements.

Another possible non-limiting object of the present invention is to provide a self-healing polymer composition, which may permit more ready application in the manufacture of, for example, a flexible pressure sensor or more specifically, a dielectric to be included in a flexible pressure sensor, and more ready degradation for easier disposal.

In one aspect, the present invention provides a self-healing polymer composition comprising a central atom and a polymer having a main chain or backbone chain and one or more terminal moieties coupled to the main chain, wherein said one or more terminal moieties are selected to operate as ligands to form a coordination complex with the central atom, and preferably, the ligands and the central atom are selected to form the coordination complex after being subject to an external force sufficient to remove coordinate covalent bonds therebetween.

In another aspect, the present invention provides a polymer composition comprising a central atom or ion and a polymer having a main chain and one or more terminal moieties coupled to the main chain, wherein said one or more terminal moieties are selected to operate as ligands to form a coordination complex with the central atom or ion, each said terminal moiety having structural formula (II):

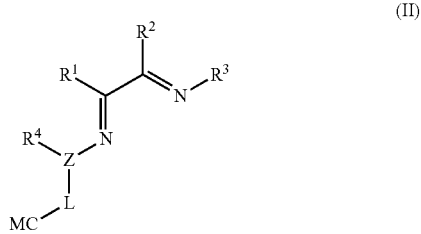

wherein MC is the main chain, L is a bond or a linker, Z is nothing, a carbon atom or a nitrogen atom, and $R^1$ to $R^4$ are independently of each other hydrogen, halo, hydroxyl, amino, alkoxy, alkyl, alkenyl, alkynyl, cycloalkyl, heterocycloalkyl, aryl, aralkyl, heteroaryl, heteroaralkyl, carbonyl, carboxyl or cyano, each of which is optionally substituted, wherein $R^1$ and $R^2$, together with the carbon atoms bonded thereto, $R^2$ and $R^3$, together with the carbon atom and the nitrogen atom bonded thereto, and/or $R^1$ and $R^4$, together with the carbon atom and the nitrogen atom bonded thereto, may form unsubstituted or substituted cycloalkyl, heterocycloalkyl, aryl or heteroaryl.

In yet another aspect, the present invention provides use of the polymer for forming a self-healing polymer composition.

In yet another aspect, the present invention provides use of a polymer for forming a self-healing polymer composition having the polymer and a central atom or ion, the polymer having a main chain and a plurality of terminal moieties coupled to the main chain, wherein said terminal moieties are selected to operate as ligands to form a coordination complex with the central atom or ion, each said terminal moiety having one of the following structural formulas:

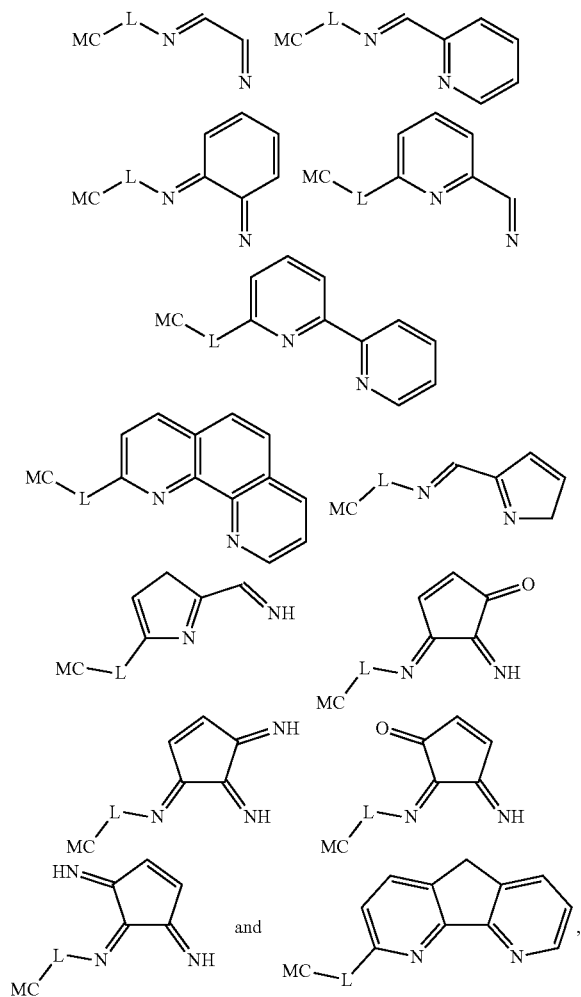

wherein MC is the main chain, L is a bond or a linker selected from the group consisting of methylene, ethylene, n-propylene, isopropylene and butylene, and one or more of the carbon atoms and the nitrogen atoms in the structural formulas are optionally substituted.

It is to be appreciated that the central atom is not strictly limited, provided that the central atom is operable to form the coordination complex with the terminal moieties. In one embodiment, the central atom comprises a transition metal having an oxidation state between 0 and 7, inclusive. In one embodiment, the transition metal is a transition metal ion having an oxidation state of +2 or +3, or preferably, +2. In one embodiment, the transition metal is selected to form an octahedral coordination complex. In one embodiment, the transition metal is selected from the group consisting of $Ru^{2+}$, $Ru^{3+}$, $Cr^{2+}$, $Cr^{3+}$, $Rh^{3+}$, $Rh^{2+}$, Al, Si, $Mn^{2+}$, $Fe^{2+}$, $Fe^{3+}$, $Co^{2+}$, $Co^{3+}$, $Ni^{2+}$, $Cu^{1+}$, $Cu^{2+}$ and $Zn^{2+}$, or preferably, the transition metal is one or more of $Mn^{2+}$, $Fe^{2+}$, $Fe^{3+}$, $C^{2+}$, $Co^{3+}$, $Ni^{2+}$, $Cu^{1+}$, $Cu^{2+}$ and $Zn^{2+}$. In one embodiment, the transition metal is $Fe^{2+}$, $Fe^{3+}$, $CO^{2+}$, $Co^{3+}$ or $Zn^{2+}$ or the transition metal is $Fe^{2+}$, $CO^{2+}$ or $Zn^{2+}$.

It is to be appreciated that the main chain (or backbone chain) is not particularly limited, provided that the main chain can be coupled to the terminal moieties, and may be selected depending on various desired physical, mechanical or chemical properties of the polymer composition. For instance, tensile strength or resistance, elasticity or elastic modulus, stretchability, flexibility, thermal conductivity/resistance, chemical reactivity and others may be considered when selecting specific polymers and main chains. In one embodiment, the polymer is a straight chain polymer or a branched polymer, and may possibly be a copolymer. In one embodiment, the polymer comprises a synthetic polymer or a natural polymer or biopolymer.

In one embodiment, the main chain comprises low-density polyethylene (LDPE), high-density polyethylene (HDPE), polypropylene (PP), polyvinyl chloride (PVC), polystyrene (PS), polytetrafluoroethylene (PTFE), polychlorotrifluoroethylene (PCTFE), polyurethane, polyethylene terephthalate, polyamide, polyacrylonitrile, polyimide, nylon, polyacrylamide, polyphenylene, polythiophene, polysaccharide, polyglycol, polysiloxane or a combination thereof. In one embodiment, the main chain comprises polysiloxane of the chemical formula —O—$[R_2SiO]_n$—, wherein n is preferably between 3 and 10,000, inclusive, and R is preferably alkyl, alkenyl, alkynyl, aryl, alkoxy, halo or heteroaryl, each of which is optionally substituted. In one embodiment, the main chain comprises polydimethylsiloxane (PDMS) or polydiphenylsiloxane. In one embodiment, the main chain comprises PDMS having a molecular weight between about 300 and about 3000 Da, preferably between about 500 and about 2000 Da or more preferably between about 700 and about 1500 Da.

In one embodiment, the polymer comprises two said terminal moieties coupled to opposing ends of the main chain. In one embodiment, the polymer is a branched polymer having one or more side chains, and comprises two said terminal moieties coupled to opposing ends of the main chain, and optionally, further said terminal moieties coupled to the one or more side chains. In one embodiment, the polymer has a number average molecular weight between about 500 and about 1500 Da or preferably between about 700 and about 1000 Da; a weight average molecular weight between about 1500 and about 3000 Da or preferably between about 2000 and about 2500 Da; and polydispersity index between about 1 and 4 or preferably between about 1.5 and 3.

It is to be appreciated that the terminal moieties are not particularly limited, provided that the terminal moieties are selected to form the coordination complex with the central atom, such as a Lewis base. In one embodiment, each said terminal moiety comprises a functional group selected to form a coordinate covalent bond with the central atom. By way of examples, the functional group may be hydroxyl, halo, alkyl, alkenyl, alkynyl, cycloalkyl, heterocycloalkyl, aryl, aralkyl, heteroaryl, heteroaralkyl, formyl, haloformyl, carbonyl, carboxyl, alkoxy, alkoxycarbonyl, (alkoxycarbonyl)oxy, carbamoyl, amino, imino, imido, azo, azido, cyanato, isocyanato, nitroxy, cyano, isocyano, nitro, sulfanyl, alkylsulfanyl, sulfinyl, sulfino, thiocyanate, isothiocyanato or a combination thereof. In one embodiment, the heteroaryl comprises pyrrolyl, imidazolyl, pyrazolyl, oxazolyl, isoxazolyl, thiazolyl, isothiazolyl, triazolyl, pyridinyl, diazinyl, oxazinyl, thiazinyl or triazinyl.

In one embodiment, the terminal moiety comprises crown ether; 1,4,7,10-tetraazacyclododecane-1,4,7,10-tetraacetic acid (DOTA); diethylenetriaminepentaacetic acid (DTPA); 1,2-bis(diphenylphosphino)ethane (dppe); glycine; heme; 1,1-Bis(diphenylphosphino)methane (dppm); corrole; acetylacetonate (acac); amino; ethylenediamino; azido; N,N'-ethylenebis(salicylimine) (salen); Iminodiacetic acid (IDA); ethylenediaminetetraacetic acid (EDTA); triethylenetetramine (trien); tris(2-aminoethyl)amine (tren); diethylenetriamine (dien); tris(2-diphenylphosphineethyl)amine (np3); cyano; nitro; 2,2'-bipyridine (bpy); dimethylglyoximate; phenanthroline (phen); terpyridine (tpy); nitrilotriacetic acid (NTA); 1,2-bis(o-aminophenoxy)ethane-N,N,N',N'-tetraacetic acid (BAPTA); bis(oxazoline) (BOX) or PyBOX ligand.

In one embodiment, the terminal moiety comprises structural formula (I):

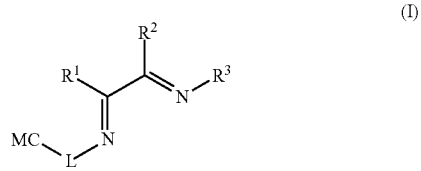

(I)

wherein MC is the main chain, L is a bond or a linker, and $R^1$ to $R^3$ are independently of each other a hydrogen, halo, hydroxyl, amino, imino, imido, nitro, alkoxy, alkyl, alkenyl, alkynyl, cycloalkyl, heterocycloalkyl, aryl, aralkyl, heteroaryl, heteroaralkyl, carbonyl, carboxyl or cyano, each of which is optionally substituted. In one embodiment, the linker is unsubstituted or substituted alkyl, alkenyl or alkynyl. It is to be appreciated that $R^1$ and $R^2$, together with the carbon atoms bonded thereto, and/or $R^2$ and $R^3$, together with the carbon atom and the nitrogen atom bonded thereto, may form unsubstituted or substituted aryl or heteroaryl. In one embodiment, $R^3$ may be unsubstituted or substituted alkenyl, preferably having two carbon atoms, coupled to another unsubstituted or substituted nitrogen atom.

In one embodiment, the terminal moiety comprises structural formula (II):

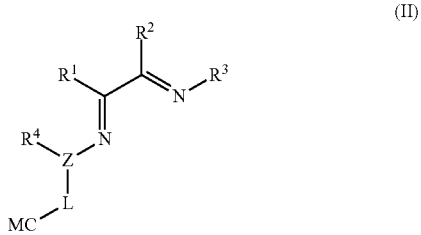

(II)

wherein MC is the main chain, L is a bond or a linker, Z is nothing, a carbon atom or a nitrogen atom, and $R^1$ to $R^4$ are independently of each other hydrogen, halo, hydroxyl, amino, alkoxy, alkyl, alkenyl, alkynyl, cycloalkyl, heterocycloalkyl, aryl, aralkyl, heteroaryl, heteroaralkyl, carbonyl, carboxyl or cyano, each of which is optionally substituted, wherein $R^1$ and $R^2$, together with the carbon atoms bonded thereto, $R^2$ and $R^3$, together with the carbon atom and the nitrogen atom bonded thereto, and/or $R^1$ and $R^4$, together with the carbon atom and the nitrogen atom bonded thereto, may form unsubstituted or substituted cycloalkyl, heterocycloalkyl, aryl or heteroaryl.

In one embodiment, the linker is unsubstituted or substituted alkylene, alkenylene or alkynylene. In one embodiment, L is alkylene selected from the group consisting of methylene, ethylene, n-propylene, isopropylene and butylene. In one embodiment, $R^3$ may be unsubstituted or substituted alkenyl, preferably having two carbon atoms, coupled to another unsubstituted or substituted nitrogen atom.

It is to be appreciated that if Z is nothing, then $R_4$ is not included in compound (II), and L is directly coupled or covalent bonded to the adjacent nitrogen atom.

In one embodiment, Z is a carbon atom, and $R^1$ and $R^2$, together with the carbon atoms bonded thereto, $R^2$ and $R^3$, together with the carbon atom and the nitrogen atom bonded thereto, and/or $R^1$ and $R^4$, together with the carbon atom and the nitrogen atom bonded thereto, form unsubstituted or substituted aryl or heteroaryl.

In one embodiment, Z is nothing, $R^1$ is hydrogen, halo, hydroxyl, amino, alkoxy, alkyl, alkenyl, alkynyl, cycloalkyl, heterocycloalkyl, aryl, aralkyl, heteroaryl, heteroaralkyl, carbonyl, carboxyl or cyano, and $R^2$ and $R^3$, together with the carbon atom and the nitrogen atom bonded thereto, form unsubstituted or substituted heteroaryl.

In one embodiment, the terminal moiety comprises one or more of the following structural formulas:

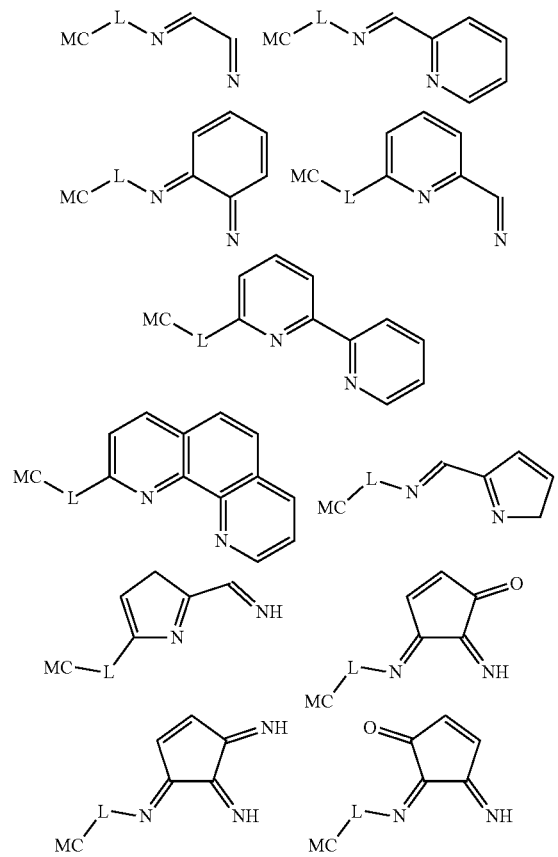

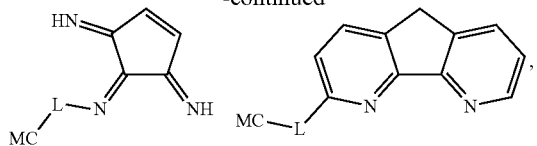

wherein one or more of the carbon atoms and the nitrogen atoms in the structural formulas are optionally substituted.

In one embodiment, the coordination complex has a coordination number between 4 and 8, inclusive. In one embodiment, the coordination complex has a geometry selected from the group consisting of tetrahedral, square planar, trigonal bipyramidal, square pyramidal, octahedral, trigonal prismatic, pentagonal bipyramidal, capped octahedral, capped trigonal prismatic, square antiprismatic, dodecahedral, bicapped trigonal prismatic, cubic and hexagonal bipyramidal, or preferably, tetrahedral, square planar, trigonal bipyramidal and octahedral, or more preferably, octahedral. In one embodiment, the coordination complex is formed with the terminal moieties of a plurality of said polymers, or preferably, two, three or four of said polymers. Preferably, the coordination complex is formed with one said terminal moiety from each of said multiple polymers. In one embodiment, each said terminal moiety is selected to operate as a monodentate or polydentate ligand, preferably a bidentate ligand.

In one embodiment, the coordination complex has a number average molecular weight between about 700 and about 1700 Da or preferably between about 900 and about 1300 Da; a weight average molecular weight between about 2000 and about 5000 Da or preferably between about 3000 and about 4000 Da; and polydispersity index between about 1 and 4 or preferably between about 1.5 and 3.

In one embodiment, the polymer comprises structural formula (III):

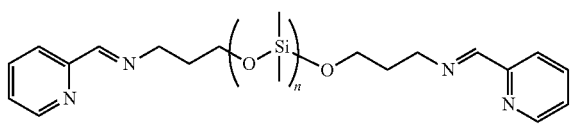

(III)

wherein n is 3 to 10,000. In one embodiment, n is between 5 and 5,000, preferably between 10 and 1000, more preferably between 15 and 300 or most preferably 20 to 30.

In one embodiment, the coordination complex comprises structural formula (IV):

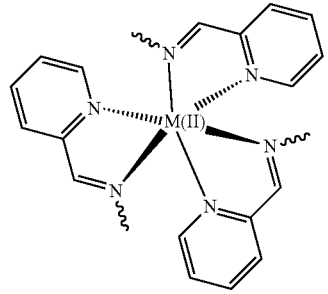

(IV)

Wherein M(II) is the central atom or ion, the central atom or ion being $Ru^{2+}$, $Cr^{2+}$, $Rh^{2+}$, $Mn^{2+}$, $Fe^{2+}$, $Co^{2+}$, $Ni^{2+}$, $Cu^{2+}$ and $Zn^{2+}$, or preferably $Fe^{2+}$, $Zn^{2+}$ or $Co^{2+}$, and a wavy line representing MC, L and Z.

In one embodiment, the polymer composition is self-healing.

In one embodiment, the polymer composition is prepared by contacting the polymer and a compound comprising the central atom or ion and a counterion, wherein the central atom or ion is $Fe^{2+}$, $Zn^{2+}$ or $Co^{2+}$, and the conunterion is a non-coordinating or weakly-coordinating counterion or anion. In one or alternative embodiment, the counterion is tetrafluoroborate, hexafluorophosphate, perchlorate, trifluoromethanesulfonate, tetrakis[3,5-bis(trifluoromethyl)phenyl]borate, tetrakis(pentafluorophenyl)borate, tris(pentafluoro- phenyl)boron, $[AlCl_4]^-$, $[GaCl_4]^-$, $[AsF_6]^-$, $[SbF_6]^-$, $[IrF_6]^-$, $[PtF_6]^-$, $[Sb_2F_{21}]^-$, $[Sb_3F_{16}]^-$, $[Sb_4F_{21}]^-$, $[B(CF_3)_4]^-$, $[B(C_6F_5)_4]^-$, $[Ga(C_6F_5)_4]^-$, $[HO(B(C_6F_5)_3)_2]^-$, $[CB_{11}H_5Cl_6]^-$, $[CHB_{11}H_5Br_6]^-$, $[CHB_{11}Me_5Br_6]$, $[CHB_{11}F_{11}]^-$, $[CEtB_{11}F_{11}]^-$, $[B_{12}CL_{11}NMe_3]^-$, $[Al(OR^{PF})_4]^-$, $[F(Al(OR^{PF})_3)_2]^-$ or $[Sb(OTeF_5)_6]^-$. In one embodiment, the counterion is tetrafluoroborate, perchlorate or trifluoromethanesulfonate.

In one embodiment, the term "alkyl" refers to a straight-chained or branched hydrocarbon group containing 1 to 12 carbon atoms. The alkyl may include lower alkyl, referring to a C1-C6 alkyl chain. Examples of the alkyl group include methyl, ethyl, n-propyl, isopropyl, tert-butyl, and n-pentyl. The Alkyl group may be optionally substituted with one or more substituents.

In one embodiment, the term "alkenyl" refers to an unsaturated hydrocarbon chain that may be a straight chain or branched chain, containing 2 to 12 carbon atoms and at least one carbon-carbon double bond. The Alkenyl group may be optionally substituted with one or more substituents. In one embodiment, the term "alkynyl" refers to an unsaturated hydrocarbon chain that may be a straight chain or branched chain, containing 2 to 12 carbon atoms and at least one carbon-carbon triple bond. The alkynyl groups may be optionally substituted with one or more substituents. The $sp^2$ or sp carbons of the alkenyl or alkynyl group may optionally be the point of attachment of the group.

In one embodiment, the term "alkylene" refers to an alkyl group that has two points of attachment, and may preferably include (C1-C6) alkylene. In one embodiment, the alkylene is methylene, ethylene, n-propylene or isopropylene.

In one embodiment, the term "amino" refers to a functional group having a nitrogen atom bonded to two hydrogen atoms, where one or both of the hydrogen atoms may optionally be substituted, preferably but not limited to, alkyl or aryl, i.e., the amino includes primary, secondary, tertiary or quaternary amino. For instance, the amino includes alkylamino, dialkylamino or trialkylamino.

In one embodiment, the term "cycloalkyl" refers to a hydrocarbon 3-8 membered monocyclic or 7-14 membered bicyclic ring system having at least one non-aromatic ring. The Cycloalkyl group is optionally substituted with one or more substituents, and may be cyclopropyl, cyclopentyl, cyclohexyl, cyclobutyl, cycloheptyl, cyclooctyl, cyclononyl or cyclodecyl.

In one embodiment, the term "heterocycloalkyl" refers to a nonaromatic 5-8 membered monocyclic, 8-12 membered bicyclic or 11-14 membered tricyclic ring system comprising 1-3 heteroatoms if monocyclic, 1-6 heteroatoms if bicyclic or 1-9 heteroatoms if tricyclic, said heteroatoms being O, N, S, B, P or Si. The heterocycloalkyl is optionally substituted with one or more substituents. In one embodiment, the heterocycloalkyl is piperidinyl, piperazinyl, 2-oxopiperazinyl, 2-oxopiperidinyl, 2-oxopyrrolidinyl, 4-piperidonyl, tetrahydropyranyl, tetrahydrothiopyranyl, tetrahydrothiopyranyl sulfone, morpholinyl, thiomorpholinyl, thiomorpholinyl sulfoxide, thiomorpholinyl sulfone, 1,3-dioxolane, tetrahydrofuranyl, tetrahydrothienyl or thiirene.

In one embodiment, the term "aryl" refers to a hydrocarbon monocyclic, bicyclic or tricyclic aromatic ring system, and which is optionally substituted with one or more substituents. In one embodiment, the aryl is phenyl, naphthyl, anthracenyl, fluorenyl, indenyl or azulenyl.

In one embodiment, the term "aralkyl" refers to aryl attached to another group by a (C1-C6)alkylene group. The aralkyl is optionally substituted, either on the aryl portion or the alkylene portion of the aralkyl, with one or more substituent. In one embodiment, the aralkyl is benzyl, 2-phenyl-ethyl or naphth-3-yl-methyl.

In one embodiment, the term "heteroaryl" refers to an aromatic 5-8 membered monocyclic, 8-12 membered bicyclic or 11-14 membered tricyclic ring system having 1-4 ring heteroatoms if monocyclic, 1-6 heteroatoms if bicyclic or 1-9 heteroatoms if tricyclic, where the heteroatoms are independently O, N or S, and the remainder ring atoms are carbon. The heteroaryl is optionally substituted with one or more substituents. In one embodiment, the heteroaryl is pyridyl, 1-oxo-pyridyl, furanyl, benzo[1,3]dioxolyl, benzo[1,4]dioxinyl, thienyl, pyrrolyl, oxazolyl, oxadiazolyl, imidazolyl, thiazolyl, isoxazolyl, quinolinyl, pyrazolyl, isothiazolyl, pyridazinyl, pyrimidinyl, pyrazinyl, triazinyl, triazolyl, thiadiazolyl, isoquinolinyl, indazolyl, benzoxazolyl, benzofuryl, indolizinyl, imidazopyridyl, tetrazolyl, benzimidazolyl, benzothiazolyl, benzothiadiazolyl, benzoxadiazolyl, indolyl, tetrahydroindolyl, azaindolyl, imidazopyridyl, quinazolinyl, purinyl, pyrrolo[2,3]pyrimidinyl, pyrazolo[3,4]pyrimidinyl, and benzo[b]thienyl, 3H-thiazolo[2,3-c][1,2,4]thiadiazolyl, imidazo[1,2-d]-1,2,4-thiadiazolyl, imidazo[2,1-b]-1,3,4-thiadiazolyl, 1H,2H-furo[3,4-d]-1,2,3-thiadiazolyl, 1H-pyrazolo[5,1-c]-1,2,4-triazolyl, pyrrolo[3,4-d]-1,2,3-triazolyl, cyclopentatriazolyl or pyrrolo[2,1b]oxazolyl.

In one embodiment, the term "heteroaralkyl" or "heteroarylalkyl" means a heteroaryl group attached to another group by a (C1-C6)alkylene. The heteroaralkyl may be optionally substituted, either on the heteroaryl portion or the alkylene portion of the heteroaralkyl, with one or more substituent. In one embodiment, the heteroaralkyl is 2-(pyridin-4-yl)-propyl, 2-(thien-3-yl)-ethyl or imidazol-4-yl-methyl.

In one embodiment, the term "alkoxy" refers to an —O-alkyl radical.

In one embodiment, the term "ester" refers to a —C(O)OR$^{30}$, wherein R$^3$ is preferably alkyl or aryl.

In one embodiment, the term "halogen" or "halo" is —F, —Cl, —Br or —I. In one embodiment, the term "haloalkyl" is an alkyl group in which one or more hydrogen radicals are replaced by halogen, and may include perhaloalkyl. In one embodiment, the haloalkyl is trifluoromethyl, difluoromethyl, bromomethyl, 1,2-dichloroethyl, 4-iodobutyl or 2-fluoropentyl.

In one embodiment, the term "substituent" or "substituted" means that a hydrogen radical is replaced with a group that does not substantially adversely affect the stability or activity of the compound. The term "substituted" refers to one or more substituents, which may be the same or different, each replacing a hydrogen atom. In one embodiment, the substituent is halogen, hydroxyl, amino, alkylamino, arylamino, dialkylamino, diarylamino, cyano, nitro, mercapto, oxo, carbonyl, thio, imino, formyl, carbamido, carbamyl, carboxyl, thioureido, thiocyanato, sulfoamido, sulfonylalkyl, sulfonylaryl, alkyl, alkenyl, alkoxy, mercaptoalkoxy, aryl, heteroaryl, cyclyl, heterocyclyl, wherein alkyl, alkenyl, alkyloxy, aryl, heteroaryl, cyclyl and heterocyclyl are optionally substituted with alkyl, aryl, heteroaryl, halogen, hydroxyl, amino, mercapto, cyano, nitro, oxo, thioxo or imino.

Additional and alternative features of the present invention will be apparent to a person skilled in the art from the following detailed description of the preferred embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
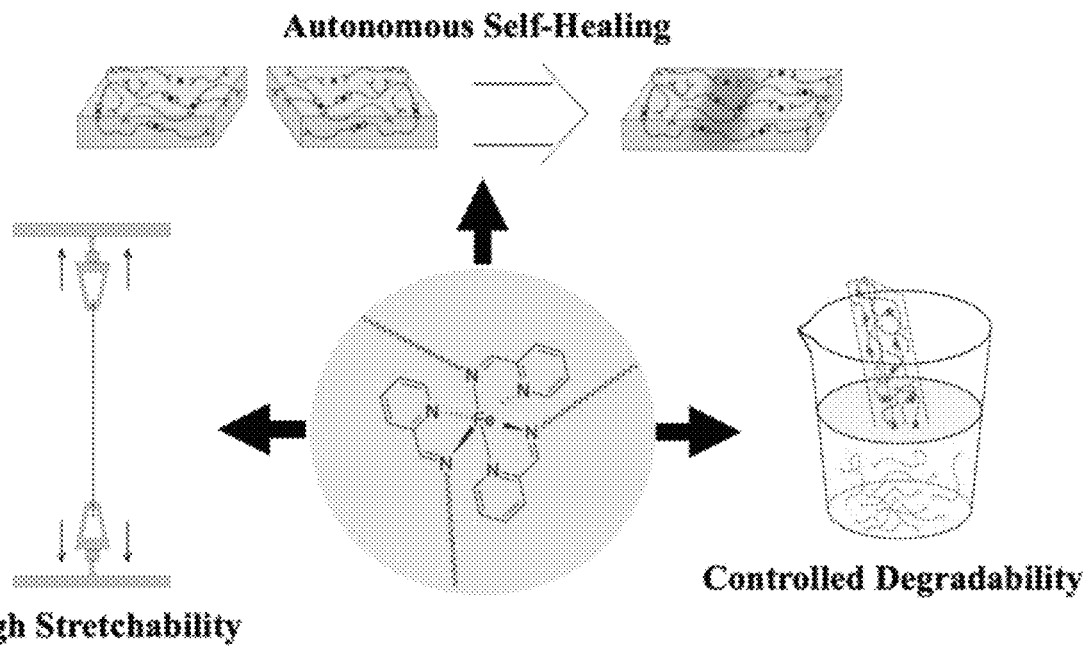
FIG. 1 shows in the center a partial structural formula of a self-healing polymer in accordance with a preferred embodiment of the present invention, as well as pictures illustrating autonomous self-healing, stretchability and degradability of the self-healing polymer.

Described herein is a preferred facile synthesis of novel silicone-based materials specifically designed to include a unique combination of dynamic imine and metal-coordination bonds. Through an easy condensation reaction, imine bonds are generated at the end-termini of a short siloxane chain. The resulting end-capped material was chemically crosslinked with different ratios of a Fe(II)-based salt to achieve a dynamically crosslinked network. By controlling the ratio of metal crosslinker utilized, the dynamic materials and new crosslinking system were shown to be highly tunable, leading to materials with ultra-high stretchability (800% strain elongation), autonomous self-healing (24 hours at room temperature), and degradability in mild acidic conditions. A preferred approach to forming a preferred self-healing polymer is shown in FIG. 1.

The new materials have been characterized chemically and mechanically before and after healing, and after degradation through a combination of techniques, including UV-Vis and infrared spectroscopy (FTIR), nuclear magnetic resonance (NMR), size-exclusion chromatography (SEC), and tensile-pull strain testing. Furthermore, the resulting self-healing polymer has been utilized to fabricate highly sensitive and self-healable capacitive pressure sensors, capable of regenerating electrical and mechanical properties after damage. The method and results presented in this work may permit new opportunities for the large-scale synthesis of autonomous self-healing materials in a cost-effective manner, without requiring expensive or external healing agents as well as without impacting the long-term environmental sustainability.

Experimental Section

Materials: Commercial reactants were used without further purification unless stated otherwise. All the solvents used in these reactions were distilled prior to use. Aminopropyl-terminated polydimethylsiloxane with molecular weight of 1000 Da, and dispersity of 1.33 was purchased from Gelest (Pennsylvania, USA). Pyridine-2-carboxaldehyde and Iron (II) tetrafluoroborate hexahydrate were purchased from Sigma-Aldrich and used as received.

Measurements and Characterization: Nuclear magnetic resonance (NMR) spectra were recorded on a Bruker 300 MHz spectrometer. The spectra for all polymers were obtained in deuterated chloroform at room temperature. Chemical shifts are given in parts per million (ppm). Number average molecular weight (Mn), weight average molecular weight (M), and polydispersity index (PDI) were evaluated by high-temperature size-exclusion chromatography (SEC) using 1,2,4-trichlorobenzene at 180° C. and performed on an EcoSEC HLC-8321GPC/HT (Tosoh Bioscience) equipped with a single TSKgel GPC column (GMHHR-H; 300 mm×7.8 mm) calibrated with monodisperse polystyrene standards. UV-Visible spectroscopy was performed on a Varian UV/Visible Cary 50 spectrophotometer. The surface structure of polymer film was obtained using a Multimode atomic force microscope (AFM, Digital Instruments) operated in the tapping mode at room temperature. Images were collected using Nanoscope 6 software and processed using WSxM 5.0 Develop 8.0 software. FTIR spectroscopy was performed on a Bruker ALPHA FTIR Spectrometer using a Platinum ATR sampling module.

Sample Preparation: After crosslinking with Fe(II), the polymer was solubilized in dichloromethane, filtered on 0.45 μm filter and casted into 3-cavities PTFE mold with cavity dimensions of 37.6 mmL×13.8 mmW×3 mm D (Ted Pella). The solution was filtered on 0.45 μm filter mostly as a precaution to remove any solid clusters or impurities, and to ensure the formation of smooth films. Once a gel was formed, the samples were placed in a vacuum oven at 50° C. and left to dry for 48 hours. Structuring of the dielectrics was performed by using an inverse PDMS-based mold prepared from commercially-available safety tape ribbons following a previously reported procedure (see B. Grzybowski, D. Qin, R. Haag and G. M. Whitesides, *Sensors Actuators B. Chem.*, 2000, 81-85 and J. Pignanelli, K. Schlingman, T. B. Carmichael, S. Rondeau-Gagne and M. J. Ahamed, *Sensors Actuators A. Phys.*, 2019, 285, 427-436, the entire contents of which are incorporated herein by reference). The mold was cured with UV-ozone for 5 minutes and was used as a stamp to produce the nanostructure on the desired materials. The polymer was then left for 24 hours in vacuum at 50° C. to dry. Once dried, the sample was slowly peeled off and directly used for the fabrication of the devices.

Device Fabrication and Characterization: Devices were fabricated by lamination of the structured dielectrics (self-healing polymer) with copper tape. Note that an overhanging end was left to be connected and tested using Agilent E4980A 2 MHz Precision LCR meter for capacitance measurements. Sensitivity upon pressure was evaluated using a home-made force linear actuator and force sensor connected to the device. The range of pressure evaluated was from 0 to 32 kPa. The devices were tested at various pressures within this range in order to construct a sensitivity curve. Stretched samples were subjected to 30% strain for 100 cycles using a custom-built stretching station. Healed samples were cut in half with a blade and pressed back together for intrinsic self-healing before being used as a dielectric.

Evaluation of self-healing properties: Self-healing was evaluated by tensile strain analysis as well as by device signal sensitivity before and after healing. For the tensile strain analysis, a flat molded sample was simply cut in half with a blade, pressed back together and left to heal for 24 or 48 hours before being characterized. Tensile-strain analysis was performed on an Instron Tensile Strain instrument with a test rate of 100 mm/min. Self-healing ability of the pressure sensing devices was characterized by testing the device before and after a healing period of 48 hours. For evaluation of the self-healing properties by atomic force microscopy, a sample was frozen in liquid nitrogen and carefully cut with a scalpel. The films analyzed were spin coated on a cleaned glass substrate, at 2000 rpm for 1 min. Several attempts were required to make a cut small enough to properly self-heal, but large enough that the full capability of the material is demonstrated. The cut sample was then left on the AFM stage on day 0 and measured after 24, 48 and 72 hours.

Evaluation of degradability: A small piece of the self-healing material was characterized in terms of degradability by placing a solid piece of the polymer in mild acid solutions (hydrochloric acid or acetic acid) and left to stir until fully dissolved, or in solution with about 1 M acetic acid and left to stir until fully dissolved (2 days). The resulting solution was then directly characterized without further treatments.

Evans method for determining effective magnetic moment: A previously reported procedure was followed (see D. F. Evans, *J. Chem. Soc.*, 1959, 2003-2005, the entire contents of which are incorporated herein by reference). Briefly, samples of known concentration (0.9 mM) were prepared. An NMR tube made of concentric tubes was filled with pure solvent ($CDCl_3$, inner tube) and sample (outer tube). The magnetic susceptibility ($\chi$mass) was determined by using the formula $\chi$mass $3\Delta f/4\pi fm+\chi 0+\chi 0(d0-ds)/m$, where $\chi$mass is mass susceptibility ($cm^3 g^{-1}$), $\Delta f$ is the observed frequency difference (Hz), f is spectrometer frequency (Hz), m is the mass of paramagnetic substance ($g \cdot cm^{-3}$), $\chi_0$ is the mass susceptibility of solvent ($cm^3 g^{-1}$), do is the density of solvent ($g \cdot cm^{-3}$), and ds is the density of solution ($g \cdot cm^{-3}$). The magnetic susceptibility was further converted to the effective magnetic moment ($\mu_{eff}$) following a previously reported procedure (see B. Weber and F. A. Walker, *Inorg. Chem.*, 2007, 46, 6794-6803 and L. Zheng, X. Fang, K. Lii, H. Song, X. Xin, H.-K. Fun, K. Chinnakali and I. Abdul Razak, *J. Chem. Soc., Dalt. Trans.*, 1999, 3, 2311-2316, the entire contents of which are incorporated herein by reference).

Preparation of model imine compounds: The synthesis of the (E)-N-butyl-1-(pyridin-2-yl)methanimine has been performed according to a previously reported procedure (see M. Zeng, L. Li and S. B. Herzon, *J. Am. Chem. Soc.*, 2014, 136, 7058-7067, the entire contents of which are incorporated herein by reference). Following its preparation, the compound (1 eq.) was reacted with 6-aminohexan-1-ol (1.2 eq.) in tetrahydrofuran (2 M). The reaction mixture was stirred for 72 h at 30° C. The product was used without any further purification for LC-MS analysis.

Synthesis of Pre-Polymer 1 Followed by Chemical Cross-linking with Fe(II)-Based Salts:

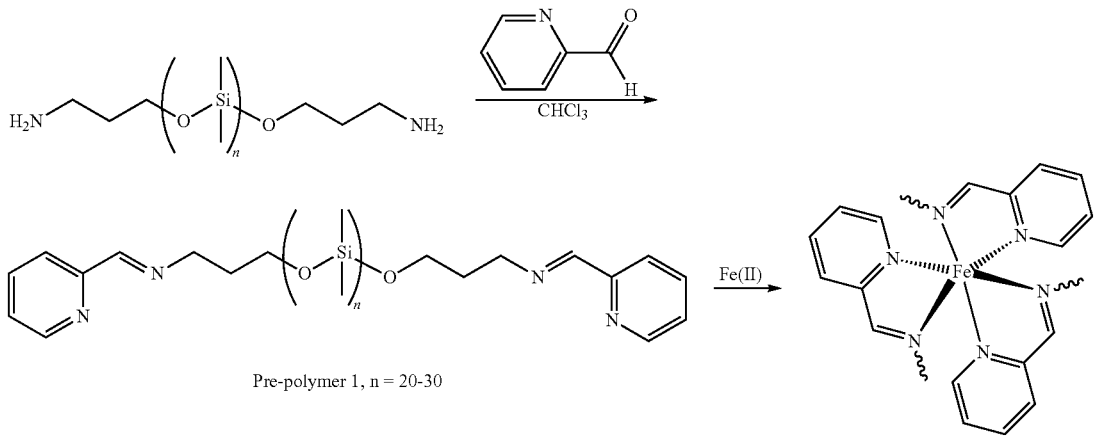

Pre-polymer 1, n = 20-30

Pre-polymer 1. A round bottom flask equipped with a magnetic stir bar was charged with aminopropyl-terminated PDMS (20 g, 0.020 mol), pyrimidine-2-carboxaldehyde (4.28 g, 0.042 mol) and $CHCl_3$ (20 mL). The reaction was left stirring for 48 hours at room temperature and $CH_3Cl$ was removed under reduced pressure. The resulting materials was diluted in hexanes and was extracted with MeCN to remove unreacted monomer and dried under vacuum to afford pre-polymer 1 as a viscous thick oil. $^1$H NMR (300 MHz, $CDCl_3$, 298 K): 8.62 (d, J=4.2 Hz, 2H), 8.35 (s, 2H), 7.98 (dd, 7.8 Hz, 2H), 7.72 (t, 2H), 7.29 (t, J=15.3, 2H), 3.67 (t, J=14.1, 4H), 2.29 (m, 12H), 1.79 (m, 4H), 0.584 (t, 7.5 Hz, 4H). Molecular weight estimated from high temperature GPC (1,2,4-trichlorobenzene, 200° C.): $M_n$=839 Da, $M_w$=2286 Da, PDI=2.737

General procedure for the preparation of Fe-coordinated polymer. The crosslinking of pre-polymer 1 was performed by dissolving a selected amount of materials in dichloromethane and stirring for 5 minutes. A selected amount of iron(II) tetrafluoroborate hexahydrate dissolved in a minimal amount of methanol was then added to the mixture. The reaction was left to stir at room temperature for 30 minutes and the resulting materials was directly molded for further analysis. Molecular weight for a 1:3 pre-polymer/Fe(II) ratio sample was estimated from high temperature GPC (1,2,4-trichlorobenzene, 200° C.): $M_n$=1140 Da, $M_w$=3407 Da, PDI=2.989

Results and Discussion

A preferred synthesis of a preferred self-healing polymer is depicted in Scheme 1 as shown below:

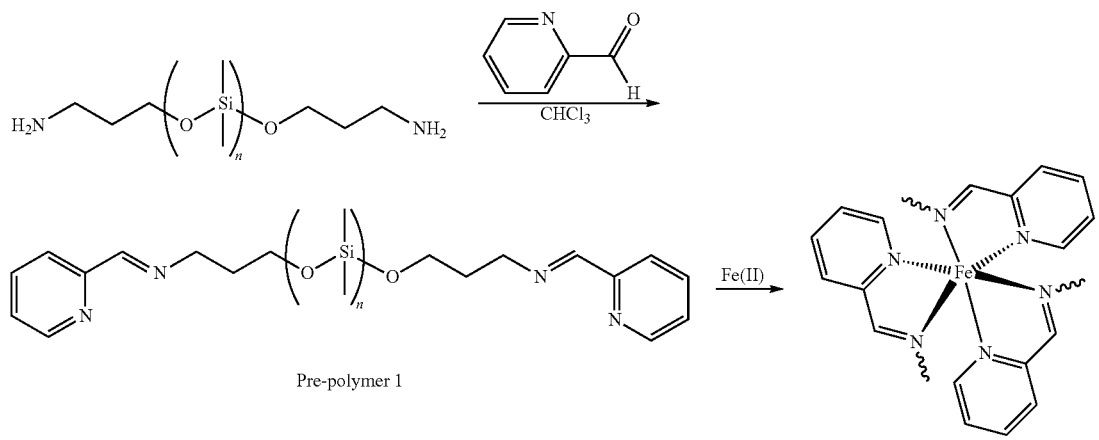

Pre-polymer 1

Starting from commercially-available aminopropyl-terminated polydimethylsiloxane, a condensation reaction is performed with 2-pyridinecarboxaldehyde to generate pre-polymer 1. Pre-polymer 1 (1000 Da) was directly used without further purification in a crosslinking reaction with a Fe(II)-based salt. In this study, Fe(II) tetrafluoroborate was used. Interestingly, as soon as the salt was added, the pre-polymer immediately gelified and turned purple, which is typical for the formation of a Fe(II) coordination complex. To confirm the presence of Fe(II) in the materials, the materials' effective magnetic moment ($\mu_{eff}$) was determined by nuclear magnetic resonance (NMR) in solution, using Evans method (see D. F. Evans, *J. Chem. Soc.*, 1959, 2003-2005 and B. Weber and F. A. Walker, *Inorg. Chem.*, 2007, 46, 6794-6803, the entire contents of which are incorporated herein by reference). The crosslinked materials was found to have a $\mu_{eff}$=3.08$\mu_b$, which is a value that can be assigned to a high-spin Fe(II) complex.

From a design point of view, a system combining dynamic imine and metal-ligand bonds has been selected for multiple reasons. First, the generation of the pre-polymer does not require any heating or catalyst, and all the initial precursors are commercially available (cost below $0.5 per gram). Furthermore, both imine and metal-coordinating bonds have been shown to be highly dynamic, and typically lead to good self-healing properties in elastomeric materials. Therefore, the combination of both types of bonds may enable the formation of a very dynamic system, ideal for self-healing and stretchability. Finally, imine bonds may undergo reverse condensation in mild conditions, which is particularly interesting to trigger a controlled degradation of the materials.

Figure 2:
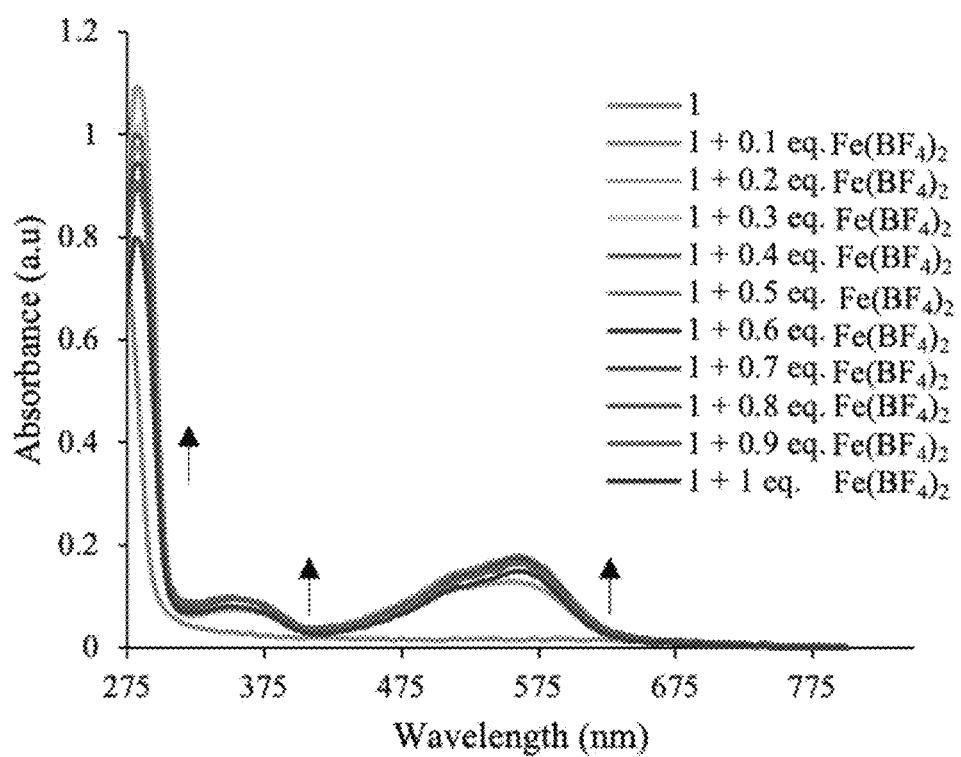
FIG. 2 shows a UV-vis absorption spectra of a pre-polymer 1 (shown in Scheme 1 provided below) in CHCl$_3$ upon titration with 0.1 equivalent increments of Fe(BF$_4$)$_2$ per polymer chain.
Figure 3:
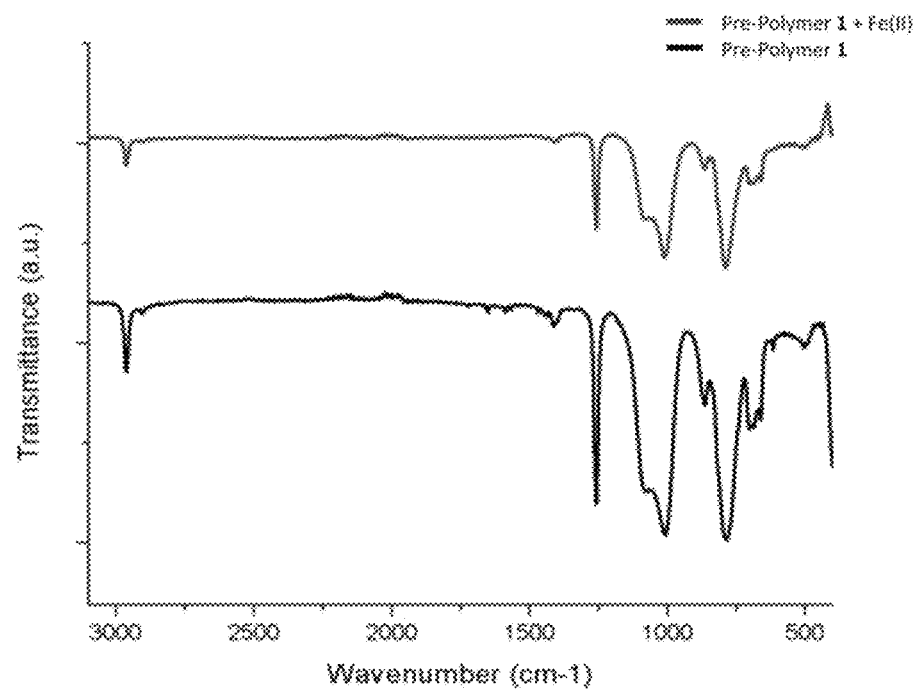
FIG. 3 shows a Fourier-Transform IR spectra of pre-polymer 1 before and after crosslinking with 0.25 equivalent of Fe(BF$_4$)$_2$.
Figure 4:
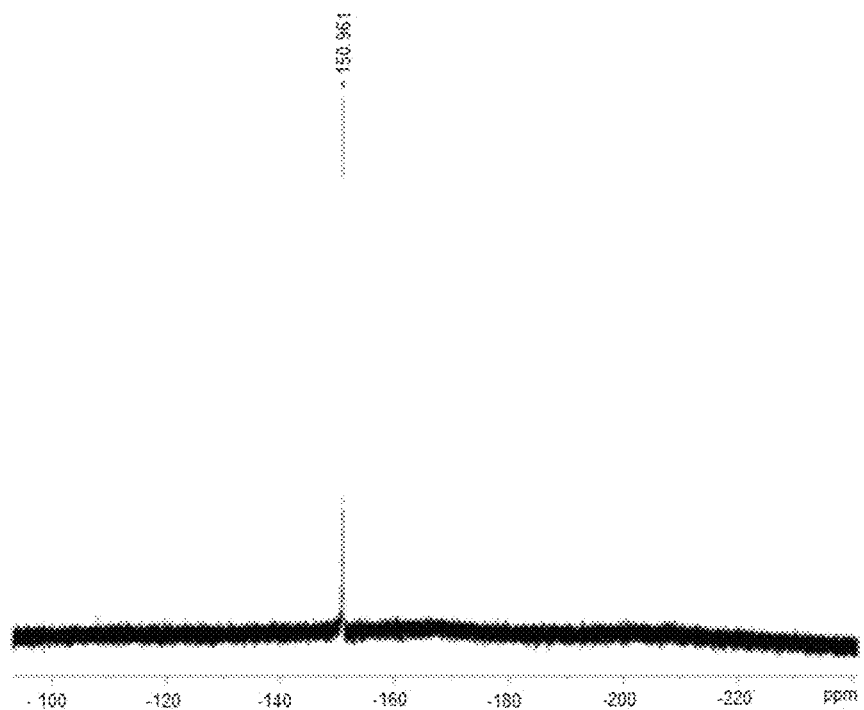
FIG. 4 shows a $^{19}$F NMR spectrum of pre-polymer 1 crosslinked with Fe(II) in CDCl$_3$.
Figure 5:
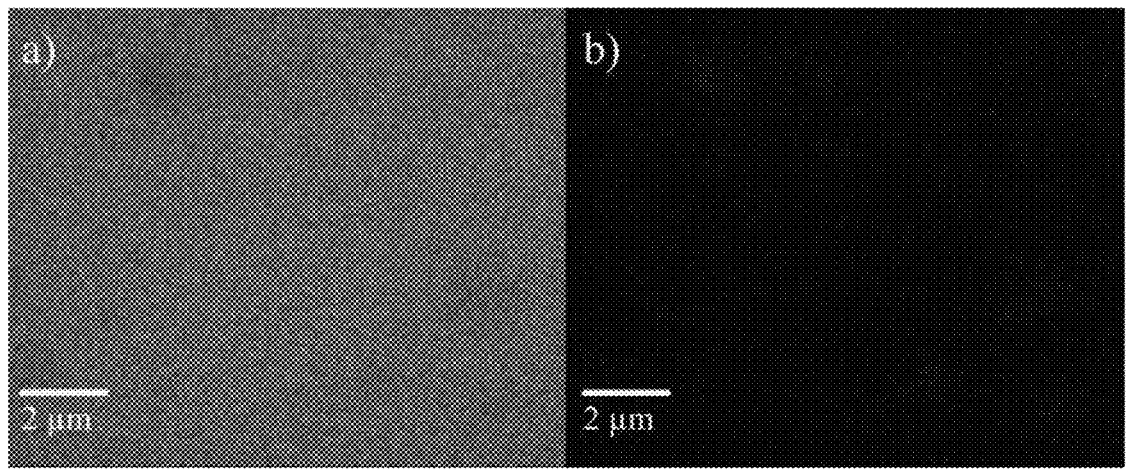
FIG. 5 shows energy-dispersive X-ray spectroscopy (EDX) analysis map, with the left portion labeled "a)" showing a scanning electron micrograph of EDX scanning area cumulative elemental overlay (yellow=Si, red=Fe), and the right portion labeled "b)" independent elemental overlay of Fe atoms (in both portions a) and b), the scale bar is 2 μm)
Figure 6:
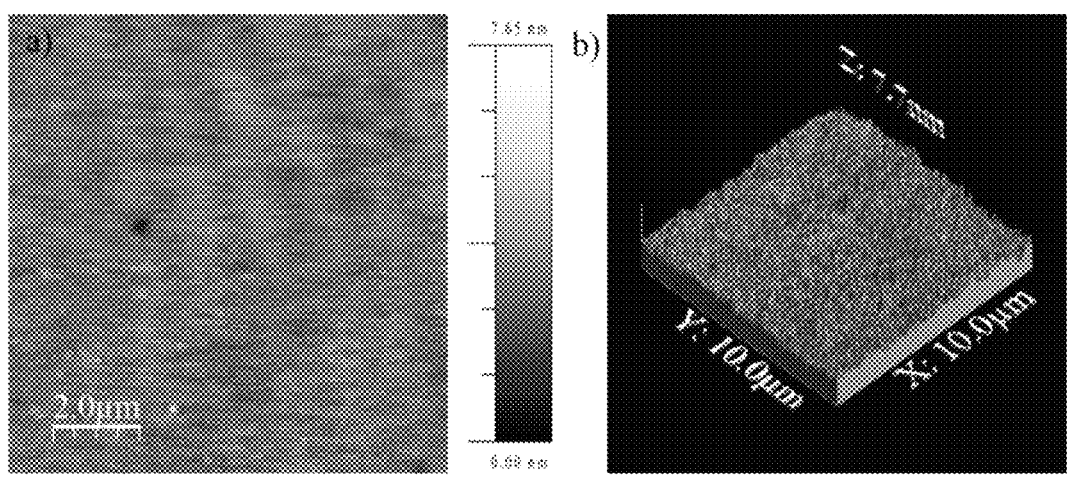
FIG. 6 shows atomic force microscopy (AFM), with the left portion labeled "a)" showing a height image, and the right portion labeled "b)" showing a three-dimensional image of pre-polymer 1 after Fe(II) coordination (in both portions a) and b), the scale bar is 2 μm)

To optically probe for the formation of a metal-coordination complex between the N-ligand generated after condensation reaction and Fe(II), UV-vis spectroscopy was utilized and the results are summarized in FIG. 2. To confirm the formation of the complex, a solution of pre-polymer 1 was prepared and increments of 0.1 equivalent of a stock solution of $Fe(BF_4)_2$ were added up to two equivalents to ensure saturation of the coordination sites. As typically observed for Fe complexes with other N-ligands (bipyridine, triazoles, etc.), strong absorption bands appeared progressively at 350, 575 and 650 nm. These bands can be directly attributed to the formation of the Fe coordination complex in the materials, which is crosslinking the short oligomeric chains into a rigid polymer network. Further characterization of the crosslinked materials by Fourier-Transform IR spectroscopy (FTIR) (FIG. 3) and solution NMR showed very minor differences in the system before and after coordination, which can be attributed to the relatively low signal from the metal-ligand complex compared to the siloxane-based polymeric backbone. Interestingly, $^{19}F$ NMR analysis performed on the crosslinked materials shown the presence of only one signal (singlet) associated to fluorine (FIG. 4). This result potentially indicates that the tetrafluoroborate counter-ion remained close to the coordination complex. As shown on FIG. 2, the pre-polymer 1 almost immediately form a dense gel upon the addition of the metal salt, and completely becomes solid after 24 hours under a vacuum oven at 50° C. As detailed in FIGS. 5 and 6, energy-dispersive x-ray spectroscopy (EDX) and atomic force microscopy (AFM) images recorded on the crosslinked materials shown a uniform morphology, without metallic cluster or aggregate. No glass transition temperature was observed by dynamic scanning calorimetry (DSC) below −50° C., which can be observed for other PDMS-based materials.

Figure 7:
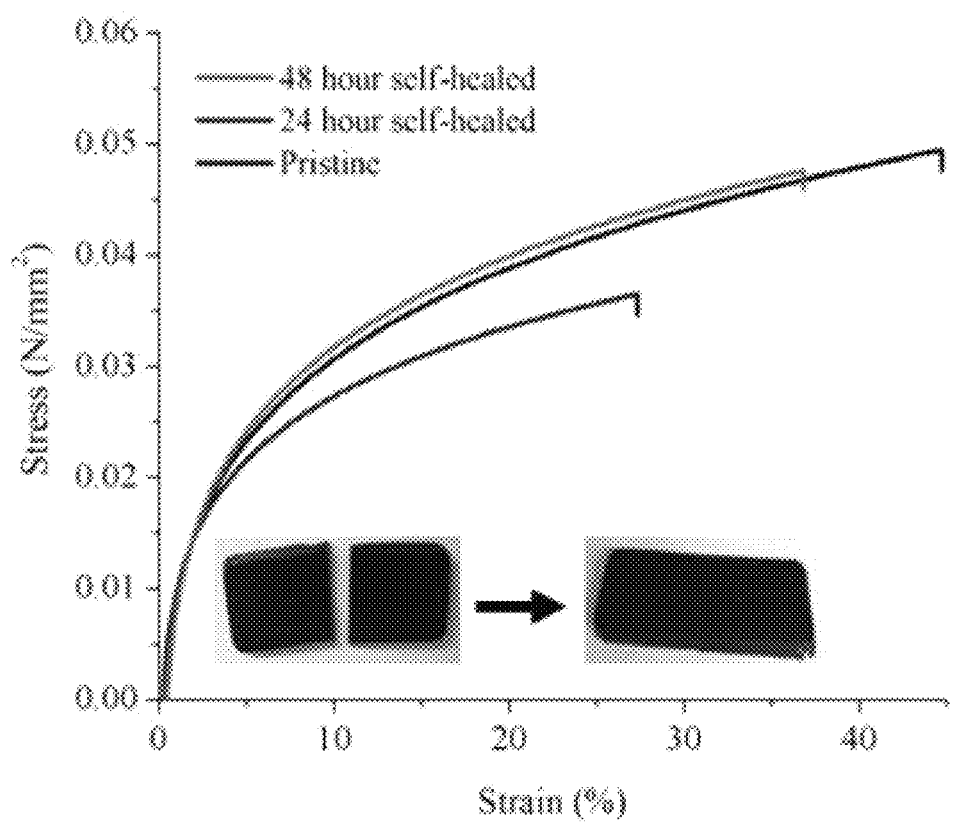
FIG. 7 shows stress-strain curves of pre-polymer 1 crosslinked with 0.25 equivalent of Fe(BF$_4$)$_2$ before and after self-healing for 24 and 48 hours at room temperature.

Elastic modulus and tensile resistance are two significant parameters that can be used to assess the mechanical properties of soft materials. Therefore, tensile-pull testing was performed on free-standing films of crosslinked polymers before and after healing. Results are summarized in FIG. 7. First, the bulk mechanical properties were investigated for pre-polymer 1 crosslinked with 0.25 equivalents of Fe, in order to excess the stoichiometric amount of ligand for the formation of an octahedral complex. Despite not being required to ensure a saturation of the thermomechanical properties, which should occur upon formation of the octahedral complexes, an excess of ligand was used to ensure a complete coordination of the Fe salt and avoid the presence of metallic cluster embedded in the materials, potentially negatively affecting the bulk stretchability and self-healing efficiency. Interestingly, the materials showed decent mechanical properties, with a maximum elongation before fracture at around 58±12% (averaged on three samples). The difference in maximum elongation compared to other PDMS-based system can be attributed to a strong crosslinking between the short polymer chains upon adding Fe. A Young's modulus of 1.53 MPa was also measured directly from the tensile-pull testing results.

Figure 8:
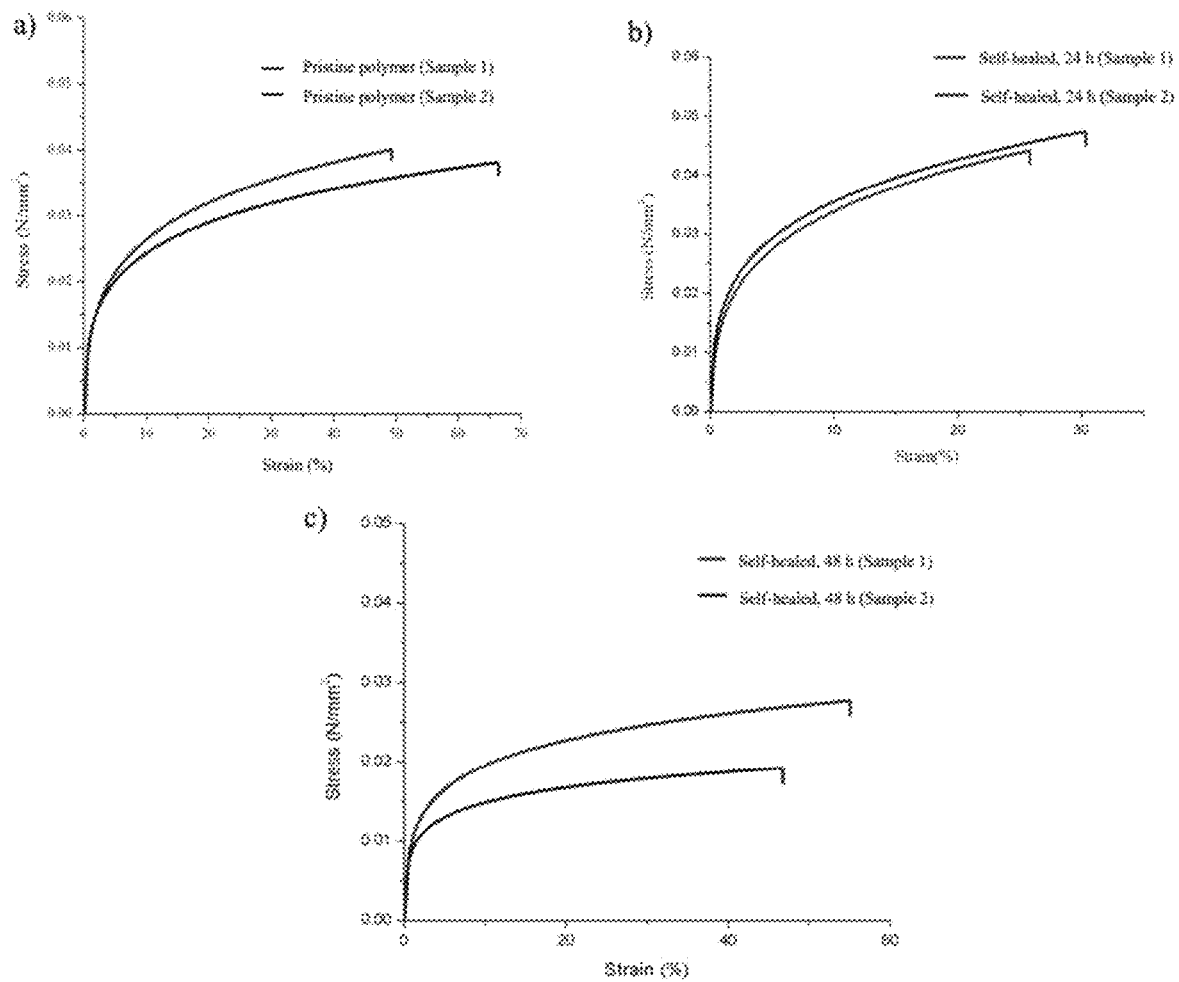
FIG. 8 shows stress-strain curves of pre-polymer 1 crosslinked with 0.33 equivalent of Fe(BF$_4$)$_2$, with the upper left graph labeled "a)" showing a stress-strain curve of pre-polymer 1 before cutting/self-healing, the upper right graph labeled "b)" showing a stress-strain curve of pre-polymer 1 after self-healing for 24 hours; and the lower graph labeled "c)" showing a stress-strain curve of pre-polymer 1 after self-healing for 48 hours at room temperature (the measurements were recorded on two samples from two different batches of materials)

The crosslinked materials was then cut in half with a blade and self-healed (room temperature) for 24 and 48 hours. Interestingly, the resulting self-healed materials were shown to regain 48±3% and 88±7% of their maximum elongation before fracture, after respectively 24 and 48 hours (averaged on three samples). No external stimuli or trigger was used to enable that self-healing. Moreover, a similar stretchability and self-healing properties were observed for pre-polymer 1 crosslinked with 0.33 equivalents of Fe (see FIG. 8). These results strongly suggest that the pyridine ligands of the PDMS backbone can dynamically re-coordinate with the Fe and therefore reform the mechanical nature of the material as the crosslinking density is able to regenerate autonomously as a function of time.

Figure 9:
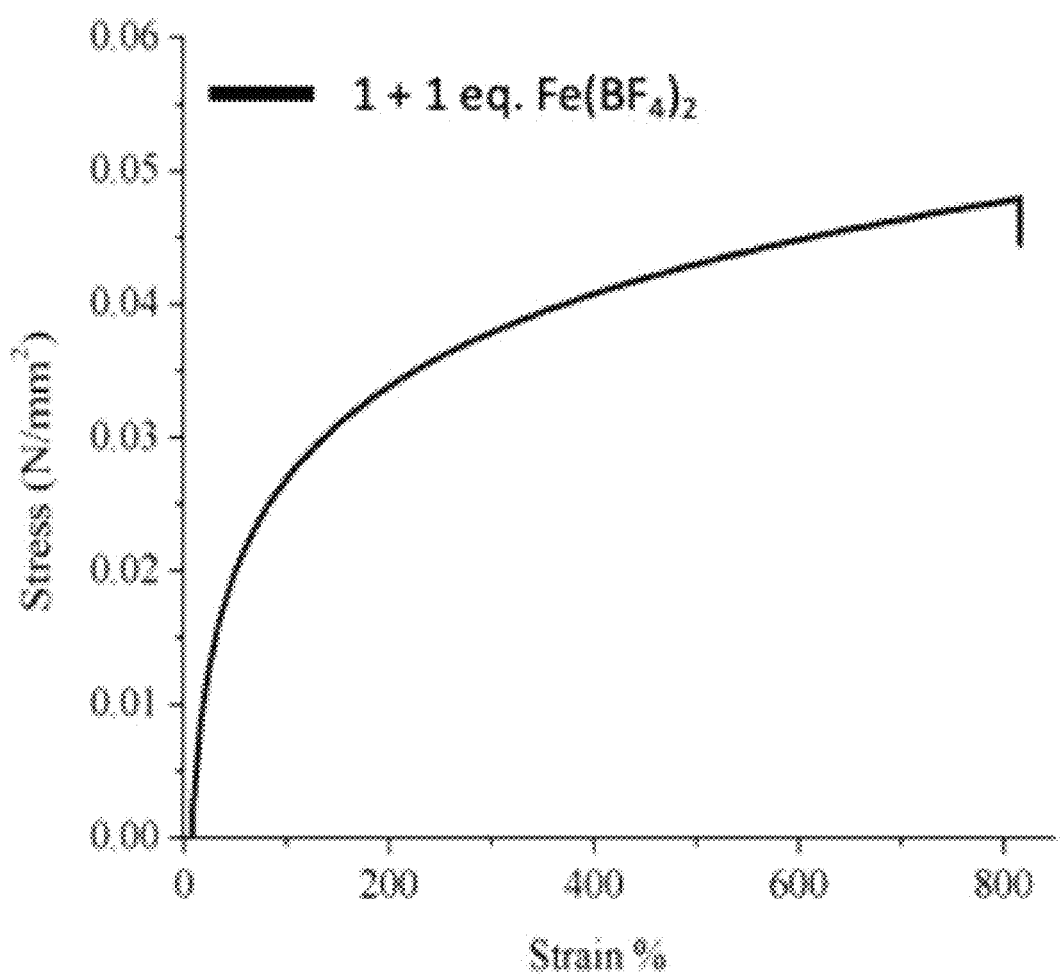
FIG. 9 shows a stress-strain curve for pre-polymer 1 crosslinked with 1 equivalent of Fe(BF$_4$)$_2$.

To demonstrate the versatility of the new dynamic cross-linking system, pre-polymer 1 was also crosslinked with 1 equivalent of $Fe^{2+}$ to allow for a lower crosslinking density. As demonstrated in FIG. 9, the polymer crosslinked with 1 equivalent of metal shown ultra-high stretchability, and a more viscoelastic behavior, ultimately capable to be elongated up to 800% of its initial length without fracturing. The modulus of the resulting crosslinked materials was found to be 0.06 MPa, which is considerably lower than the crosslinked materials with higher amount of Fe ions. This result demonstrates that the crosslinking can be completely tuned by controlling the metal to ligand ratio, thus enabling the preparation of materials with a wide range of mechanical properties and elasticity.

Figure 10:
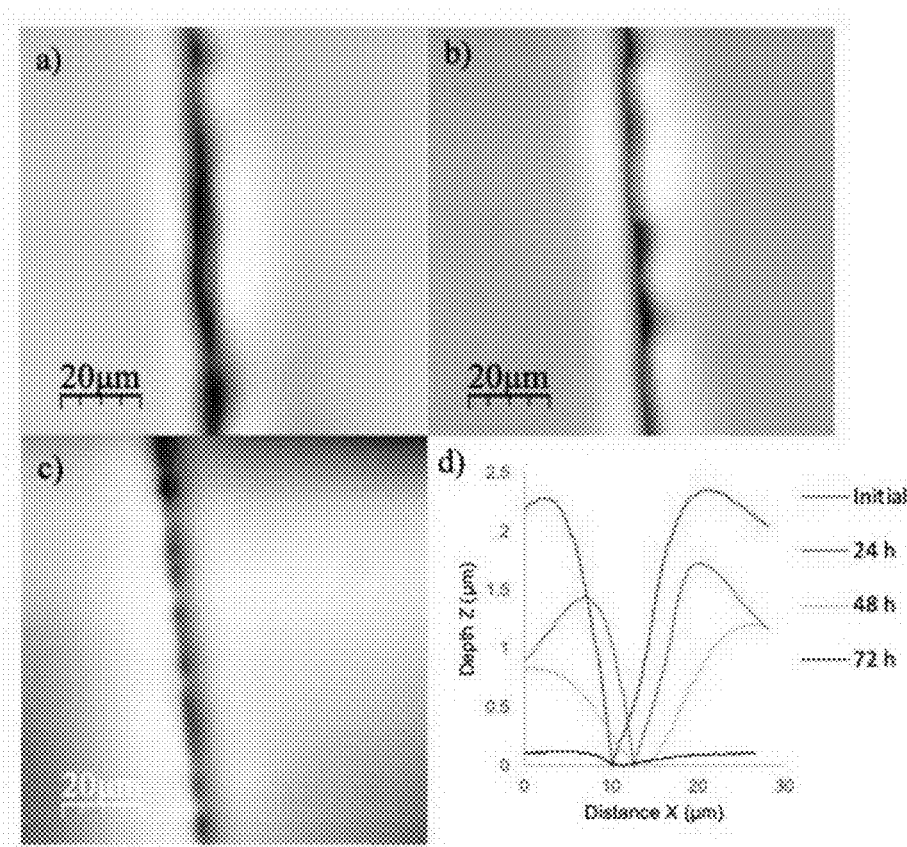
FIG. 10 shows atomic force microscopy (AFM) height images of pre-polymer 1 after Fe(II) coordination, with the upper left image labeled "a)" being a height image after being cut with a razor blade, the upper right image labeled "b)" being a height image after 24 hours of self-healing, the lower left image labeled "c)" being a height image after 72 hours of self-healing, and the lower right portion labeled "d)" showing a depth profile of the damaged zone and its evolution upon self-healing (the scale bar is 20 μm, and no more cut at the nanoscale was observed by AFM after more than 72 hours)

AFM was also used to investigate the self-healing behavior of the new crosslinked materials in thin films, and results are summarized on FIG. 10. The films analyzed were spin coated on a cleaned glass substrate, frozen in liquid nitrogen and carefully cut with a scalpel to damage the surface. The cut samples were then left on the AFM stage on day 0 and measured after 24, 48 and 72 hours of self-healing. Since self-healing can occur when the polymer chains are getting back in close proximity to regenerate the initial dynamic crosslinks, the amount of materials may be important. If the materials is too thin or the cut too large, one can expect that the self-healing may not be optimal given the absence of enough materials to fill the gap and regenerate the initial morphology. Interestingly, the nanoscale crack started to heal after 24 hours and was shown to be almost disappeared after 72 hours, which confirm the efficiency of the self-healing in thin films, even when the quantity of materials to fill up the damaged region is minimal and that the segmental polymer chain mobility is reduced.

Figure 11:
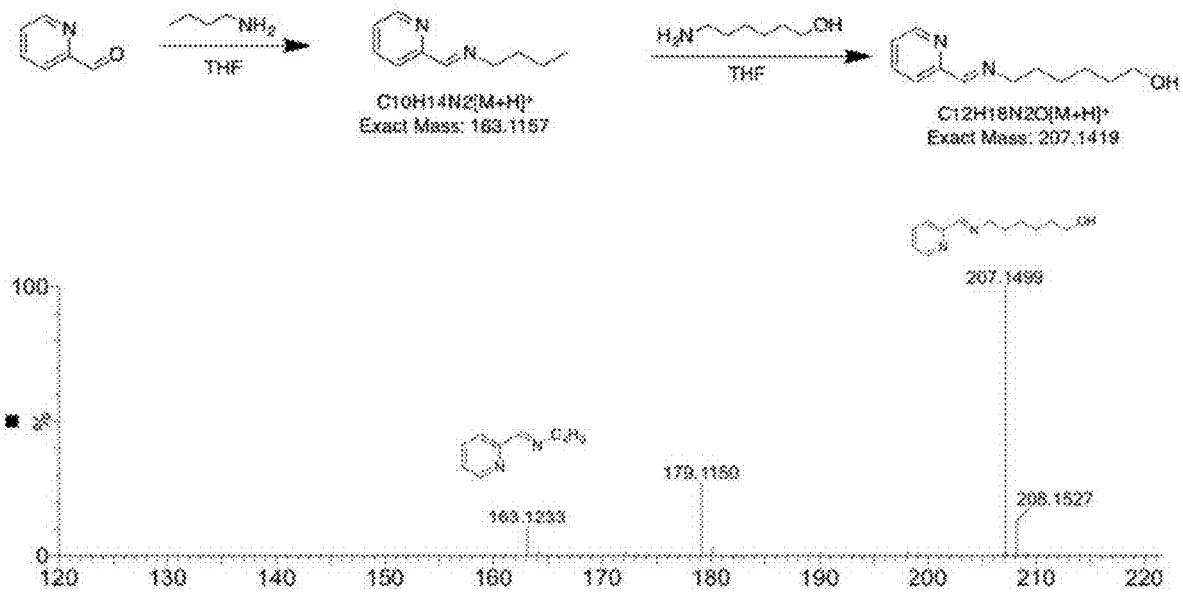
FIG. 11 shows, on the upper portion, preparation of compound (E)-N-butyl-1-(pyridin-2-yl)methanimine and investigation of the dynamic behavior of the imine bond by mass spectrometry (shown on the lower portion, measurements were completed in ASAP(+) sensitivity mode using the crude samples)

It has been appreciated that both imine and metal-ligand bonds are highly dynamic. In order to get insight into the contribution of both dynamic bonds for the self-healing of the current materials, further analysis on a model compound was performed. Specifically, model compound (E)-N-butyl-1-(pyridin-2-yl)methanimine) was synthesized using previously reported procedure (see M. Zeng, L. Li and S. B. Herzon, *J. Am. Chem. Soc.*, 2014, 136, 7058-7067, the entire contents of which are incorporated herein by reference). The compound was then reacted with 6-aminohexan-1-ol in order to probe through mass spectrometry for the formation of an exchange product through transimination. As shown in FIG. 11, a characteristic peak associated to the formation of an exchange product was observed, which confirms the dynamic behavior of the imine bond through bond exchange.

With the ongoing environmental burden caused by the accumulation of non-degradable plastics and e-wastes, there is a growing interest in the design and synthesis of degradable functional materials to address the surge in demand for flexible electronics and sensors. It has been recognized that incorporation of dynamic bonds to chemically crosslink shorter units may be a promising strategy to control and trigger the degradation of materials into shorter sub-units, non-damageable for the environment. Since pre-polymer 1 was shown to efficiently crosslink upon adding metal salts and to generate a dynamic crosslinked network, the investigation of the degradability of the materials was performed in order to determine if the resulting materials could be broken down into smaller siloxane-based units through the hydrolysis of the imine dynamic bonds.

Figure 12:
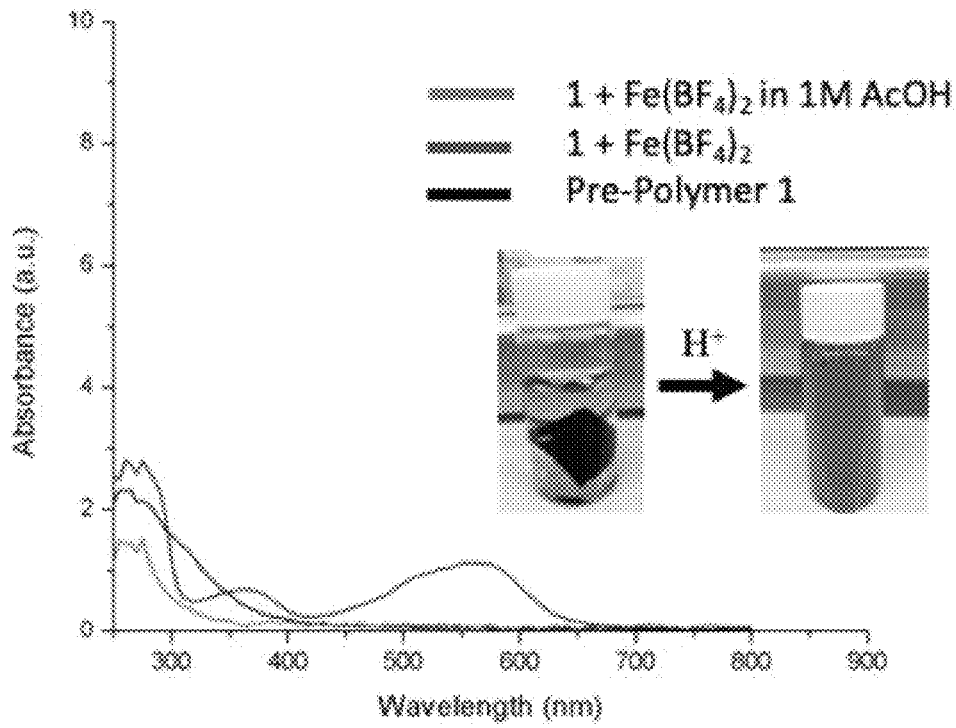
FIG. 12 shows UV-Vis spectra of pristine pre-polymer 1, pre-polymer 1 after Fe coordination and after being stirred in a 1.0 M solution of acetic acid for 48 hours.

Toward that objective, the crosslinked materials (0.33 equivalent of $Fe(BF_4)_2$) were submerged into an acidic aqueous solution (1M acetic acid) and the degradation reaction was probed by UV-V is spectroscopy. Results are summarized in FIG. 12. The mild acidic conditions were selected to match previous reports on the fabrication of transient electronics. The formation of a metal-ligand coordination complex with Fe ions results in the appearance of two strong absorption bands centered at 360 and 545 nm. Upon stirring the materials in 1 M acetic acid aqueous solutions for 24 hours, the solid materials completely lost its characteristic purple color (typically associated with the formation of Fe complexes) and was slowly degraded until complete disappearance and formation of a resulting brown solutions (FIG. 12). This phenomenon was directly observed by UV-Vis, which showed the disappearance of the absorption bands attributed to the Fe complex and the return to the pre-polymer state.

Figure 13:
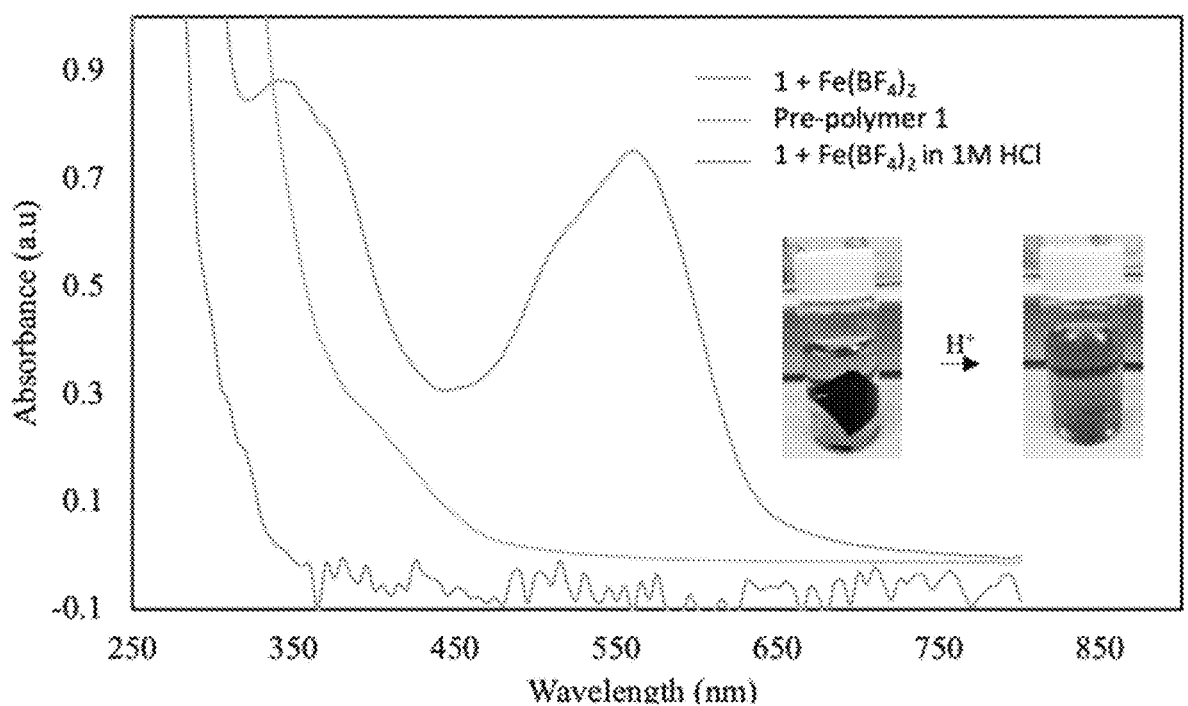
FIG. 13 shows UV-Vis spectra of pristine pre-polymer 1, pre-polymer 1 after Fe(II) coordination and after being stirred in a 1.0 M solution of hydrochloric acid for 4 hours.
Figure 14:
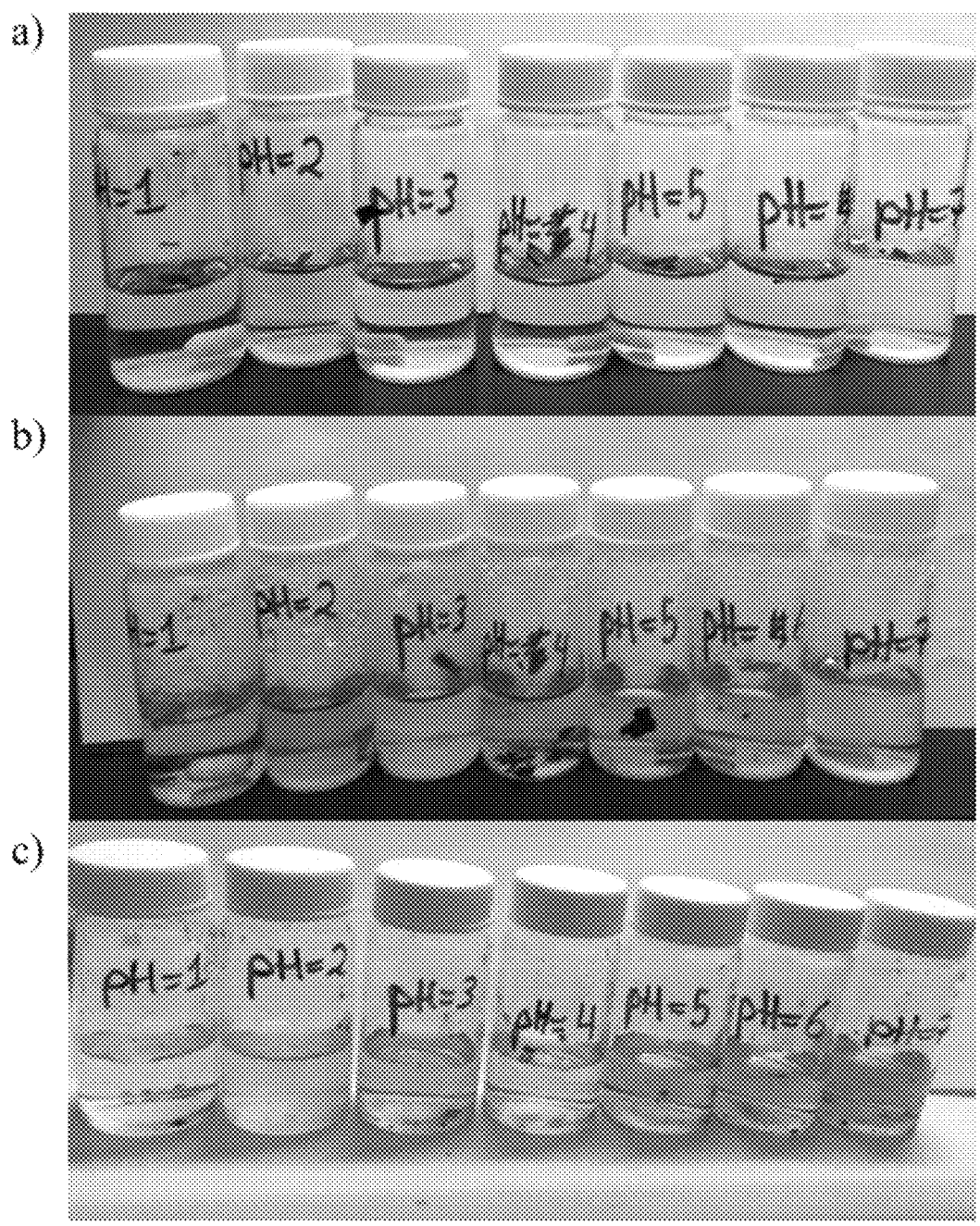
FIG. 14 shows a number of images illustrating degradation of Fe(II)-crosslinked soft polymer at various pH (aqueous HCl solutions), with the upper image labeled "a)" showing initial time, the middle image labeled "b)" showing 24 hours and the bottom image labeled "c)" showing 72 hours of stirring.

In order to probe for the degradability of the new materials under different conditions, a similar experiment was also performed in aqueous hydrochloric acid solutions with pH ranging from 1 to 6 (see FIGS. 13 and 14). Similar to the results obtained with acetic acid, the self-healing polymer was completely degraded after 24 hours for pH=1 to 3, confirmed by UV-Vis spectroscopy. For pH=4 to 7, complete degradation of the crosslinked materials into smaller monomeric units was also observed after 72 hours. Upon degradation at each pH, an oil residue suspended in the aqueous solution was observed, which was further confirmed to be starting siloxane-based precursors. This simple experiment confirmed the possibility to control and activate the degradation of the new materials, thus enabling new opportunities for the design of degradable, yet robust, technologies. This property may be promising for development of transient electronic materials and the possibility to degrade electronic devices.

Figure 15:
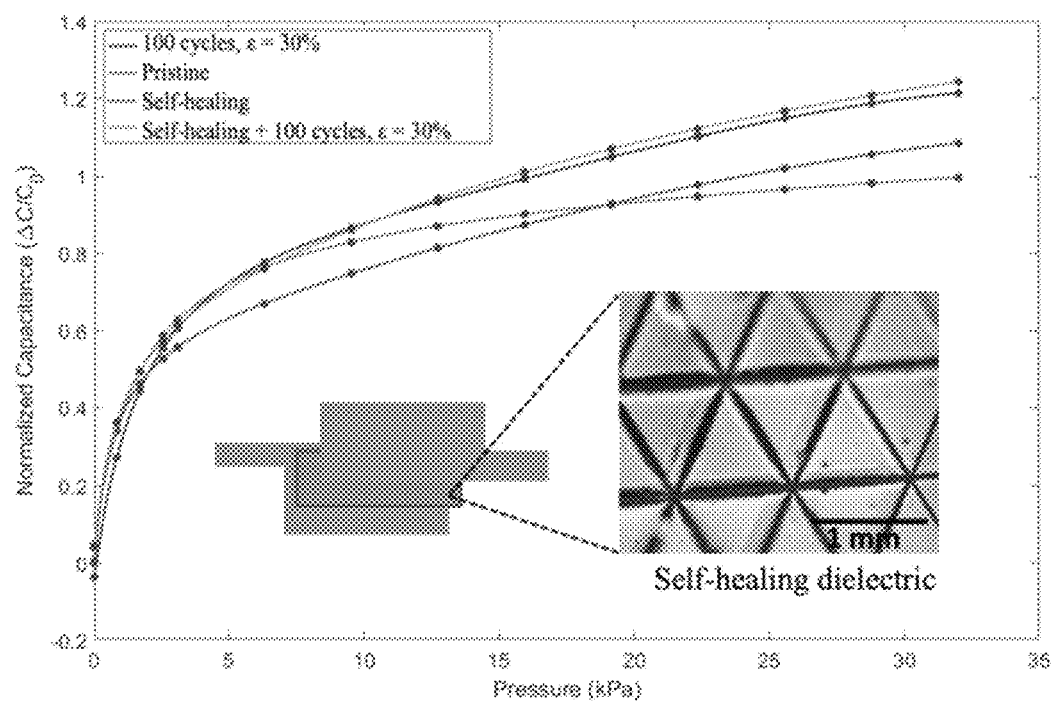
FIG. 15 shows normalized sensitivity curves for capacitance-based pressure sensor using self-healing polymer as dielectric layer, where the sensors were varied in terms of the conditions of dielectric materials, i.e., pristine, healed and stretched to 30% strain for 100 cycles, and further shown in the lower right portion is an optical microscope image showing the dielectric structuring and device design.
Figure 16:
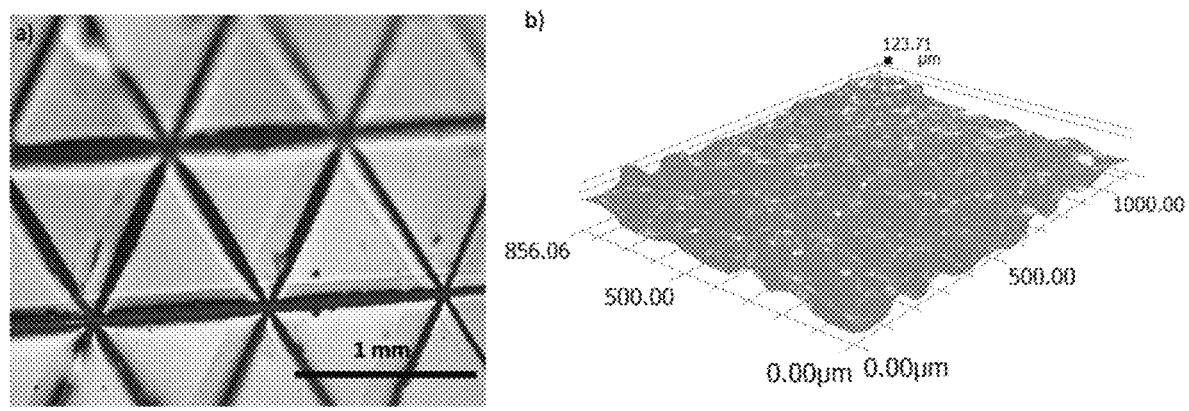
FIG. 16 shows on the left portion labeled "a)" a two-dimensional optical microscope image of dielectric structures and on the right portion labeled "b)" a three-dimensional image of dielectric structures.

In order to demonstrate the application of the new autonomous self-healing of the siloxane-based materials, flexible and self-healable pressure sensors were fabricated, and results are summarized in FIG. 15. In order to determine the sensitivity of the capacitance-based pressure sensor, a force actuator was connected to a force meter to apply a range of pressures ranging from 0 to 32 kPa. Results were measured and averaged from three pressure sensor devices. Since device sensitivity to small variation of pressure relies on the deformation of the dielectric materials upon pressure, microstructuring of the dielectric self-healing materials (0.33 equivalent of $Fe(BF_4)_2$) was performed by following a method previously described in B. Grzybowski, D. Qin, R. Haag and G. M. Whitesides, *Sensors Actuators B. Chem.*, 2000, 81-85 (see FIG. 16). These microstructures are important in increasing device sensitivity since they provide for multiple points along the device able to elastically respond to pressures applied. Additionally, these structures provide for air gaps that can be replaced by the dielectric material once compressed from pressure applied which in turn, increases the dielectric constant and capacitance signal recorded according to the following equation $C=\varepsilon_0\varepsilon_r S/\delta$ where C is capacitance which is governed by the free-space permittivity $\varepsilon_0$, $\varepsilon_r$ the relative permittivity and S and $\delta$, the area of the conducting planes and the distance between them, respectively. In order to reassure that these materials are able to regenerate after fracture, each device was cut into half after initial pressure sensitivity measurements and allowed to heal over a 48-hour period in order to be retested.

Figure 17:
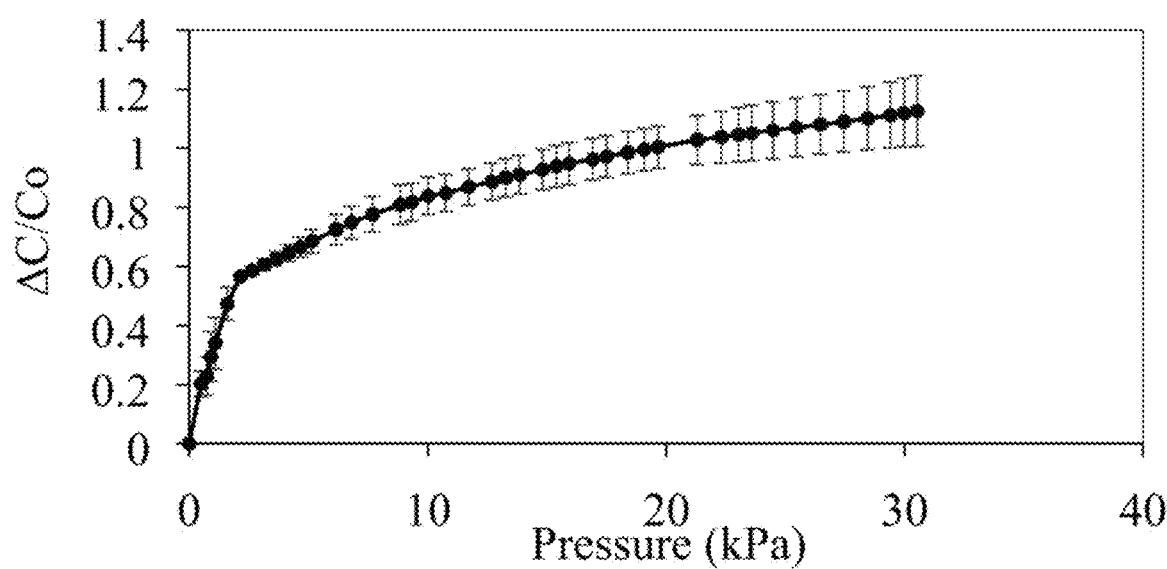
FIG. 17 shows standard deviation between devices sensitivity, with the devices having dielectric self-healing polymer that is pristine, subjected to 100 cycles at 30% strain, cut and healed for 24 hours, and cut and healed after 100 cycles at 30% strain (sensitivity is averaged over 4 devices)

According to our results, the device maintained its mechanical and electrical properties to give approximately the same sensitivity (0.33 $kPa^{-1}$) over four trials where the samples were either pristine, strained 30% for 100 cycles, self-healed and self-healed followed by 30% strain for 100 cycles. The fact that the capacitive devices were able to maintain a good sensitivity after healing and 30% strain for 100 cycles confirmed the strong potential of the new tunable system for the design of wearable electronics human skin is typically known to experience a 30% strain elongation. These devices may self-heal after simply pressing the two halves back together and let rest at room temperature without any other external factors. An average change in capacitance change versus average pressure applied curve was constructed in order to demonstrate the small standard deviation between the 4 devices with different test conditions (see FIG. 17).

Figure 18:
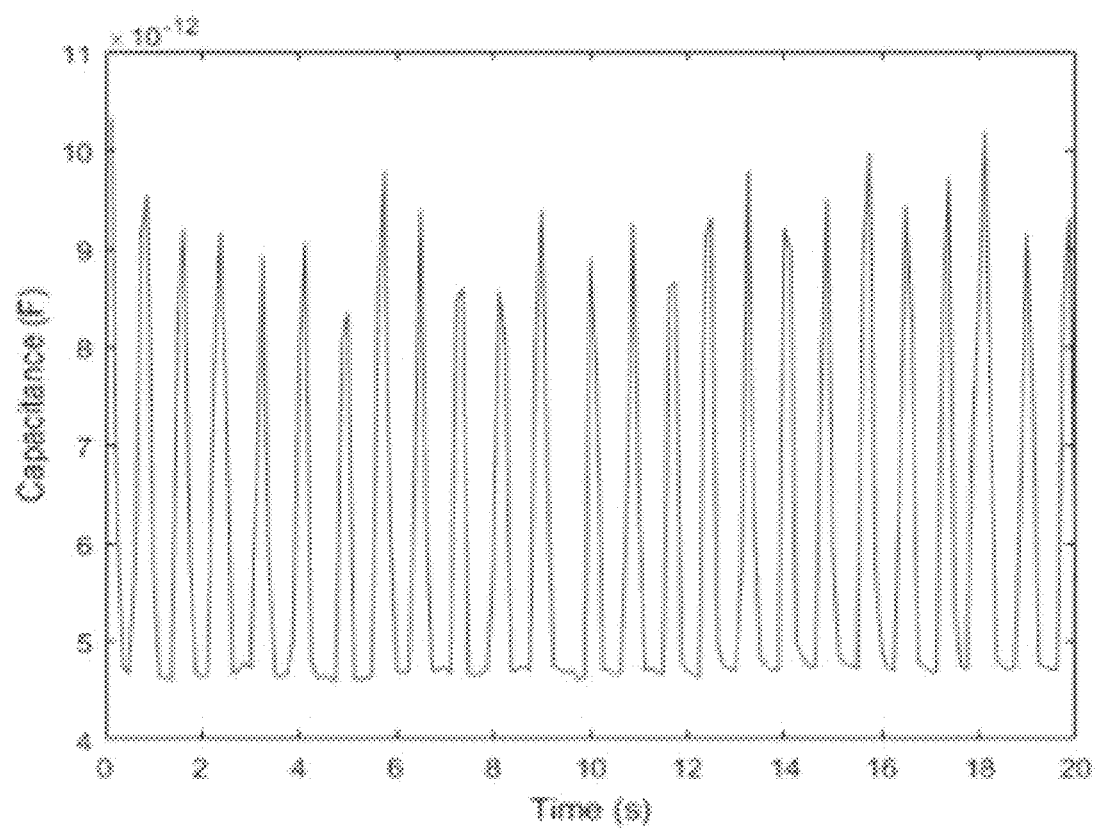
FIG. 18 shows dynamic sensor response of a pristine sensor, when subjected to simple repetitive finger tapping for a time range of 20 seconds.
Figure 19:
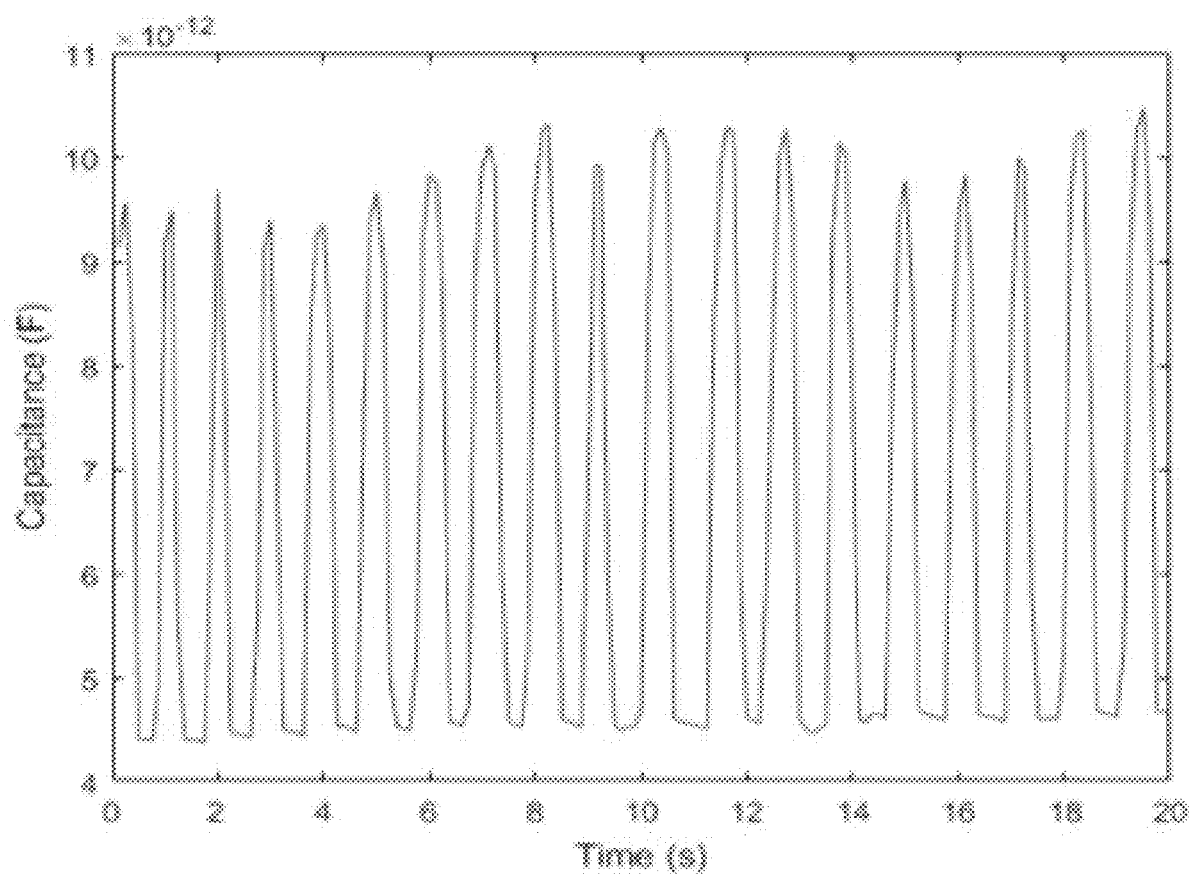
FIG. 19 shows dynamic sensor response of a healed sensor, when subjected to simple repetitive finger tapping for a time range of 20 seconds.
Figure 20:
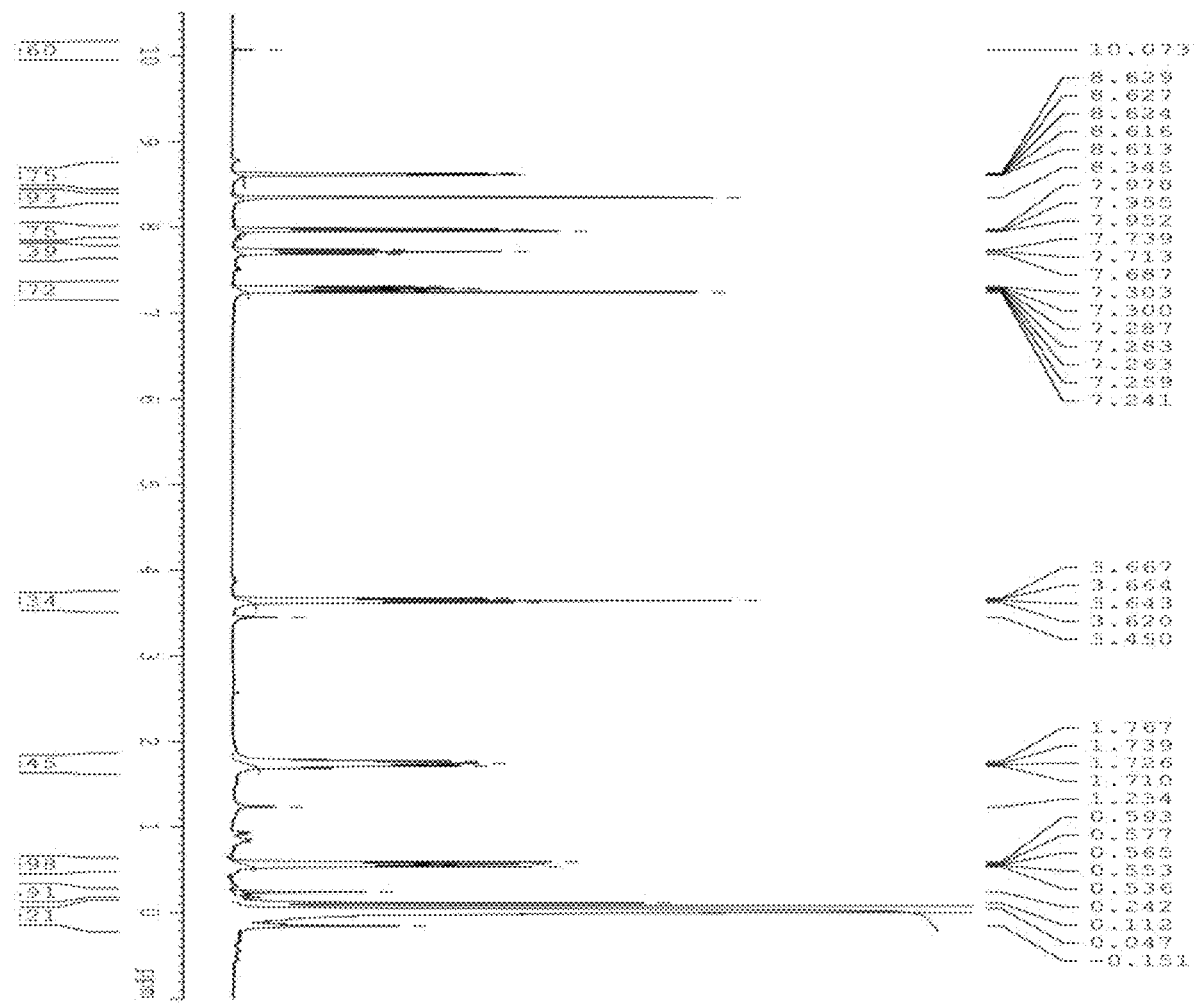
FIG. 20 shows $^1$H NMR spectrum of pre-polymer 1 in $CDCl_3$ before purification.
Figure 21:
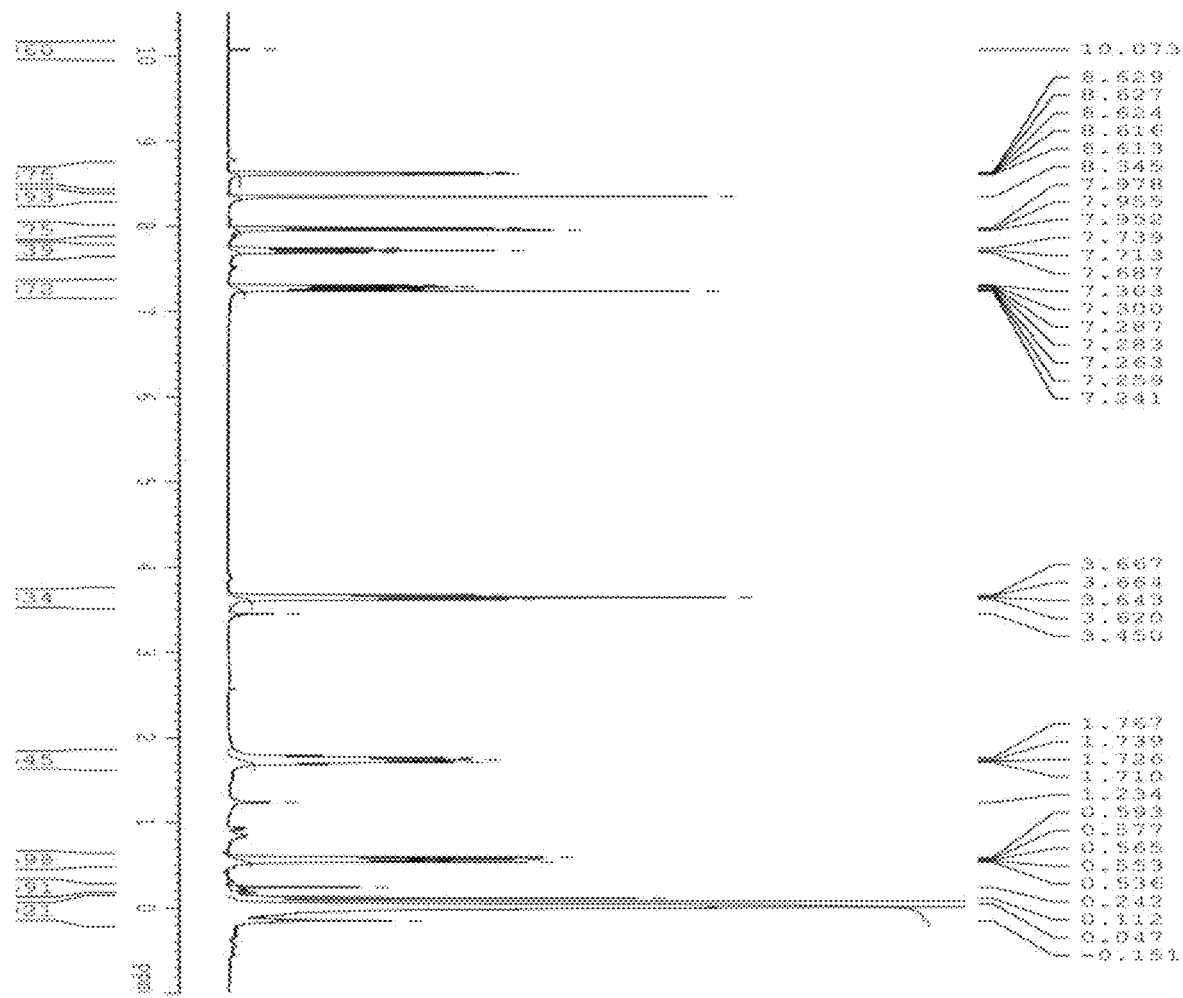
FIG. 21 shows $^1$H NMR spectrum of pre-polymer 1 in $CDCl_3$ after purification by liquid extraction with hexanes/MeCN.
Figure 22:
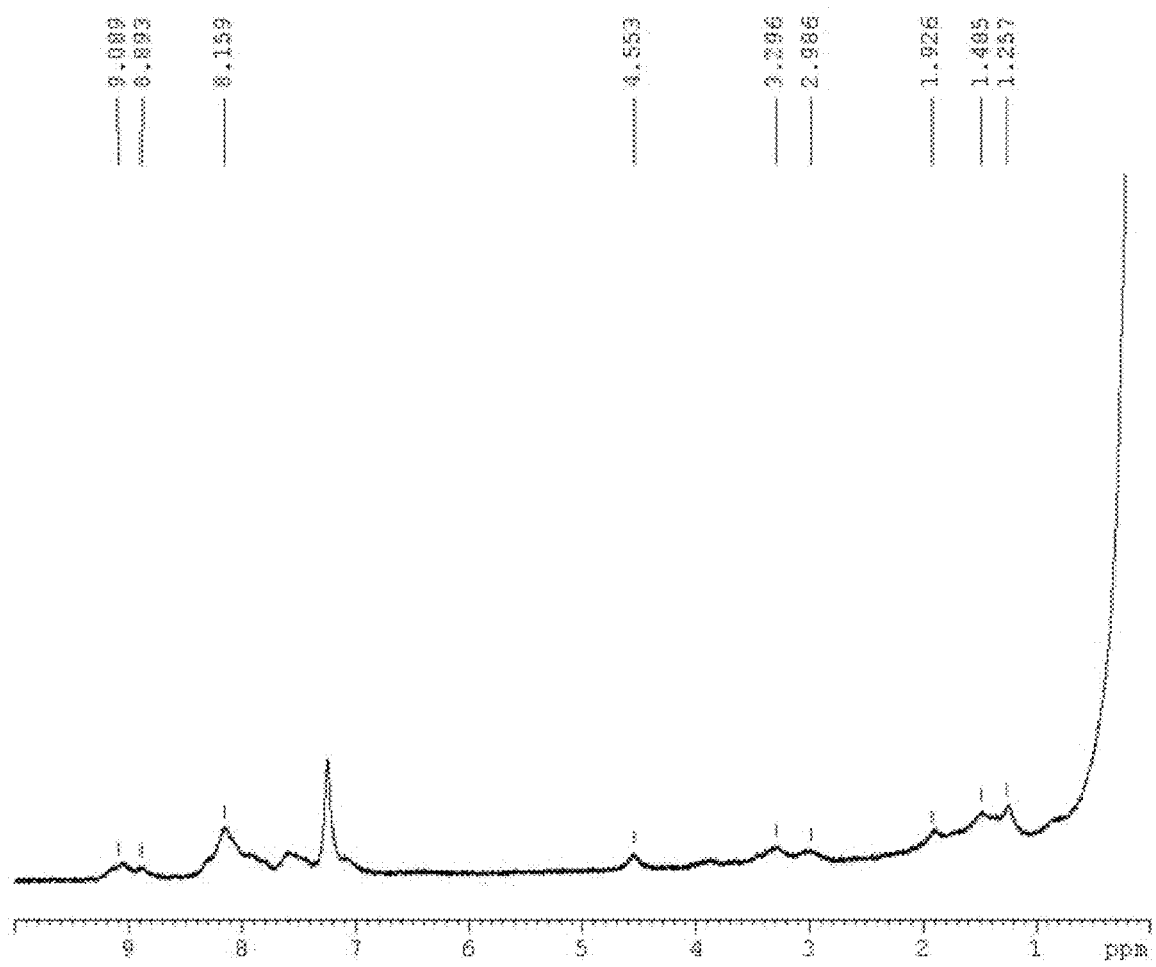
FIG. 22 shows $^1$H NMR spectrum of pre-polymer 1 crosslinked with Fe(II) in $CDCl_3$.

Dynamic sensor data was also collected to show the response ability of the sensor before versus after healing of the dielectric layer (see FIGS. 18 and 19, respectively). A consistent finger tapping pressure was applied to the device for a 20-second interval. Data was collected every 100 ms. Interestingly, the sensor maintained a relatively constant response before and after healing, with the base capacitance varying from 4.5 to 5 pF and reaching 9.5 to 10 pF once the weight was placed. As shown in Table 1 below, the capacitive pressure sensors fabricated from the new self-healing polymeric system have a sensitivity comparable to devices prepared from more common elastomer and dielectric.

| Materials | Sensitivity | Healability | Degradability/ Stretchability | Ref. |
| --- | --- | --- | --- | --- |
| Fe-crosslinked siloxane oligomers (this work) | 0.33 $kPa^{-1}$ | Autonomous | IM AcOH, $\varepsilon$ = 800% | — |
| Calcium carbonate, polyacrylic acid and alginate | 0.17 $kPa^{-1}$ | Autonomous | $\varepsilon$ = 55% | 64 |
| PDMS | 1.0 $kPa^{-1}$ | No | — | 65 |
| PDMS | 0.28 $kPa^{-1}$ | No | — | 66 |
| Polyurethane | 1.9 $kPa^{-1}$ | Non-autonomous | — | 67 |

However, the new system may permit tunability, thus leading to a wide variety of properties, including self-healing, degradability and ultra-high stretchability. Moreover, the complexity of the system may be reduced, as well as the cost of preparation, which may be an important advantage for large-scale applications.

Conclusion

A new approach towards autonomously self-healing was developed through rational design of siloxane-based oligomers with imine and metal-coordination moieties. This unique combination of dynamic bonds was achieved by preparing soft polymers by a facile condensation reaction between amino-terminated siloxanes and pyridine carboxaldehyde. The resulting materials were crosslinked with Fe(II) salts, crosslinking that can be easily tuned by controlling the amount of metal used. Interestingly, the new polymer was shown to be ultra-highly stretchable when a 1:1 Fe/polymer ratio was used, reaching a maximum tensile strain before fracture of 800%. The samples prepared with 0.33 equivalents of $Fe^{2+}$ showed autonomous intrinsic self-healing and were able to regenerate 88% of their initial mechanical properties after 48 hours without aid from any external stimuli. The materials were also shown to be degraded into small oligomeric species in acidic conditions, thus opening the way for a controlled degradability.

Since the new materials are particularly interesting as a component for self-healable electronics, the new polymer was used as a dielectric in self-healable capacitive-based pressure sensors. The dielectric was structured at the microscale to enhance device sensitivity in a pressure range of 0-32 kPa. The device was completely characterized before and after self-healing, and after multiple cycles of 30% strain conditions to investigate the performance of the self-healing dielectric. Our results demonstrate no significant deviation in terms of device sensitivity of the lower range of pressure applied (0-5 kPa), with a sensitivity of ~0.33 $kPa^{-1}$. Additionally, the dynamic testing of our sensor showed good response time and accuracy. Based on their low cost, high tunability and simple preparation, it is envisioned that this dynamic polymer system may provide new opportunities for the creation of next-generation stretchable electronics that require improved material robustness, degradability, conformability and durability to improve lifespan and performance of electronics.

Figure 23:
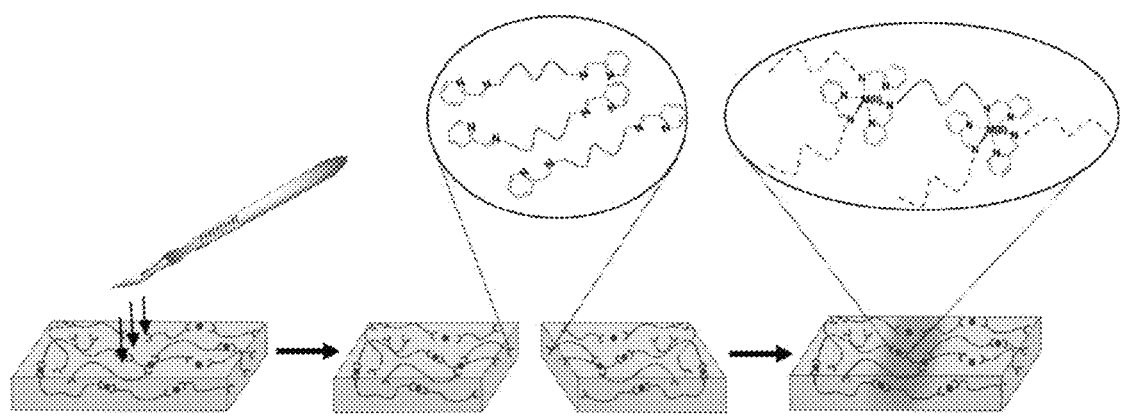
FIG. 23 shows a graphical illustration of self-heating of a siloxane-based soft polymer in accordance with a preferred embodiment of the present invention (before and after physical cutting) through metal coordination.

In separate studies, other self-healing materials were prepared, based on end-capped PDMS-based oligomers with N-ligands, and were tested for rational fine-tuning of their self-healing efficiency and thermomechanical properties through the variation of the nature of the metal-ligand interactions used (see FIG. 23 for illustration of self-healing). More specifically, prepolymer P1 (Scheme S1) was coordinated with different metal sources, including Fe $(BF_4)_2$, $Co(BF_4)_2$, $Zn(BF_4)_2$, $Zn(OTf)_2$ and $Zn(ClO_4)_2$.

These were selected to probe for the effect of coordination geometry and bond strengths on the thermomechanical properties. Moreover, through this evaluation, effect of the counter-ion on the self healing properties was also assessed. The results obtained through this investigation revealed a correlation between coordination bond strength and geometry and self-healing properties of the materials. The fine-tuning of the materials' self-healing efficiency was shown, ranging from 60% to 80% after only 2 hours for cobalt and zinc-crosslinked materials, respectively. Furthermore, the Young's modulus was also fine-tuned, reaching a minimal value of 0.23 MPa, by varying the nature of the counter-ion used in complexation. This tunable approach to self-healing materials highlights the effect of dynamic metal-ligand crosslinking toward self-healing soft polymers. Furthermore, this system may provide for a simpler, lower-cost yet effective method for obtaining a wide range of self-healing materials that can be used for various applications.

Experimental Section

Materials: Commercial reactants were used without further purification unless stated otherwise. All the solvents used in these reactions were distilled prior to use. Pre-polymer P1 was prepared from pyridine-2-carboxaldehyde and amino-propyl-terminated polydimethylsiloxane with a molecular weight of 1000 Da and a dispersity of 1.33 (purchased from Gelest, Pa., USA) as previously reported (J. Pignanelli, B. Billet, M. Straeten, M. Prado, K. Schlingman, M. J. Ahamed and S. Rondeau-Gagne, Imine and metal-ligand dynamic bonds in soft polymers for autonomous self-healing capacitive-based pressure sensors, Soft Matter, 2019, 15, 7654-7662, the entire contents of which are incorporated herein by reference). Iron(II) tetrafluoroborate hexahydrate, cobalt(II) tetrafluoroborate hexahydrate, zinc tetrafluoroborate hydrate, zinc trifluoromethanesulfonate and zinc perchlorate hexahydrate were purchased from Sigma-Aldrich and used as received.

Measurements and characterization: UV-Visible spectroscopy was performed on a Varian UV/Visible Cary 50 spectrophotometer. Calorimetric studies were conducted on a TA instruments DSC2500 and thermal gravimetric analysis was Scheme S1

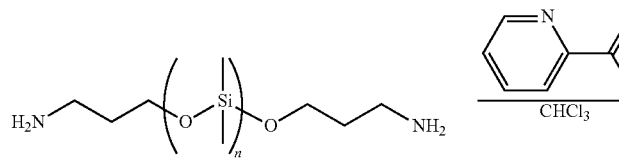

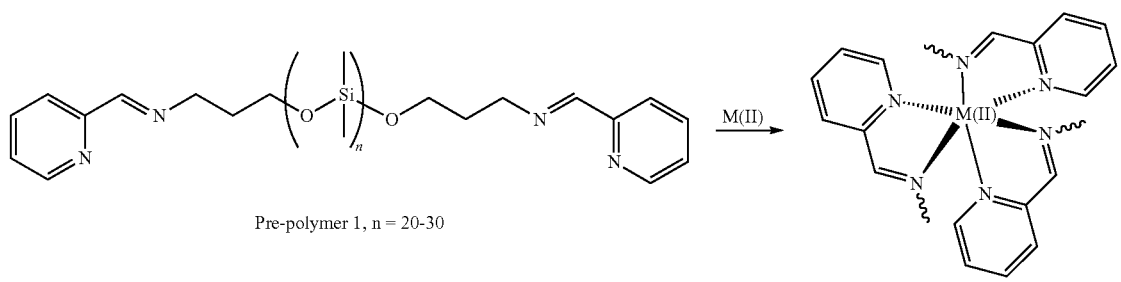

Pre-polymer 1, n = 20-30 performed on a TA instruments TGA5500. Nitrogen (99.999%) was used to purge the systems at a flow rate of 60 mL min$^{-1}$. All samples were placed and run in aluminum crucibles. TGA samples were held at 25° C. for 30 min before being heated to 500° C. at a rate of 10° C. min$^{-1}$. Sample preparation: Pre-polymer P1 was solubilized in dichloromethane, filtered on a 0.45 mm filter, and crosslinked with Fe(BF$_4$)$_2$, Co(BF$_4$)$_2$, Zn(BF$_4$)$_2$, Zn(ClO$_4$)$_2$ or Zn(OTf)$_2$. The resulting materials were cast into a custom-made dog-bone shaped PTFE mold with dimensions in accordance to the ASTM standard for thermoplastic elastomers (ASTM D412). Once a gel was formed, the samples were placed in a vacuum oven at 50° C. and left to dry for 48 hours. Once dried, the samples were slowly peeled off and used directly for further characterization.

Evaluation of self-healing properties: Self-healing was evaluated by using a flat molded sample which was cut in half with a blade, pressed back together and left to heal for 2 hours before being characterized. Tensile-strain analysis was performed on an Instron Tensile Strain instrument with a test rate of 5 mm min$^{-1}$.

Results and Discussion

The synthesis of pre-polymer P1, for use toward self-healing materials, is depicted in Scheme S1 noted above. The materials were prepared through simple condensation between aminopropyl terminated polydimethylsiloxane (1000 Da) with pyridine-2-carboxaldehyde to generate N-ligands from pyridine and imine functional groups as end groups. Materials were used without further purification, and were characterized by thermogravimetric analysis (TGA) and differential scanning calorimetry (DSC) (see FIGS. 36 to 45). Thermogravimetric analysis (TGA) confirmed that all materials, independent of the metal salt used for crosslinking, are stable at temperatures up to 150° C. (see FIGS. 36 to 40). As expected, DSC experiments confirmed that all materials have a T$_g$ well below room temperature, typical for PDMS-like materials. In fact, for all materials, independent of the metal used, no T$_g$ has been observed, indicating that the metal used for crosslinking does not have enough influence to significantly affect this parameter (see FIGS. 41 to 45). This phenomenon may be attributed to the low molecular weight (1000 Da) of the pre-polymer, and that materials are crosslinked through supramolecular interactions which are weaker than the covalent bonds typically used for crosslinking of siloxane-based polymers.

To compare the metal-ligand coordination effect on the thermomechanical properties of the system, Co(BF$_4$)$_2$, Fe(BF$_4$)$_2$ and Zn(BF$_4$)$_2$ metal salts were used. The effect of the counter-ion was probed by utilizing Zn(ClO$_4$)$_2$, Zn(OTf)$_2$ and Zn(BF$_4$)$_2$ salts. For all samples, 0.33 equivalents of the metal salt were used in solution to generate the metal-coordinated polymer. Metal-ligand interactions were selected as a dynamic crosslinking strategy for their possible reversibility. Upon stress, the metal-ligand interactions may dissipate energy through rupture of the coordinate bond. However, due to the kinetic lability of the bonds, the supramolecular interaction may reform upon release from strain. In general, the weaker the metal-ligand interaction (more kinetically labile chain and better ability to dissipate energy), the faster the bonds are able to reform. It has also been appreciated that imine bonds may be dynamically reversible, also playing a role in the self-healing ability of this system.

Figure 24:
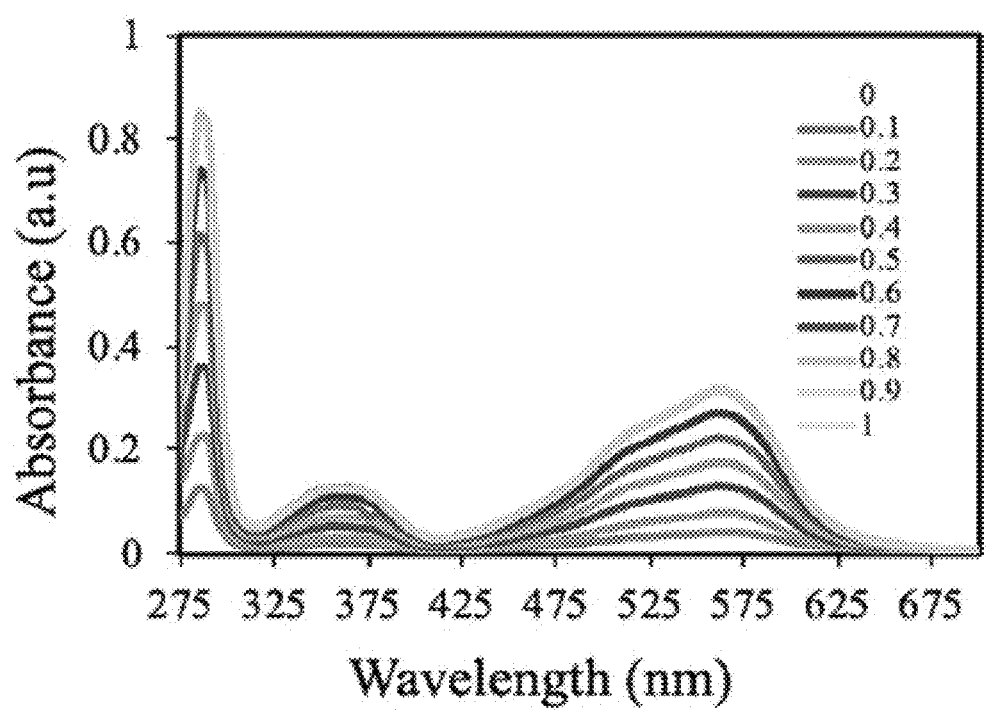
FIG. 24 shows a UV-vis absorption spectrum of a pre-polymer P1 in $CH_2Cl_2$ upon titration of 0.1 molar equivalent of $Fe(BF_4)_2$ ($4.4 \times 10^{-5}$ mM) per N-ligand in the pre-polymer P1 ($7.2 \times 10^{-7}$ mM)
Figure 25:
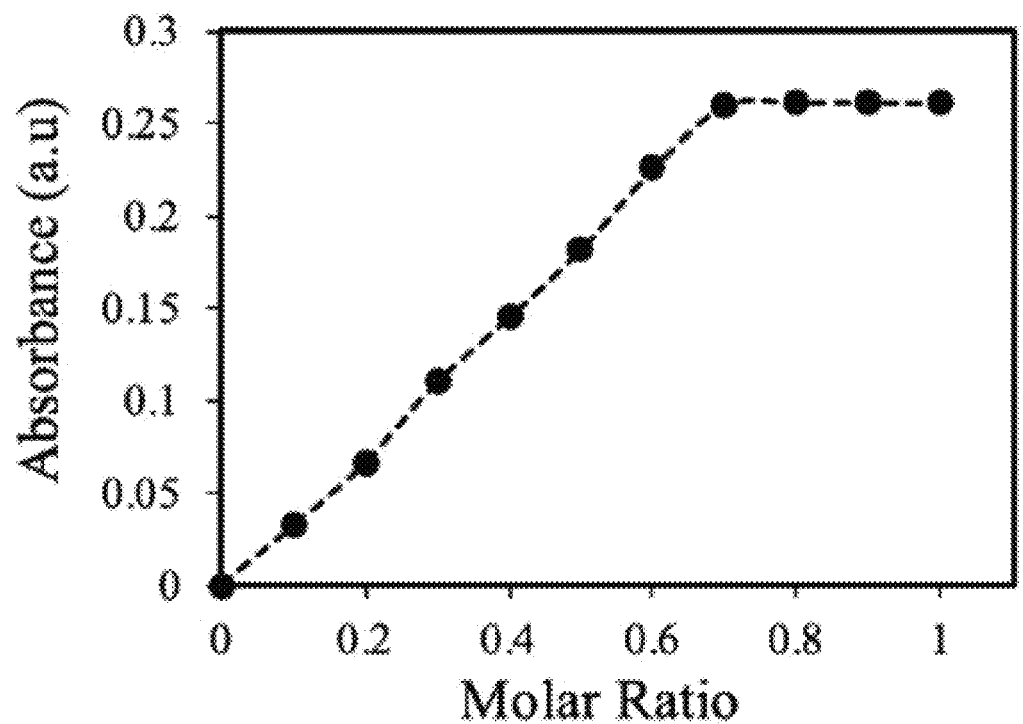
FIG. 25 shows a line graph of a molar ratio of $Fe(BF_4)_2$ (x-axis) versus absorbance at 530 nm (y-axis)
Figure 26:
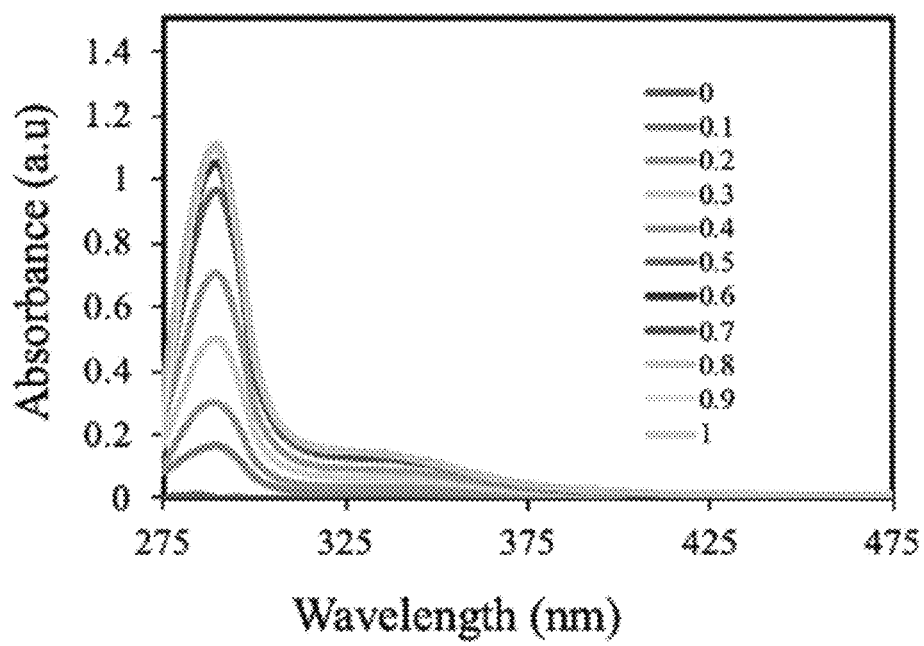
FIG. 26 shows a UV-vis absorption spectrum of a pre-polymer P1 in $CH_2Cl_2$ upon titration of 0.1 molar equivalent of $Co(BF_4)_2$ ($4.4 \times 10^{-5}$ mM) per N-ligand in the pre-polymer P1 ($7.2 \times 10^{-7}$ mM)
Figure 27:
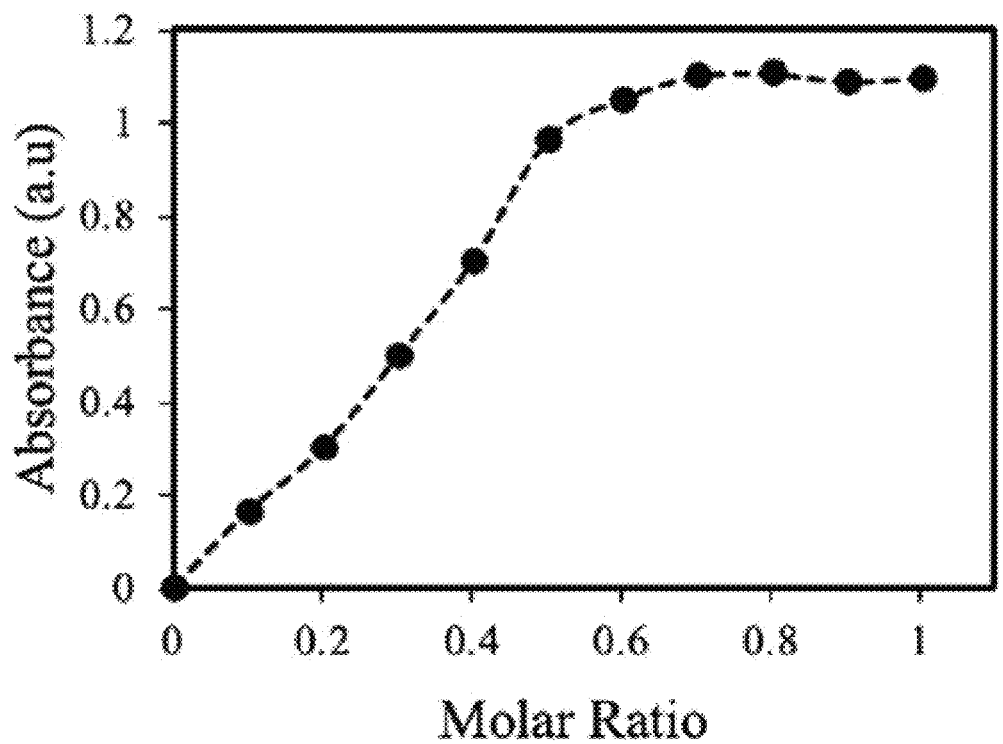
FIG. 27 shows a line graph of a molar ratio of $Co(BF_4)_2$ (x-axis) versus absorbance at 290 nm (y-axis)
Figure 28:
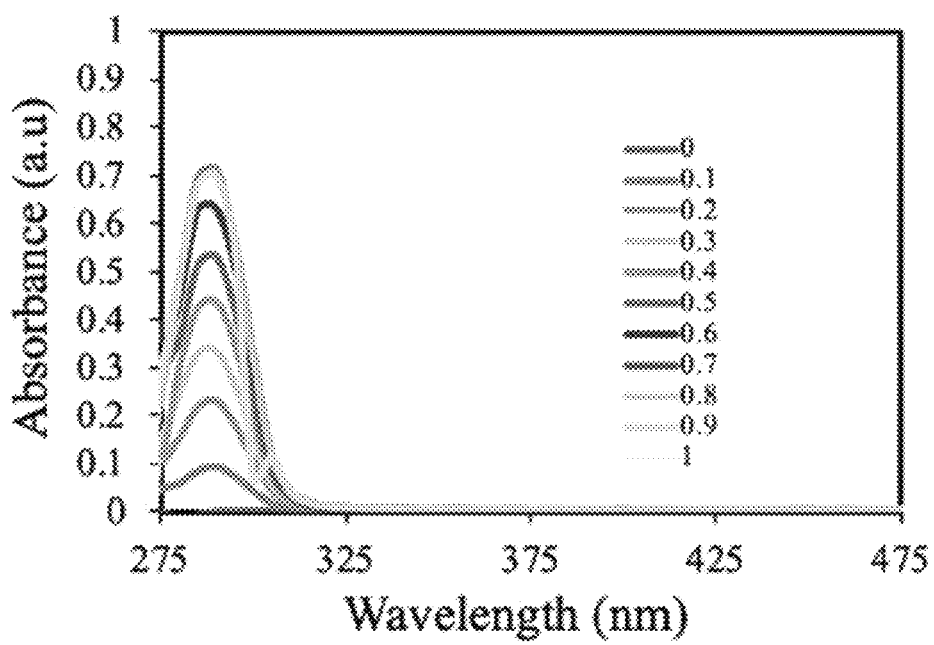
FIG. 28 shows a UV-vis absorption spectrum of a pre-polymer P1 in $CH_2Cl_2$ upon titration of 0.1 molar equivalent of $Zn(BF_4)_2$ ($4.4 \times 10^{-5}$ mM) per N-ligand in the pre-polymer P1 ($7.2 \times 10^{-7}$ mM)
Figure 29:
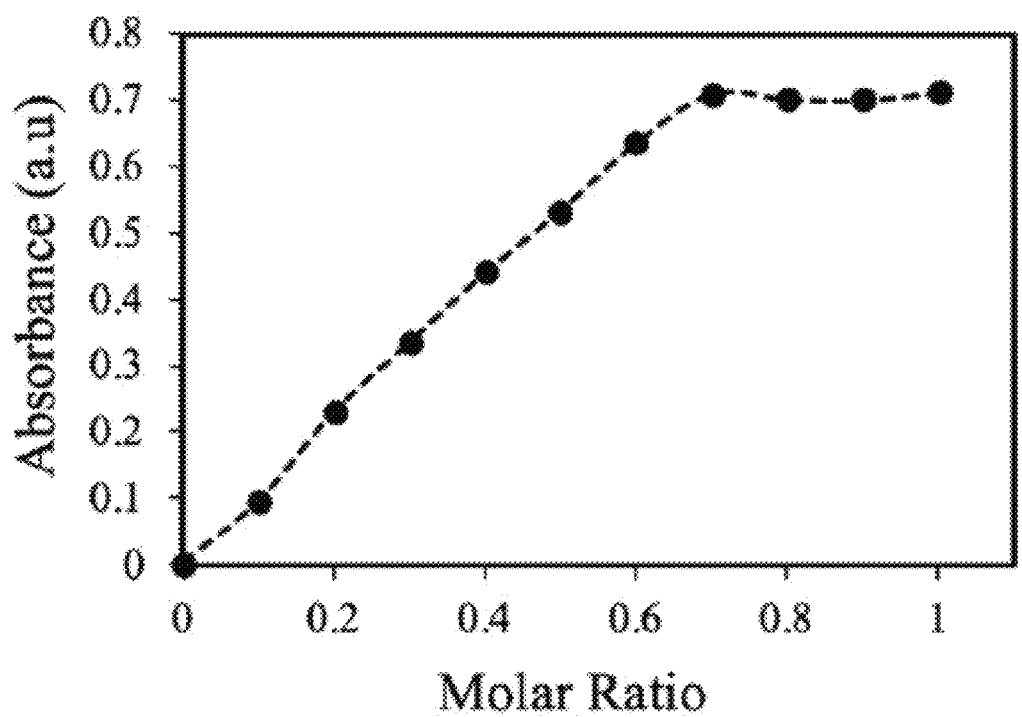
FIG. 29 shows a line graph of a molar ratio of $Zn(BF_4)_2$ (x-axis) versus absorbance at 290 nm (y-axis)

UV-Visible spectroscopy was first used to confirm metal coordination and to determine the coordination stoichiometry of pre-polymer P1 and each metal center. Specifically, UV-Visible absorption spectroscopy gives access to characteristic charge-transfer bands, which can be directly correlated with the coordination. This technique was also used to gain insight into the crosslinking density, as the dynamic nature of the crosslinks (potential exchange between solvent molecules and ligands) significantly complicates the utilization of other techniques such as polymer swelling or nuclear magnetic resonance (NMR). Progressive titration experiments can then be used to determine the coordination stoichiometries. UV-Visible spectroscopy was performed for all metal sources and the results are summarized in FIGS. 24 to 29, 46 and 47. Independent of the metal used to crosslink the soft polymer, a strong absorption band centered at around $\lambda$=285 nm was observed, attributed to the $\pi$-$\pi$* transition of the end-capped PDMS chains. As shown in FIG. 24, the coordination of Fe(BF$_4$)$_2$ with pre-polymer P1 resulted in two absorption bands centered at $\lambda$=350 nm and $\lambda$=550 nm, attributed to the characteristic metal-ligand charge transfer (MLCT) band of a Fe$_{(II)}$ complex. As shown in FIG. 25, the titration experiment resulted in a 2:3 Fe$_{(II)}$: P1 ratio, which is consistent with the formation of octahedral complexes. As a result of the bidentate nature of P1, with each molecule having 2 coordination sites, each metal is fully coordinated by the terminal N-ligands when 0.667 molar equivalents of the metal salt are used. The utilization of Co$_{(II)}$ sources led to a similar coordination geometry and stoichiometry, with the maximum absorbance occurring at $\lambda$=290 nm as observed in FIGS. 26 and 27 with the appearance of an absorption band centered at around $\lambda$=320 nm, characteristic of the MLCT for Co$_{(II)}$ complexes. As shown in FIGS. 28 and 29, the coordination of Zn$_{(II)}$ sources with P1 also led to similar results, with an absorption band observed at $\lambda$=290 nm and a 2:3 Zn$_{(II)}$: P1 ratio, characteristic of MLCT for Zn$_{(II)}$ complexes. This observation suggests the formation of octahedral complexes with Zn$_{(II)}$. Therefore, independent of the M$_{(II)}$ source, pre-polymer P1 generated octahedral metal complexes that crosslinked the polymer chains into a supramolecular network. Having similar crosslinking density and geometry, this result also confirms this system may be appropriate for evaluating the self-healing efficiency, which can be directly attributed to the metal-ligand bond strength and counter-ion effect, independent of coordination geometries.

Figure 30:
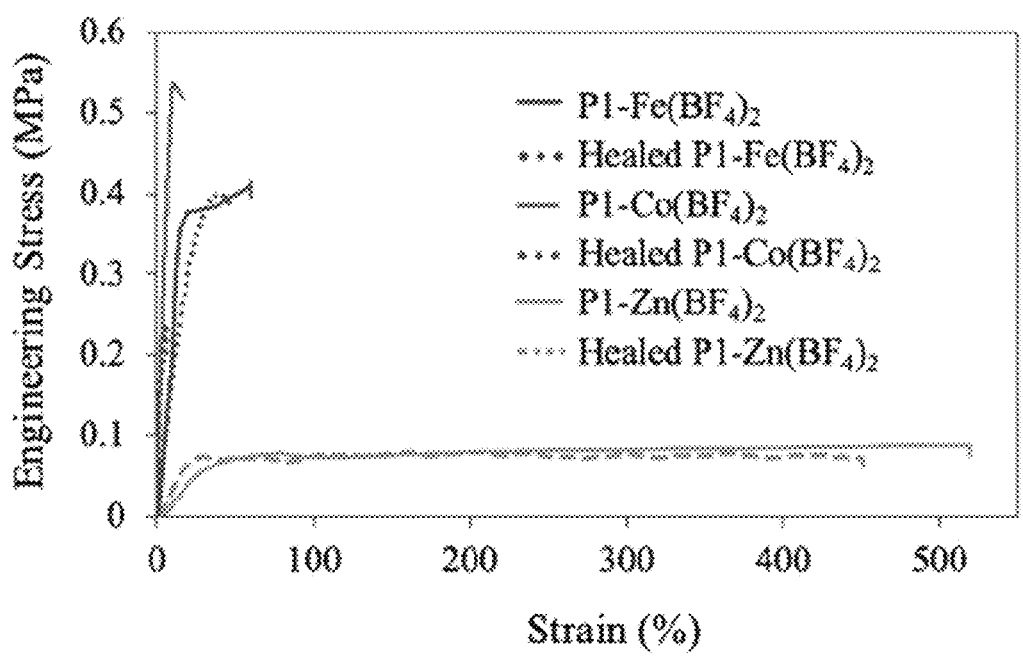
FIG. 30 shows a stress-strain curve of a pre-polymer P1 crosslinked with 0.33 equivalent of Fe(II), Zn(II) or Co(II) before and after self-healing at room temperature for 2 hours, with the x-axis showing strain in percent and the y-axis engineering stress in MPa.

After confirming the coordination of metals and the geometry of the resulting complexes, a detailed investigation of the mechanical properties was performed in order to unveil the effect of the coordination motif on self-healing. To perform this investigation, samples of P1 crosslinked with Fe(BF$_4$)$_2$, Co(BF$_4$)$_2$ or Zn(BF$_4$)$_2$ were prepared in solution and cast into a PTFE mold. The resulting materials were dried at room temperature for 24 hours to remove any solvent residue. First, tensile-strain pull tests were performed on the soft crosslinked materials with different metals (Fe, Co and Zn) to gain insight into the maximal fracture strain, and the results are shown in FIG. 30. Interestingly, despite showing similar coordination geometry for metal-ligand complexes, the metal center selected was shown to have an effect on maximum elongation before fracture. Samples prepared from Zn$_{(II)}$, Fe$_{(II)}$ and Co$_{(II)}$ showed a maximum strain before fracture of 525%, 75% and 25%, respectively. This difference between the materials may be explained by the difference in M-L bond strengths. A direct relationship can be suggested between the bond length or strength of the M-L interactions where the smaller the bond length, the stronger the association and thus the more brittle the material. It has been appreciated that bond lengths of Fe$^{2+}$, CO$^{2+}$ and Zn$^{2+}$ coordinated to bipyridine-based ligands are 1.852, 1.848 and 2.002 Å, respectively, which can be directly related to bond strength. Therefore, despite also having an octahedral geometry, coordination of $Zn_{(II)}$ is much weaker than $Co_{(II)}$ and $Fe_{(II)}$, which can explain the more brittle nature of the cobalt and iron-based polymers.

Figure 31:
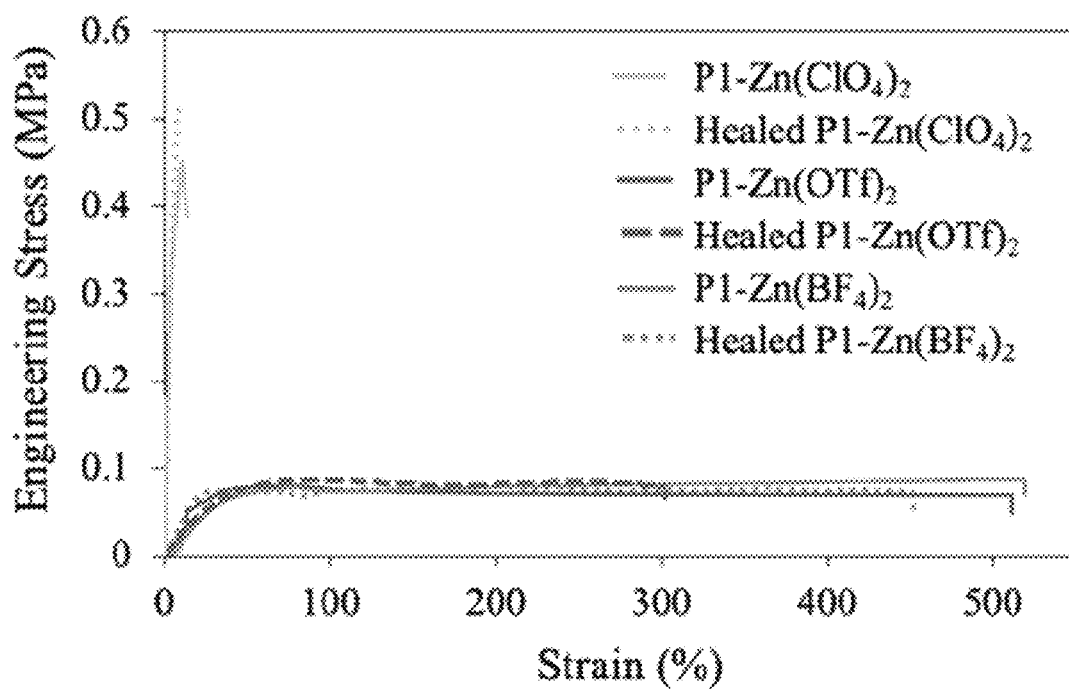
FIG. 31 shows a stress-strain curve of a pre-polymer P1 crosslinked with 0.33 equivalent of Fe(II), Zn(II) or Co(II) before and after self-healing at room temperature for 2 hours, with the x-axis showing strain in percent and the y-axis engineering stress in MPa.
Figure 32:
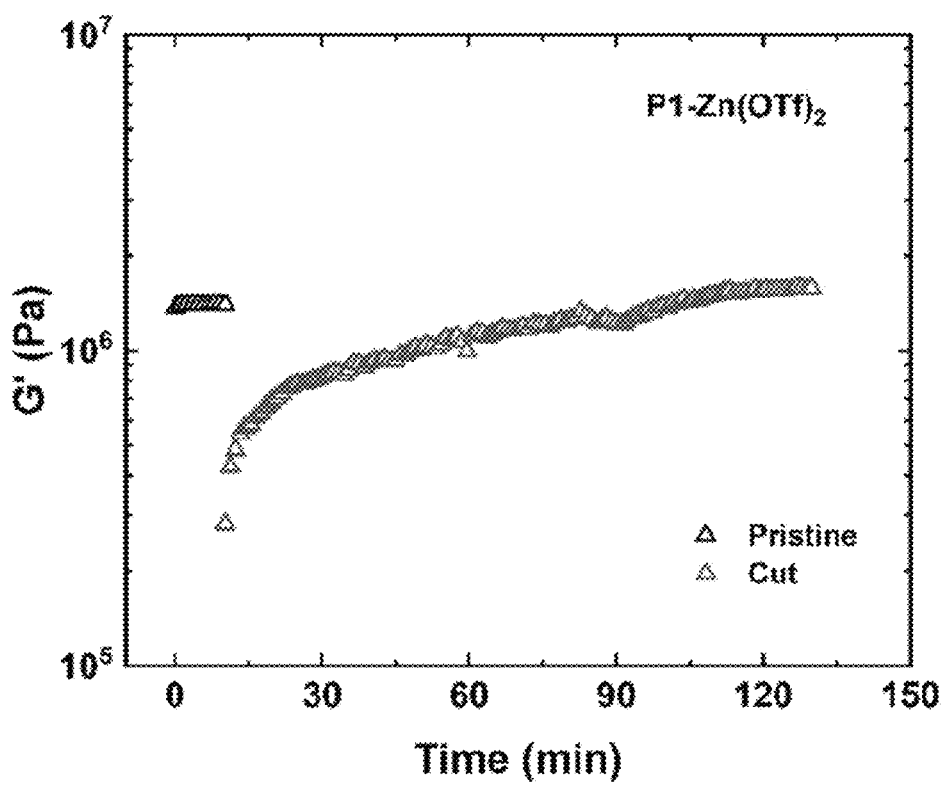
FIG. 32 shows a scatter plot of storage modulus G' in Pa (y-axis) as a function of time (y-axis) before and after self-healing of a pre-polymer P1 crosslinked with $Zn(OTf)_2$.
Figure 33:
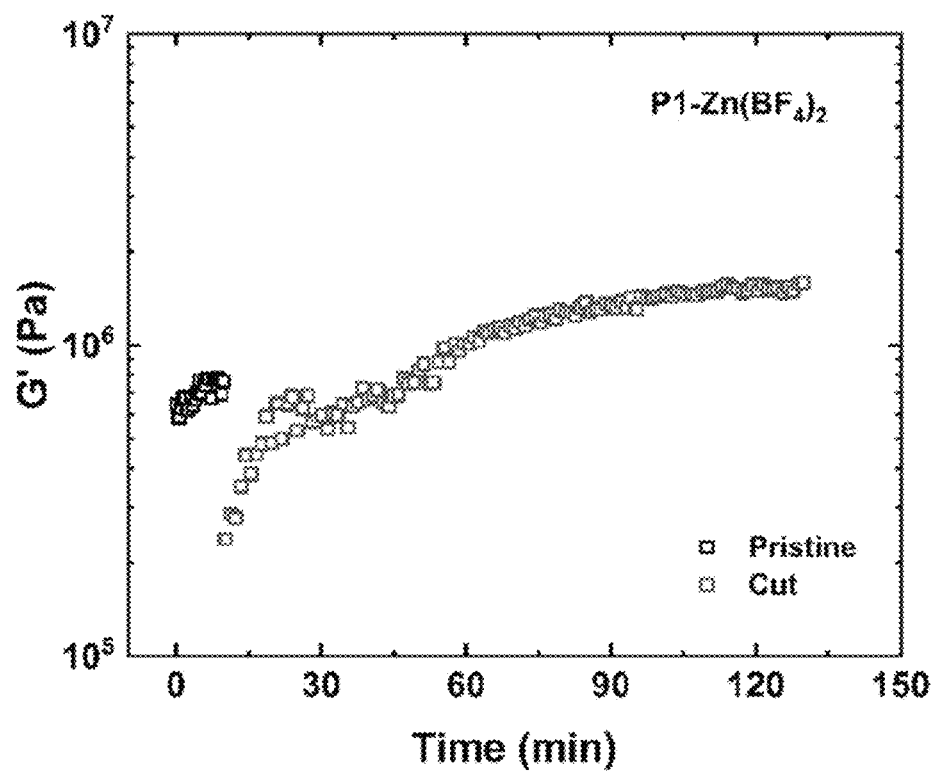
FIG. 33 shows a scatter plot of storage modulus G' in Pa (y-axis) as a function of time (y-axis) before and after self-healing of a pre-polymer P1 crosslinked with $Zn(BF_4)_2$.
Figure 34:
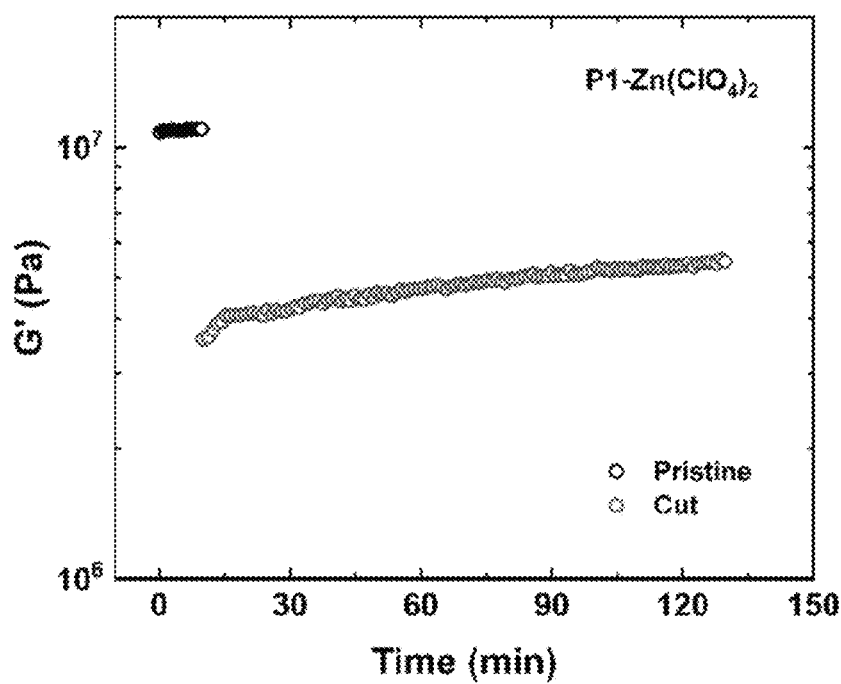
FIG. 34 shows a scatter plot of storage modulus G' in Pa (y-axis) as a function of time (y-axis) before and after self-healing of a pre-polymer P1 crosslinked with $Zn(ClO_4)_2$.
Figure 35:
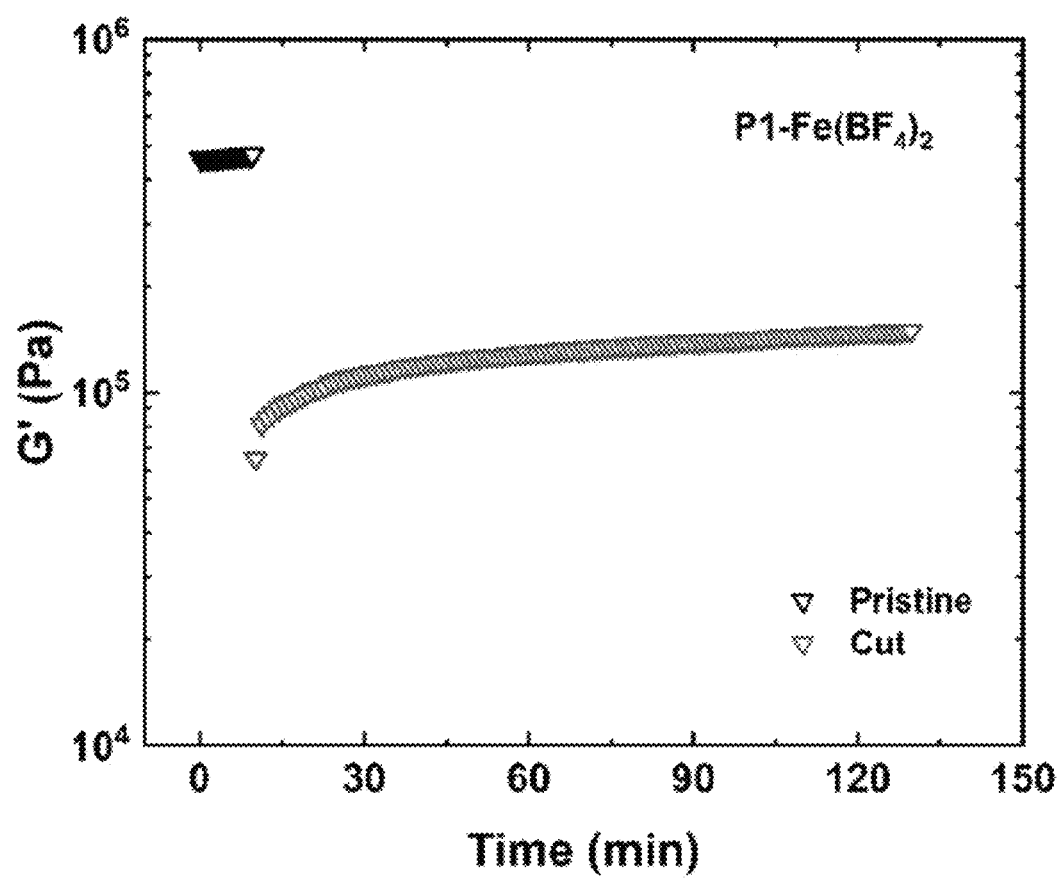
FIG. 35 shows a scatter plot of storage modulus G' in Pa (y-axis) as a function of time (y-axis) before and after self-healing of a pre-polymer P1 crosslinked with $Fe(BF_4)_2$.
Figure 36:
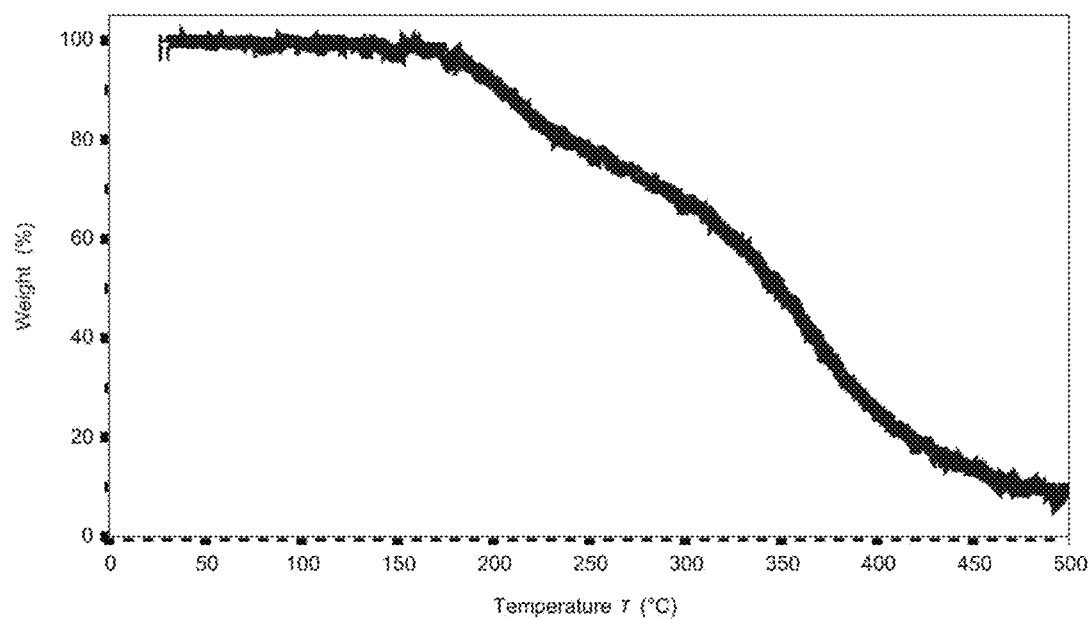
FIG. 36 shows a thermogravimetric analysis curve of a pre-polymer P1 crosslinked with $Co(BF_4)_2$.
Figure 37:
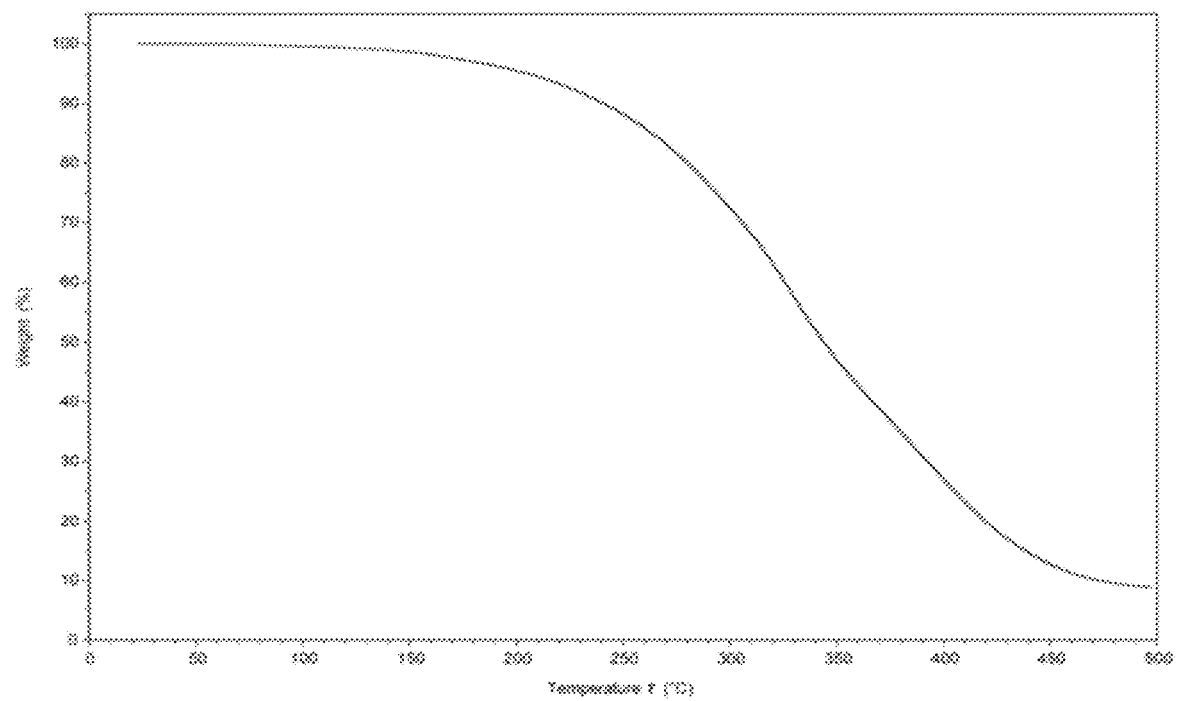
FIG. 37 shows a thermogravimetric analysis curve of a pre-polymer P1 crosslinked with $Fe(BF_4)_2$.
Figure 38:
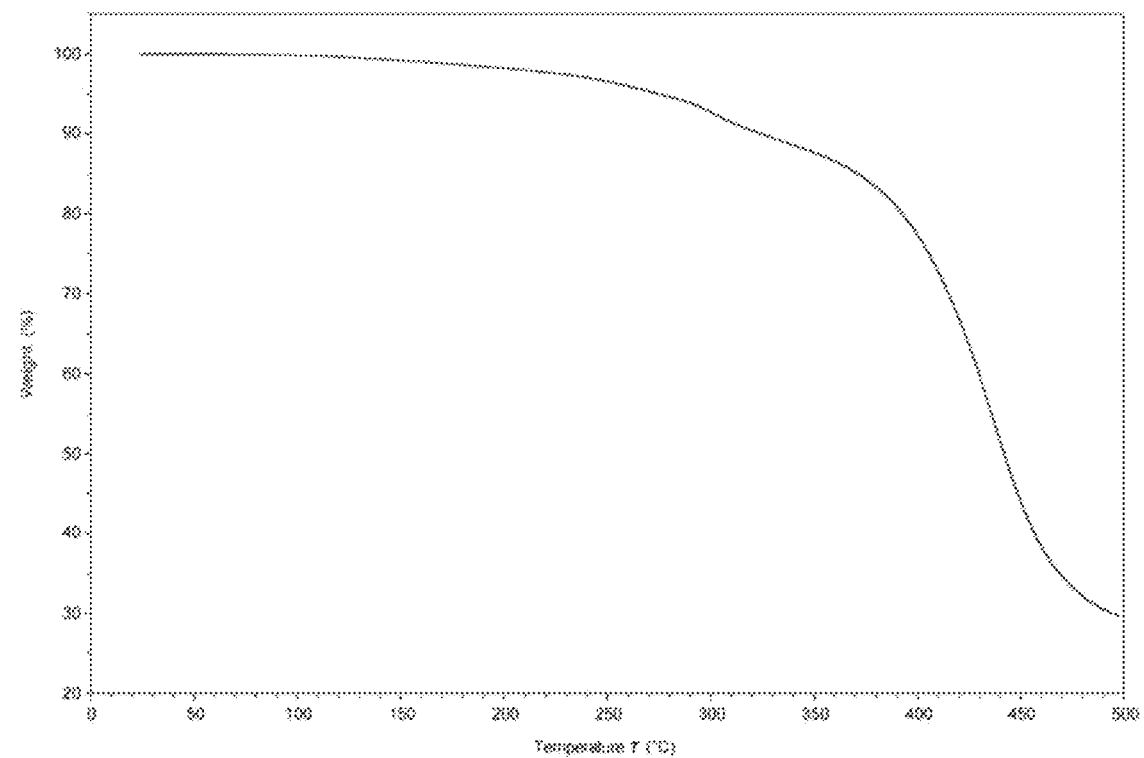
FIG. 38 shows a thermogravimetric analysis curve of a pre-polymer P1 crosslinked with $Zn(OTF)_2$.
Figure 39:
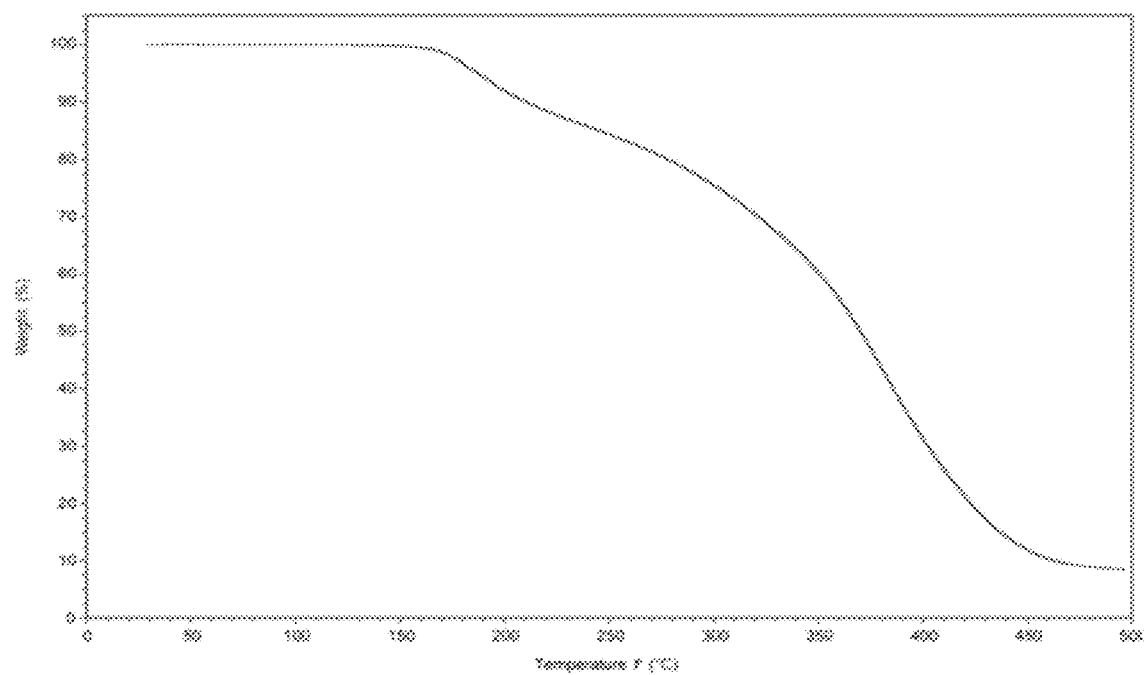
FIG. 39 shows a thermogravimetric analysis curve of a pre-polymer P1 crosslinked with $Zn(BF_4)_2$.
Figure 40:
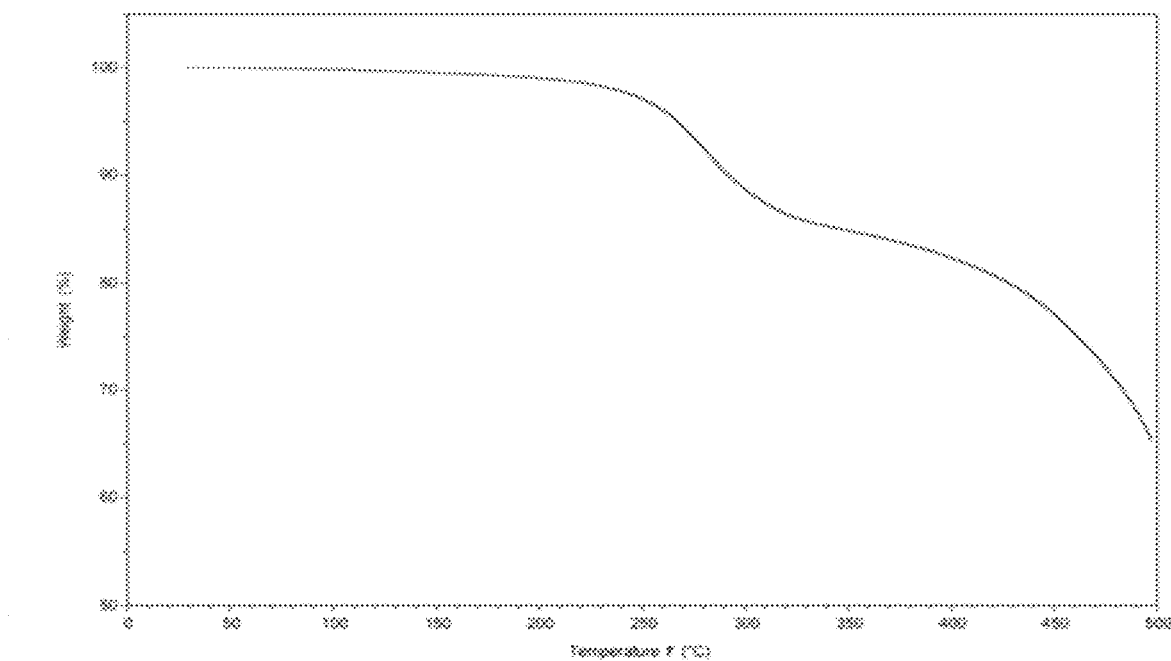
FIG. 40 shows a thermogravimetric analysis curve of a pre-polymer P1 crosslinked with $Zn(ClO_4)_2$.
Figure 41:
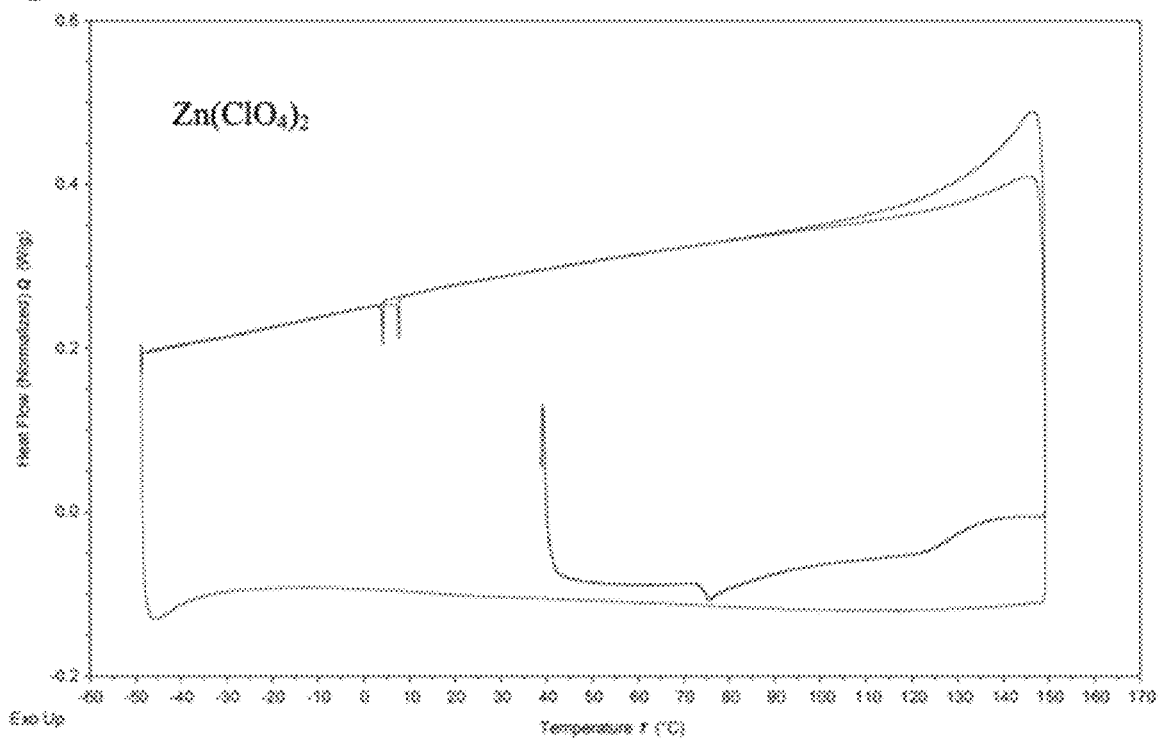
FIG. 41 shows a differential scanning calorimetry curve of a pre-polymer P1 crosslinked with $Zn(ClO_4)_2$.
Figure 42:
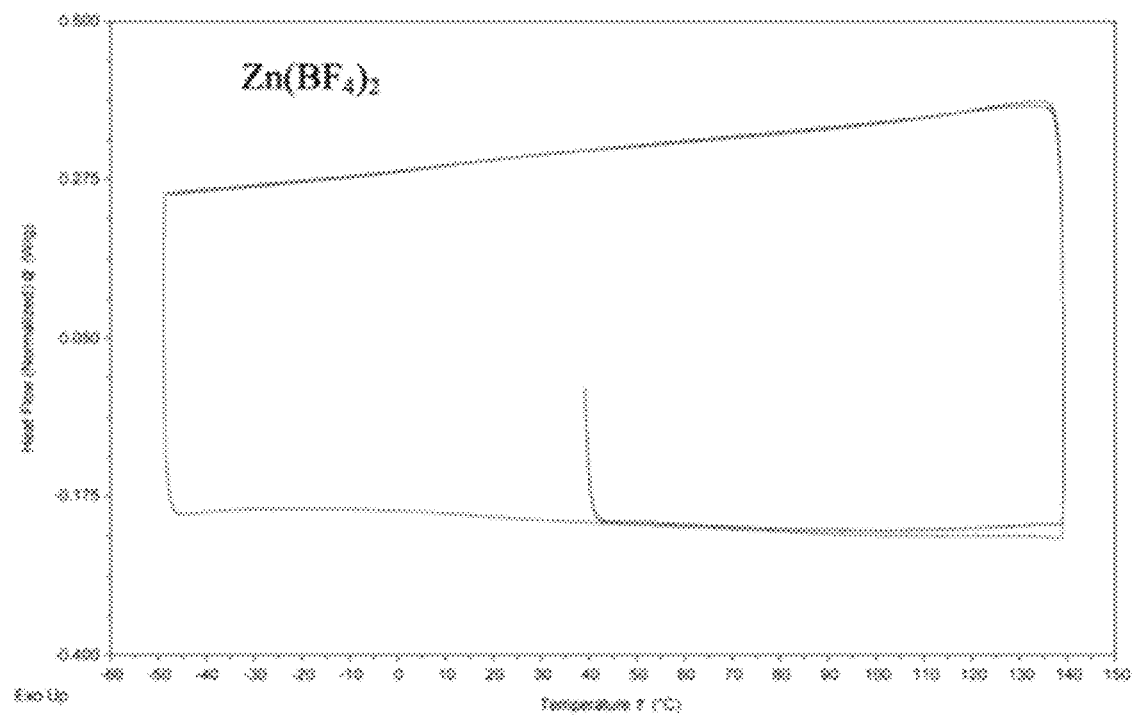
FIG. 42 shows a differential scanning calorimetry curve of a pre-polymer P1 crosslinked with $Zn(BF_4)_2$.
Figure 43:
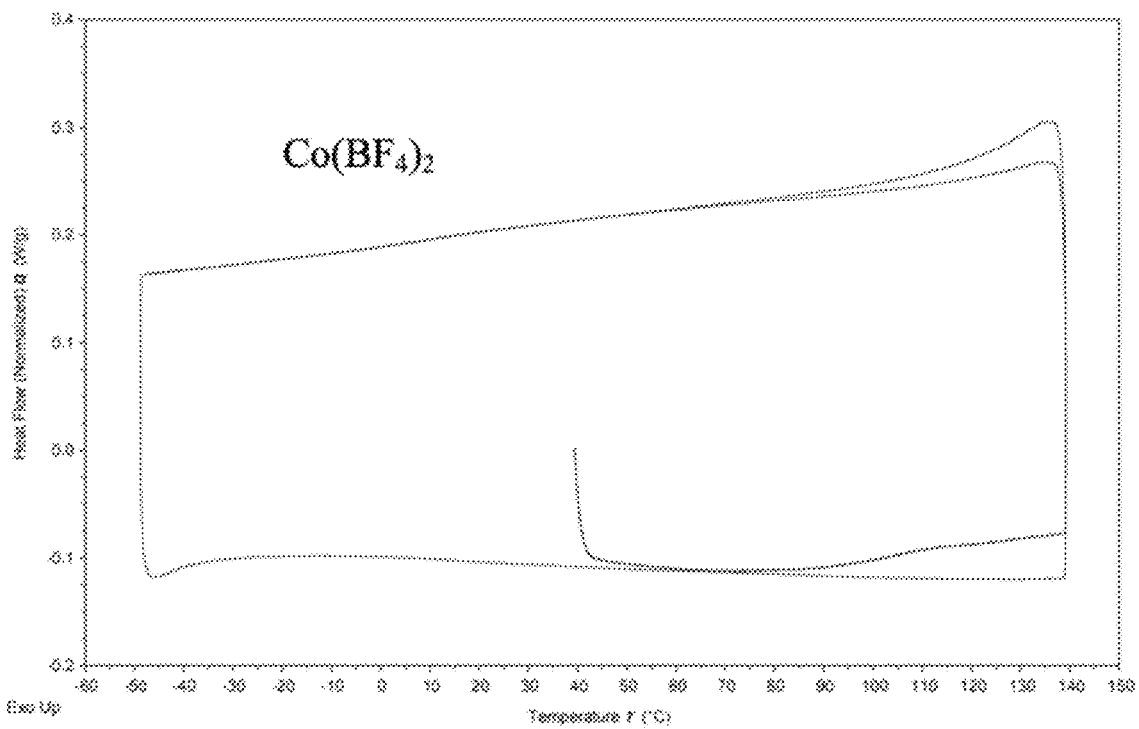
FIG. 43 shows a differential scanning calorimetry curve of a pre-polymer P1 crosslinked with $Co(BF_4)_2$.
Figure 44:
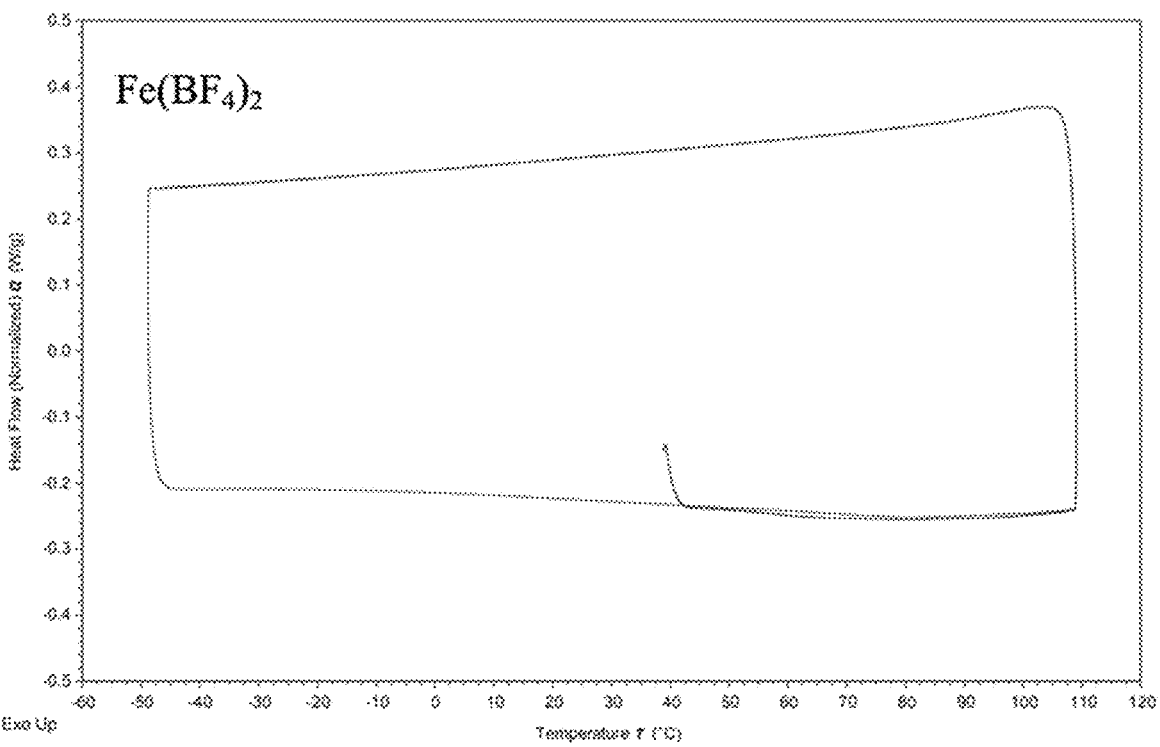
FIG. 44 shows a differential scanning calorimetry curve of a pre-polymer P1 crosslinked with $Fe(BF_4)_2$.
Figure 45:
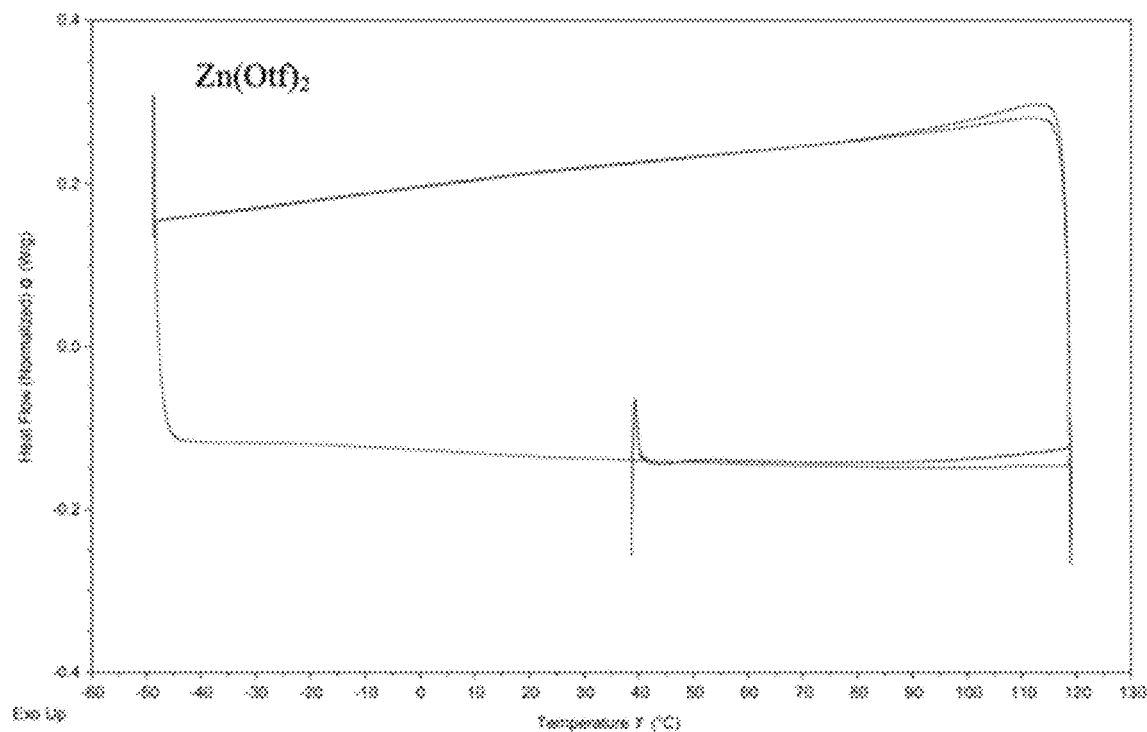
FIG. 45 shows a differential scanning calorimetry curve of a pre-polymer P1 crosslinked with $Zn(OTF)_2$.
Figure 46:
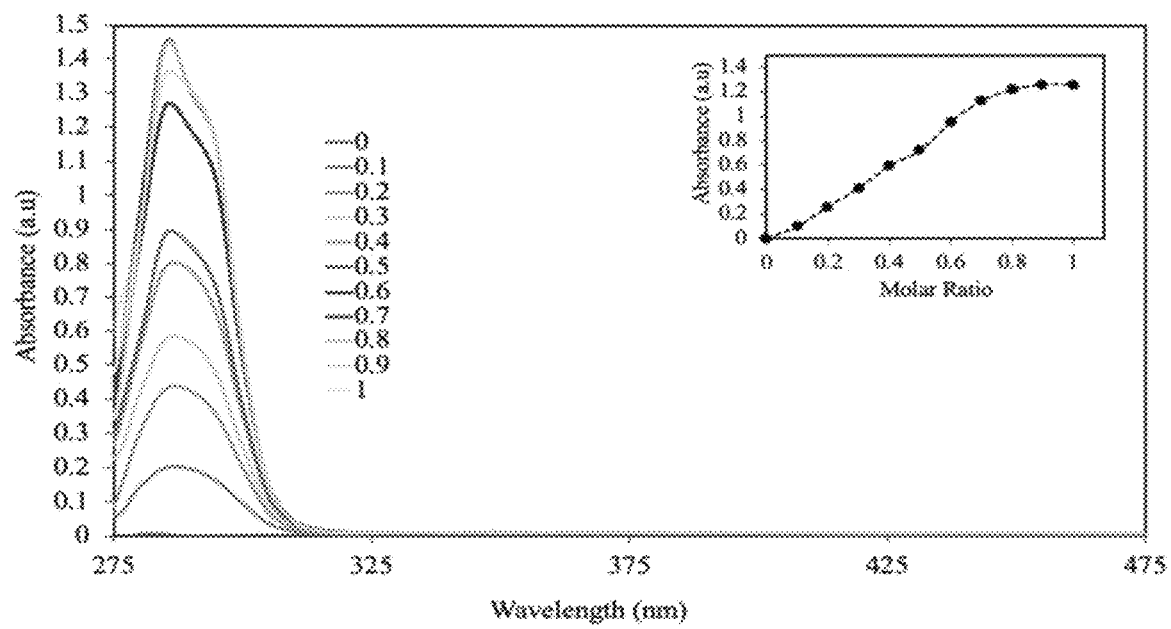
FIG. 46 shows a UV-vis absorption spectrum of a pre-polymer P1 in $CH_2Cl_2$ upon titration of 0.1 molar equivalent of $Zn(OTf)_2$ per N-ligand in the pre-polymer P1.
Figure 47:
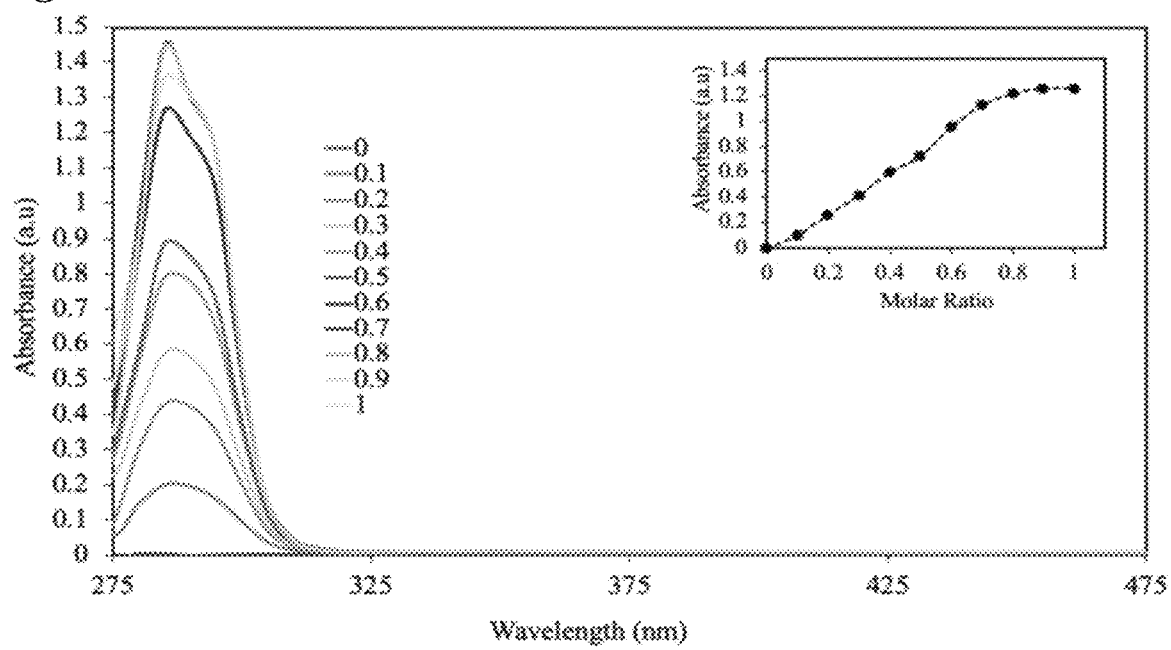
FIG. 47 shows a UV-vis absorption spectrum of a pre-polymer P1 in $CH_2Cl_2$ upon titration of 0.1 molar equivalent of $Zn(ClO_4)_2$ per N-ligand in the pre-polymer P1.

A similar investigation was also performed by varying the counter-ion using $Zn(BF_4)_2$, $Zn(ClO_4)$ and $Zn(OTf)_2$ for the preparation of materials. These specific counter-ions were selected for various reasons. First, tetrafluoroborate, perchlorate and triflate are non-coordinating counter-ions which promote the octahedral coordination geometry of the polymer ligands with the metal center, as confirmed by UV-Vis spectroscopy. Moreover, their size and stability differ, which may have an influence on the resulting supramolecular network and thermomechanical properties. As shown in FIG. 31, materials prepared from tetrafluoroborate and triflate counter-ions showed similar maximum strain before fracture, around 515%. The sample prepared from zinc perchlorate showed significantly reduced robustness, with a maximum fracture strain of around 15%. This counter-ion effect can be attributed to various factors, including size, coordinating ability and strength, and ion aggregation. Self-healing could be explained by the rearrangement of ion aggregation and the interdiffusion of polymer chains over the surface of the crack. Strong cation-anion interaction and intensive ion aggregation for the counterion can restrict the mobility of the surrounding polymer chain, thus improving the mechanical strength but reducing self-healing ability. The three selected counter-ions are weakly coordinating, but $OTf^-$ and $BF_4^-$ are slightly bigger than $ClO_4^-$ with weak coordinating abilities, which ultimately can result in a plasticizing effect. This impact of counter-ions on the mechanical properties and crystallization processes may be observed in various systems, including self-healing PDMS-based polymers using nitrate and triflate containing metal crosslinkers and silver-thiadiazol complexes which suggests this direct trend on metal-ligand coordination dynamics and counter anion size.

To evaluate the self-healing efficiency of the materials, freestanding films of the different crosslinked materials were cut into two pieces and were slowly brought into physical contact. The resulting materials were left on the benchtop at room temperature for 2 hours and the healed films were evaluated by tensile-strain pull testing. No additional trigger (thermal annealing, light exposure, etc.) was used in order to ensure an autonomous self-healing mechanism. The resulting self-healed materials were then analyzed by tensile-strain pull testing and the results are summarized in FIGS. 30 and 31. The self-healing efficiency was determined by comparing the maximum elongation before damage and after a 2-hour healing period. As observed with the pristine samples, the healed materials showed a similar trend in terms of maximum fracture strain, with the $Zn_{(II)}$-crosslinked materials showing a maximum elongation of 450% after self-healing (2 hours), corresponding to a self-healing efficiency of 87% (see Table 1 below). This trend may be directly explained by the coordination of $Zn_{(II)}$, weaker but more dynamic than $Co_{(II)}$ and $Fe_{(II)}$, which can allow for fast regeneration of the coordination complex when the polymer chains are put back in contact. Nonetheless, despite the stronger coordination, the $Co_{(II)}$ and $Fe_{(II)}$-containing self-healing polymers showed self-healing efficiencies of 61% and 71%, respectively. For the effect of the counter-ion on the maximum strain at fracture after self-healing, a similar trend was also observed with the non-coordinating large counter-ion having an increased plasticizing effect than the smaller ones. For the materials prepared from $Zn(BF_4)_2$ and $Zn(ClO_4)_2$, the self-healing efficiencies were relatively good after 2 hours (88 and 75% respectively).

TABLE 1

Elastic moduli and self-healing efficiencies of pre-polymer P1 crosslinked with various metal$_{(II)}$ sources

| Metal salt | Elastic modulus (MPa) | Self-healing efficiency[a] (%) |
|---|---|---|
| $Co(BF_4)_2$ | 8.10 ± 2.80 | 61 |
| $Fe(BF_4)_2$ | 1.80 ± 0.15 | 71 |
| $Zn(BF_4)_2$ | 0.26 ± 0.09 | 88 |
| $Zn(ClO_4)_2$ | 10.2 ± 1.40 | 75 |
| $Zn(CF_3SO_3)_2$ | 0.23 ± 0.04 | 73 |

[a]Defined as the difference between the maximum elongation before damage and after a 2-hour healing period.

The metal center and type of counter-ion used in this system not only have an effect on the maximal strain before fracture and self-healing efficiency, but also influence the thermomechanical properties of soft materials. Therefore, to unveil the impact of the crosslinker used to prepare the materials on the soft materials, a complete evaluation of the thermomechanical properties, including Young's moduli and maximum strain at fracture, was performed using tensile-strain pull testing. First, the Young's modulus for all systems was evaluated by tensile-strain pull testing, and the results are summarized in Table 1. Similar to the trend observed for the maximum strain at fracture, the selection of the metal used for coordination has an effect on the elastic modulus of the resulting crosslinked materials. $Zn_{(II)}$, with the weaker interaction, led to a polymer with a modulus of 0.26 MPa, which is one order of magnitude lower than commonly used PDMS. When $Fe_{(II)}$ was used, this modulus increased to 1.8 MPa. Finally, when $Co_{(II)}$ was used, the resulting material was more brittle, and its Young's modulus increased to 8.1 MPa. This result may be correlated with the coordination bond strength. The elastic moduli of $Zn_{(II)}$-based materials with different counter-ions were then evaluated. Interestingly, when the counter-ion used is large and non-coordinating (tetrafluoroborate and triflate), the moduli remained fairly low, with values of 0.26 and 0.23 MPa, respectively. However, when perchlorate was used, the resulting material became brittle with an elastic modulus of 10.2 MPa, which is considerably higher than the commonly used PDMS-based elastomer. Nonetheless, in the current system, the Young's modulus was shown to have a reduced correlation with self-healing, as seen in Table 1.

The self-healing efficiency of the materials was also evaluated with shear rheometry using a method previously reported (see Y. Wang, J. He, S. Aktas, S. A. Sukhishvili and D. M. Kalyon, Rheological behavior and self-healing of hydrogen-bonded complexes of a triblock Pluronics copolymer with a weak polyacid, *J. Rheol.*, 2017, 61, 1103-1119, the entire contents of which are incorporated herein by reference). Briefly, a disk-shaped (8 mm diameter and approximately 1.5 mm thickness) pristine sample was first measured with a time sweep for 10 minutes using 8 mm parallel plates to establish the benchmark performance; then the sample, while kept between two plates, was split into two halves horizontally and brought into contact with a normal force of 0.5 N. Finally, another time sweep was immediately performed on the cut sample for 2 hours. FIGS. 32 to 35 plots the storage modulus (G') as a function of time for P1 crosslinked with $Zn(OTf)_2$, $Zn(BF_4)_2$, $Zn(ClO_4)_2$, and $Fe(BF_4)_2$. The samples crosslinked with $Co(BF_4)_2$ were more brittle for being characterized through this technique.

Interestingly, it was observed that for pristine materials, G' (approximately equal to one third of the elastic modulus for the elastomer) is higher than the value derived from tensile strain analysis for $Zn(OTf)_2$, $Zn(BF_4)_2$ and $Zn(ClO_4)_2$, while it remains comparable for $Fe(BF_4)_2$. This may be attributed to the weaker coordination of $Zn_{(II)}$ than $Fe_{(II)}$. In addition, FIGS. 32 to 35 show distinct self-healing behavior among these four samples: within a 2 hour timeframe, G' of $Zn(OTf)_2$ and $Zn(BF_4)_2$ gets fully recovered or even shows higher G' compared to the pristine sample, whereas $Zn(ClO_4)_2$ and $Fe(BF_4)_2$ only exhibits partial recovery of 49% and 32%. The trend is qualitatively consistent with the results from the tensile-strain pull test. However, the efficiencies of $Zn(ClO_4)_2$ and $Fe(BF_4)_2$ were found to be much smaller than the results obtained from the tensile-strain pull test. This may be attributed to the difference in the cross-section area of the cut in the measurements, i.e., the cut for rheology measurements introduces a larger cross-section for self-healing. Yet, full recovery of G' is observed for $Zn(OTf)_2$ and $Zn(BF_4)_2$. In addition, during recovery, $Zn(OTf)_2$ and $Zn(BF_4)_2$ even shows a higher G' than the pristine sample. This is presumably due to the high mobility of the polymer chain crosslinked with $Zn(OTf)_2$ and $Zn(BF_4)_2$ possessing weaker coordination. During the self-healing process, the crosslinker migrates to the interface and potentially increases the crosslinking density and results in a higher G'. In terms of the counter-ion effect, since $ClO_4$ shows a slightly stronger coordination ability than OTf and $BF_4^-$, a lower self-healing efficiency was observed.

Conclusion

A novel approach to fine-tune the thermomechanical properties of soft, siloxane-based elastomers has been developed through the use of dynamic metal-ligand interactions. Specifically, a new imine-based siloxane-based polymer has been crosslinked with various metal centers, including with $Fe_{(II)}$, $Zn_{(II)}$ and $Co_{(II)}$. Interestingly, the resulting polymers were shown to undergo rapid self-healing at room temperature (two hours) without the use of any external trigger. By tuning the strength of the metal-ligand interactions, fine-tuning of the thermomechanical properties was effectuated. Samples prepared from $Zn_{(II)}$, $Fe_{(II)}$ and $Co_{(II)}$ demonstrated a maximum strain before fracture of 525%, 75% and 25%, and a self-healing efficiency of 88%, 71% and 61%, respectively. This can be directly attributed to the difference in bond lengths (strength of the M-L interactions) where the smaller the bond length, the stronger the association and thus the more brittle the material. In addition to the effect of the metal center, the evaluation of the effect of the counter-ion on the self-healing efficiency and thermomechanical properties was also performed. Interestingly, an effect of the counter-ion on the maximum strain at fracture after self-healing was observed and can be attributed to the large counter-ions having an increased plasticizing effect than the smaller ones. For the materials prepared from $Zn(BF_4)_2$ and $Zn(ClO_4)_2$, self-healing efficiencies of 88 and 75%, respectively, were observed after 2 hours. Furthermore, materials prepared from tetrafluoroborate and triflate counterions showed an almost similar maximum strain before fracture of around 515%. Finally, the fine-tuning of the metal-ligand interaction in the soft polymer allowed for the preparation of a wide variety of self-healing polymers with Young's moduli ranging from 0.23 to 10.2 MPa. This new strategy to fine-tune the thermomechanical properties and self-healing of soft, siloxane-based polymers is highly versatile and the preparation of the materials is relatively simple. Therefore, this approach is particularly promising for many applications, including soft electronics, advanced coatings and manufacturing and healthcare.

It has been appreciated that the self-healing polymer may be used in the preparation of a pressure sensor, such as a capacitive pressure sensor. In particular, the self-healing polymer may permit application in the preparation of a dielectric layer described in U.S. Application No. 62/767,314 filed Nov. 14, 2018 and U.S. application Ser. No. 16/534,547 filed Aug. 7, 2019, the entire contents of both of which are incorporated herein by reference.

[1] C. E. Diesendruck, N. R. Sottos, J. S. Moore and S. R. White, Angew. Chem. Int. Ed., 2015, 54, 2-22.

[2] B. M. D. Hager, P. Greil, C. Leyens, S. Van Der Zwaag and U. S. Schubert, Adv. Mater., 2010, 5424-5430.

[3] D. Y. Wu, S. Meure and D. Solomon, Prog. Polym. Sci., 2008, 33, 479-522.

[4] R. P. Wool, Soft Matter, 2008, 4, 400.

[5] J. Zhao, R. Xu, G. Luo, J. Wu and H. Xia, Polym. Chem., 2016, 7, 7278-7286.

[6] Y. Zhao, W. Zhang, L. P. Liao, H. M. Wang and W. J. Li, Phys. Procedia, 2011, 18, 216-221.

[7] A. B. W. Brochu, S. L. Craig and W. M. Reichert, J. Biomed. Mater. Res.—Part A, 2011, 96, 492-506.

[8] K. Imato, M. Nishihara, T. Kanehara, Y. Amamoto, A. Takahara and H. Otsuka, Angew. Chem. Int. Ed., 2012, 51, 1138-1142.

[9] T. F. O'Connor, K. M. Rajan, A. D. Printz and D. J. Lipomi, J. Mater. Chem. B, 2015, 3, 4947-4952.

[10] Y. Yang and M. W. Urban, Chem. Soc. Rev., 2013, 42, 7446-67.

[11] S. R. White, N. R. Sottos, P. H. Geubelle, J. S. Moore, M. R. Kessler, S. R. Sriram, E. N. Brown and S. Viswanathan, Nature, 2001, 409, 794-797.

[12] J. Yang, M. W. Keller, J. S. Moore, S. R. White, N. R. Sottos, J. Yang, M. W. Keller, J. S. Moore, S. R. White and N. R. Sottos, Macromolecules, 2008, 41, 9650-9655.

[12] F. Herbst, D. Döhler, P. Michael and W. H. Binder, Macromol. Rapid Commun., 2013, 34, 203-220.

[14] Y. Heo, M. H. Malakooti and H. A. Sodano, J. Mater. Chem. A, 2016, 4, 17403-17411.

[15] D. Habault, H. Zhang and Y. Zhao, Chem. Soc. Rev., 2013, 42, 7244-7256.

[16] A. Nasresfahani and P. M. Zelisko, Polym. Chem., 2017, 8, 2942-2952.

[17] A. Chao, I. Negulescu and D. Zhang, Macromolecules, 2016, 49, 6277-6284.

[18] Z. Tang, J. Huang, B. Guo, L. Zhang and F. Liu, Macromolecules, 2016, 49, 1781-1789.

[19] N. Holten-Andersen, A. Jaishankar, M. J. Harrington, D. E. Fullenkamp, G. DiMarco, L. He, G. H. McKinley, P. B. Messersmith and K. Y. C. Lee, J. Mater. Chem. B, 2014, 2, 2467.

[20] J.-C. Lai, X.-Y. Jia, D.-P. Wang, Y.-B. Deng, P. Zheng, C.-H. Li, J.-L. Zuo and Z. Bao, Nat. Commun., 1164-1173.

[21] Y. Chen, A. M. Kushner, G. a. Williams and Z. Guan, Nat. Chem., 2012, 4, 467-472.

[22] C. Wang, N. Liu, R. Allen, J. B. H. Tok, Y. Wu, F. Zhang, Y. Chen and Z. Bao, Adv. Mater., 2013, 25, 5785-5790.

[23] M. Pepels, I. Filot, B. Klumperman and H. Goossens, Polym. Chem., 2013, 4, 4955.

[24] J. Liu, C. S. Y. Tan, Z. Yu, N. Li, C. Abell and O. A. Scherman, Adv. Mater., 2017, 29, 1605325.

[25] G. Cai, J. Wang, K. Qian, J. Chen, S. Li and P. S. Lee, Adv. Sci., 2017, 4, 1600190.

[26] X. Liu, C. Lu, X. Wu and X. Zhang, J. Mater. Chem. A, 2017, 5, 9824-9832.
[27] W. Huang, K. Besar, Y. Zhang, S. Yang, G. Wiedman, Y. Liu, W. Guo, J. Song, K. Hemker, K. Hristova, I. J. Kymissis and H. E. Katz, Adv. Funct. Mater., 2015, 25, 3745-3755.
[28] Y. J. Tan, J. Wu, H. Li and B. C. K. Tee, ACS Appl. Mater. Interfaces, 2018, 10, 15331-15345.
[29] S. Zhang and F. Cicoira, Adv. Mater., 2017, 29, 1703098.
[30] E. T. Thostenson and T. W. Chou, Adv. Mater., 2006, 18, 2837-2841.
[31] M. U. Ocheje, M. Selivanova, S. Zhang, T. H. Van Nguyen, B. P. Charron, C.-H. Chuang, Y.-H. Cheng, B. Billet, S. Noori, Y.-C. Chiu, X. Gu and S. Rondeau-Gagné, Polym. Chem., 2018, 9, 5531.
[32] J. Y. Oh, S. Rondeau-Gagné, Y.-C. Chiu, A. Chortos, F. Lissel, G.-J. N. Wang, B. C. Schroeder, T. Kurosawa, J. Lopez, T. Katsumata, J. Xu, C. Zhu, X. Gu, W.-G. Bae, Y. Kim, L. Jin, J. W. Chung, J. B.-H. Tok and Z. Bao, Nature, 2016, 539, 411-415.
[33] J. Ko, Y. J. Kim and Y. S. Kim, ACS Appl. Mater. Interfaces, 2016, 8, 23854-23861.
[34] Y. L. Rao, A. Chortos, R. Pfattner, F. Lissel, Y. C. Chiu, V. Feig, J. Xu, T. Kurosawa, X. Gu, C. Wang, M. He, J. W. Chung and Z. Bao, J. Am. Chem. Soc., 2016, 138, 6020-6027.
[35] W. H. Binder, Macromol. Rapid Commun., 2019, 40, 1-7.
[36] T. P. Haider, C. Völker, J. Kramm, K. Landfester and F. R. Wurm, Angew. Chem. Int. Ed., 2019, 58, 50-62.
[37] B. Grzybowski, D. Qin, R. Haag and G. M. Whitesides, Sensors Actuators B. Chem., 2000, 81-85.
[38] J. Pignanelli, K. Schlingman, T. B. Carmichael, S. Rondeau-Gagné and M. J. Ahamed, Sensors Actuators A. Phys., 2019, 285, 427-436.
[39] W. Jacob and R. Mukherjee, Inorganica Chim. Acta, 2006, 359, 4565-4573.
[40] P. Mal, D. Schultz, K. Beyeh, K. Rissanen and J. R. Nitschke, Angew. Chem. Int. Ed., 2008, 47, 8297-8301.
[41] A. Rajput and R. Mukherjee, Coord. Chem. Rev., 2013, 257, 350-368.
[42] D. F. Evans, J. Chem. Soc., 1959, 2003-2005.
[43] B. Weber and F. A. Walker, Inorg. Chem., 2007, 46, 6794-6803.
[44] L. Zheng, X. Fang, K. Lii, H. Song, X. Xin, H.-K. Fun, K. Chinnakali and I. Abdul Razak, J. Chem. Soc., Dalt. Trans., 1999, 3, 2311-2316.
[45] C.-H. Li, C. Wang, C. Keplinger, J.-L. Zuo, L. Jin, Y. Sun, P. Zheng, Y. Cao, F. Lissel, C. Linder, X.-Z. You and Z. Bao, Nat. Chem., 2016, 8, 618-624.
[46] Z. H. Williams, E. D. Burwell, A. E. Chiomento, K. J. Demsko, J. T. Pawlik, S. O. Harris, M. R. Yarolimek, M. B. Whitney, M. Hambourger and A. D. Schwab, Soft Matter, 2017, 13, 6542-6554.
[47] F. Garcia, J. Pelss, H. Zuilhof and M. M. J. Smulders, Chem. Commun., 2016, 52, 9059-9062.
[48] C. D. Meyer, C. S. Joiner and J. F. Stoddart, Chem. Soc. Rev., 2007, 36, 1705-1723.
[49] E. C. Constable, G. Baum, E. Bill, R. Dyson, R. Van Eldik, D. Fenske, S. Kaderli, D. Morris, A. Neubrand, M. Neuburger, D. R. Smith, K. Wieghardt, M. Zehnder and A. D. Zuberbühler, Chem. Eur. J., 1999, 5, 498-508.
[50] J. Wang, B. Djukic, J. Cao, A. Alberola, F. S. Razavi and M. Pilkington, Inorg. Chem., 2007, 46, 8560-8568.
[51] B. Sandmann, B. Happ, S. Kupfer, F. H. Schacher, M. D. Hager and U. S. Schubert, Macromol. Rapid Commun., 2014, 36, 604-609.
[52] D. Mozhdehi, S. Ayala, O. R. Cromwell, Z. Guan, D. Mozhdehi, S. Ayala, O. R. Cromwell and Z. Guan, J. Am. Chem. Soc., 2014, 136, 16128-16131.
[53] M. Ciaccia, R. Cacciapaglia, P. Mencarelli, L. Mandolini and S. Di Stefano, Chem. Sci., 2013, 4, 2253-2261.
[54] P. Kovaiek and J. M. Lehn, J. Am. Chem. Soc., 2012, 134, 9446-9455.
[55] M. Zeng, L. Li and S. B. Herzon, J. Am. Chem. Soc., 2014, 136, 7058-7067.
[56] P. B. Shah, S. Bandopadhyay and J. R. Bellare, Polym. Degrad. Stab., 1995, 47, 165-173.
[57] M. Irimia-Vladu, E. D. Glowacki, G. Voss, S. Bauer and N. S. Sariciftci, Mater. Today, 2012, 15, 340-346.
[58] C. M. Boutry, A. Nguyen, Q. O. Lawal, A. Chortos, S. Rondeau-Gagné and Z. Bao, Adv. Mater., 2015, 27, 6954-6961.
[59] H. Ying, Y. Zhang and J. Cheng, Nat. Commun., 2014, 5, 1-9.
[60] T. Lei, M. Guan, J. Liu, H.-C. Lin, R. Pfattner, L. Shaw, A. F. McGuire, T.-C. Huang, L. Shao, K.-T. Cheng, J. B.-H. Tok and Z. Bao, Proc. Natl. Acad. Sci., 2017, 114, 5107-5112.
[61] T. Lei, X. Chen, G. Pitner, H. S. P. Wong and Z. Bao, J. Am. Chem. Soc., 2016, 138, 802-805.
[62] C. Edwards and R. Marks, Clin. Dermatol., 1995, 13, 375-380.
[63] M. L. Hammock, A. Chortos, B. C.-K. Tee, J. B.-H. Tok and Z. Bao, Adv. Mater., 2013, 25, 5997-6038.
[64] Z. Lei, Q. Wang, S. Sun, W. Zhu and P. Wu, Adv. Mater., 2017, 29, 1700321.
[65] H. Kim, G. Kim, T. Kim, S. Lee, D. Kang, M. S. Hwang, Y. Chae, S. Kang, H. Lee, H. G. Park and W. Shim, Small, 2018, 14, 1-10.
[66] A. Chhetry, H. Yoon and J. Y. Park, J. Mater. Chem. C, 2017, 5, 10068-10076.
[67] X. Liang, T. Zhao, D. Zhu, F. Han, J. Li, G. Zhang, L. Ling, R. Sun, D. Ho, S. Zhao, C.-P. Wong and F. Liu, Chem. Eur. J., 2018, 24, 16823-16832.
[68] B. Grzybowski, D. Qin, R. Haag and G. M. Whitesides, Sensors Actuators B. Chem., 2000, 81-85.
[69] J. Pignanelli, K. Schlingman, T. B. Carmichael, S. Rondeau-Gagné and M. J. Ahamed, Sensors Actuators A. Phys., 2019, 285, 427-436.
[70] D. F. Evans, J. Chem. Soc., 1959, 2003-2005.
[71] B. Weber and F. A. Walker, Inorg. Chem., 2007, 46, 6794-6803.
[72] L. Zheng, X. Fang, K. Lii, H. Song, X. Xin, H.-K. Fun, K. Chinnakali and I. Abdul Razak, J. Chem. Soc., Dalt. Trans., 1999, 3, 2311-2316.
[73] M. Zeng, L. Li and S. B. Herzon, J. Am. Chem. Soc., 2014, 136, 7058-7067.
[74] C. E. Diesendruck, N. R. Sottos, J. S. Moore and S. R. White, Biomimetic Self-Healing, Angew. Chem., Int. Ed., 2015, 54, 2-22.
[75] Y. Yang and M. W. Urban, Self-healing polymeric materials, Chem. Soc. Rev., 2013, 42, 7446-7467.
[76] Y. J. Tan, J. Wu, H. Li and B. C. K. Tee, Self-Healing Electronic Materials for a Smart and Sustainable Future, ACS Appl. Mater. Interfaces, 2018, 10, 15331-15345.
[77] T. Aida, E. W. Meijer and S. I. Stupp, Functional Supramolecular Polymers, Science, 2012, 335, 813-817.
[78] A. B. W. Brochu, S. L. Craig and W. M. Reichert, Selfhealing biomaterials, J. Biomed. Mater. Res., Part A, 2011, 96, 492-506.

[79] T. F. O. Connor, K. M. Rajan, A. D. Printz and D. J. Lipomi, Toward organic electronics with properties inspired by biological tissue, J. Mater. Chem. B, 2015, 3, 4947-4952.

[80] J. Y. Oh, S. Rondeau-Gagne', Y.-C. Chiu, A. Chortos, F. Lissel, G.-J. N. Wang, B. C. Schroeder, T. Kurosawa, J. Lopez, T. Katsumata, J. Xu, C. Zhu, X. Gu, W.-G. Bae, Y. Kim, L. Jin, J. W. Chung, J. B.-H. Tok and Z. Bao, Intrinsically stretchable and healable semiconducting polymer for organic transistors, Nature, 2016, 539, 411-415.

[81] S. Zhang and F. Cicoira, Water-Enabled Healing of Conducting Polymer Films, Adv. Mater., 2017, 29, 1703098.

[82] Y. L. Rao, A. Chortos, R. Pfattner, F. Lissel, Y. C. Chiu, V. Feig, J. Xu, T. Kurosawa, X. Gu, C. Wang, M. He, J. W. Chung and Z. Bao, Stretchable self-healing polymeric dielectrics cross-linked through metal-ligand coordination, J. Am. Chem. Soc., 2016, 138, 6020-6027.

[83] S. J. Benight, C. Wang, J. B. H. Tok and Z. Bao, Stretchable and self-healing polymers and devices for electronic skin, Prog. Polym. Sci., 2013, 38, 1961-1977.

[84] M. L. Hammock, A. Chortos, B. C.-K. Tee, J. B.-H. Tok and Z. Bao, 25th anniversary article: The evolution of electronic skin (e-skin): a brief history, design considerations, and recent progress, Adv. Mater., 2013, 25, 5997-6038.

[85] Q. Hua, J. Sun, H. Liu, R. Bao, R. Yu, J. Zhai, C. Pan and Z. L. Wang, Skin-inspired highly stretchable and conformable matrix networks for multifunctional sensing, Nat. Commun., 2018, 9, 1-11.

[86] W. H. Binder, The Past 40 Years of Macromolecular Sciences: Reflections on Challenges in Synthetic Polymer and Material Science, Macromol. Rapid Commun., 2019, 40, 1-7.

[87] S. R. White, N. R. Sottos, P. H. Geubelle, J. S. Moore, M. R. Kessler, S. R. Sriram, E. N. Brown and S. Viswanathan, Autonomic healing of polymer composites, Nature, 2001, 409, 794-797.

[88] I. L. Hia, V. Vahedi and P. Pasbakhsh, Self-Healing Polymer Composites: Prospects, Challenges, and Applications, Polym. Rev., 2016, 56, 225-261.

[89] R. P. Wool, Self-healing materials: a review, Soft Matter, 2008, 4, 400.

[90] J. A. Syrett, C. R. Becer and D. M. Haddleton, Self-healing and self-mendable polymers, Polym. Chem., 2010, 1, 978-987.

[91] N. Holten-Andersen, A. Jaishankar, M. J. Harrington, D. E. Fullenkamp, G. DiMarco, L. He, G. H. McKinley, P. B. Messersmith and K. Y. C. Lee, Metal-coordination: using one of nature's tricks to control soft material mechanics, J. Mater. Chem. B, 2014, 2, 2467.

[92] K. Imato, M. Nishihara, T. Kanehara, Y. Amamoto, A. Takahara and H. Otsuka, Self-healing of chemical gels cross-linked by diarylbibenzofuranone-based trigger-free dynamic covalent bonds at room temperature, Angew. Chem., Int. Ed., 2012, 51, 1138-1142.

[93] H. Ying, Y. Zhang and J. Cheng, Dynamic urea bond for the design of reversible and self-healing polymers, Nat. Commun., 2014, 5, 1-9.

[94] Y. Chen, A. M. Kushner, G. a. Williams and Z. Guan., Multiphase design of autonomic self-healing thermoplastic elastomers, Nat. Chem., 2012, 4, 467-472.

[95] Y. Yang, X. Ding and M. W. Urban, Chemical and physical aspects of self-healing materials, Prog. Polym. Sci., 2015, 49-50, 34-59.

[96] S. M. Kim, H. Jeon, S. H. Shin, S. A. Park, J. Jegal, S. Y. Hwang, D. X. Oh and J. Park, Superior Toughness and Fast Self-Healing at Room Temperature Engineered by Transparent Elastomers, Adv. Mater., 2018, 30, 1-8.

[97] Z. Xu, Mechanics of metal-catecholate complexes: The roles of coordination state and metal types, Sci. Rep., 2013, 3, 7-9.

[98] J. Zhao, R. Xu, G. Luo, J. Wu and H. Xia, Self-healing poly(siloxane-urethane) elastomers with remoldability, shape memory and biocompatibility, Polym. Chem., 2016, 7, 7278-7286.

[99] B. S. Cash, J. J. Kubo, T. Bapat and A. P. Sumerlin, Room-Temperature Self-Healing Polymers Based on Dynamic-Covalent Boronic Esters, Macromolecules, 2015, 2098.

[100] Y. Zhao, W. Zhang, L. P. Liao, H. M. Wang and W. J. Li, The self-healing composite anticorrosion coating, Phys. Procedia, 2011, 18, 216-221.

[101] Y. L. Liu and T. W. Chuo, Self-healing polymers based on thermally reversible Diels-Alder chemistry, Polym. Chem., 2013, 4, 2194-2205.

[102] R. Hoogenboom, Hard autonomous self-healing supramolecular materials-A contradiction in terms?, Angew. Chem., Int. Ed., 2012, 51, 11942-11944.

[103] D. Y. Zhu, M. Z. Rong and M. Q. Zhang, Self-healing polymeric materials based on microencapsulated healing agents: From design to preparation, Prog. Polym. Sci., 2015, 49-50, 175-220.

[104] J. A. Syrett, G. Mantovani, W. R. S. Barton, D. Price and D. M. Haddleton, Self-healing polymers prepared via living radical polymerisation, Polym. Chem., 2010, 1, 102-106.

[105] J. Pignanelli, B. Billet, M. Straeten, M. Prado, K. Schlingman, M. J. Ahamed and S. Rondeau-Gagne, Imine and metal-ligand dynamic bonds in soft polymers for autonomous self-healing capacitive-based pressure sensors, Soft Matter, 2019, 15, 7654-7662.

[106] Y. L. Rao, V. Feig, X. Gu, G. J. Nathan Wang and Z. Bao, The effects of counter anions on the dynamic mechanical response in polymer networks crosslinked by metal-ligand coordination, J. Polym. Sci., Part A: Polym. Chem., 2017, 55, 3110-3116.

[107] S. Bode, M. Enke, R. K. Bose, F. H. Schacher, S. J. Garcia, S. van der Zwaag, M. D. Hager and U. S. Schubert, Correlation between scratch healing and rheological behavior for terpyridine complex based metallopolymers, J. Mater. Chem. A, 2015, 3, 22145-22153.

[108] J. M. Sirrine, S. A. Schexnayder, J. M. Dennis and T. E. Long, Urea as a monomer for isocyanate-free synthesis of segmented poly(dimethyl siloxane) polyureas, Polymer, 2018, 154, 225-232.

[109] D. D. Zhang, Y. B. Ruan, B. Q. Zhang, X. Qiao, G. Deng, Y. Chen and C. Y. Liu, A self-healing PDMS elastomer based on acylhydrazone groups and the role of hydrogen bonds, Polymer, 2017, 120, 189-196.

[110] B. Zhang, P. Zhang, H. Zhang, C. Yan, Z. Zheng, B. Wu and Y. Yu, A Transparent, Highly Stretchable, Autonomous Self-Healing Poly(dimethyl siloxane) Elastomer, Macromol. Rapid Commun., 2017, 38, 1-9.

[111] C.-H. Li, C. Wang, C. Keplinger, J.-L. Zuo, L. Jin, Y. Sun, P. Zheng, Y. Cao, F. Lissel, C. Linder, X.-Z. You and Z. Bao, A highly stretchable autonomous self-healing elastomer, Nat. Chem., 2016, 8, 618-624.

[112] L. Liu, S. Liang, Y. Huang, C. Hu and J. Yang, A stretchable polysiloxane elastomer with self-healing capacity at room temperature and solvatochromic properties, Chem. Commun., 2017, 53, 12088-12091.

[113] A. Chao, I. Negulescu and D. Zhang, Dynamic Covalent Polymer Networks Based on Degenerative Imine Bond Exchange: Tuning the Malleability and Self-Healing Properties by Solvent, Macromolecules, 2016, 49, 6277-6284.

[114] F. Garci'a, J. Pelss, H. Zuilhof and M. M. J. Smulders, Multiresponsive coordination polymers utilising metal-stabilised, dynamic covalent imine bonds, Chem. Commun., 2016, 52, 9059-9062.

[115] H. Liu, H. Zhang, H. Wang, X. Huang, G. Huang and J. Wu, Weldable, malleable and programmable epoxy vitrimers with high mechanical properties and water insensitivity, Chem. Eng. J., 2019, 368, 61-70.

[116] R. K. Pan, J. L. Song, G. B. Li, S. Q. Lin, S. G. Liu and G. Z. Yang, Copper(II), cobalt(II) and zinc(II) complexes based on a tridentate bis(benzimidazole)pyridine ligand: synthesis, crystal structures, electrochemical properties and antitumour activities, Transition Met. Chem., 2017, 42, 253-262.

[117] K. Yamaguchi, S. Kume, K. Namiki, M. Murata, N. Tamai and H. Nishihara, UV-Vis, NMR, and time-resolved spectroscopy analysis of photoisomerization behavior of three- and sixazobenzene-bound tris(bipyridine)cobalt complexes, Inorg. Chem., 2005, 44, 9056-9067.

[118] D. E. Przybyla and J. Chmielewski, Metal-triggered collagen peptide disk formation, J. Am. Chem. Soc., 2010, 132, 7866-7867.

[119] A. F. Wells, Structural Inorganic Chemistry, Clarendon Press, Oxford, 5th edn, 1984, p. 1288.

[120] R. D. Shannon, Revised Effective Ionic Radii and Systematic Studies of Interatomie Distances in Halides and Chalcogenides, Acta Crystallogr., 1976, A32, 751-767.

[121] J. Cui, F. M. Nie, J. X. Yang, L. Pan, Z. Ma and Y. S. Li, Novel imidazolium-based poly(ionic liquid)s with different counterions for self-healing, J. Mater. Chem. A, 2017, 5, 25220-25229.

[122] M. L. Tong and X. M. Chen, Synthesis of Coordination Compounds and Coordination Polymers, Synthesis of Coordination Compounds and Coordination Polymers, Elsevier B. V., 2017.

[123] J. Pignanelli, K. Schlingman, T. B. Carmichael, S. Rondeau-Gagne' and M. J. Ahamed, A Comparative Analysis of Capacitive-Based Flexible PDMS Pressure Sensors, Sens. Actuators, A, 2019, 285, 427-436.

[124] Y. Wang, J. He, S. Aktas, S. A. Sukhishvili and D. M. Kalyon, Rheological behavior and self-healing of hydrogen-bonded complexes of a triblock Pluronics copolymer with a weak polyacid, J. Rheol., 2017, 61, 1103-1119.

The entire contents of all references noted herein are incorporated herein by reference.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A polymer composition comprising a central atom or ion and a polymer having a main chain and one or more terminal moieties coupled to the main chain, wherein said one or more terminal moieties are selected to operate as ligands to form a coordination complex with the central atom or ion, each said terminal moiety having structural formula (II):

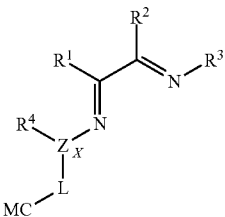

wherein MC is the main chain, L is alkylene selected from the group consisting of methylene, ethylene, n-propylene, isopropylene and butylene, Z is a carbon atom or a nitrogen atom, X is 0 or 1, and $R^1$ to $R^4$ are independently of each other hydrogen, halo, hydroxyl, amino, alkoxy, alkyl, alkenyl, alkynyl, cycloalkyl, heterocycloalkyl, aryl, aralkyl, heteroaryl, heteroaralkyl, carbonyl, carboxyl or cyano, each of which is optionally substituted, wherein $R^1$ and $R^2$, together with the carbon atoms bonded thereto, $R^2$ and $R^3$, together with the carbon atom and the nitrogen atom bonded thereto, and/or $R^1$ and $R^4$, together with the carbon atom and the nitrogen atom bonded thereto, may form unsubstituted or substituted cycloalkyl, heterocycloalkyl, aryl or heteroaryl, and wherein if X is 0, then $R^4$ is absent.

2. The polymer composition of claim 1, wherein the central atom or ion comprises a transition metal selected from the group consisting of $Mn^{2+}$, $Fe^{2+}$, $Fe^{3+}$, $Co^{2+}$, $Co^{3+}$, $Ni^{2+}$, $Cu^{1+}$, $Cu^{2+}$ and $Zn^{2+}$, or the transition metal is $Fe^{2+}$, $Zn^{2+}$ or $Co^{2+}$.

3. The polymer composition of claim 1, wherein the main chain comprises low-density polyethylene (LDPE), high-density polyethylene (HDPE), polypropylene (PP), polyvinyl chloride (PVC), polystyrene (PS), polytetrafluoroethylene (PTFE), polychlorotrifluoroethylene (PCTFE), polyurethane, polyethylene terephthalate, polyamide, polyacrylonitrile, polyimide, nylon, polyacrylamide, polyphenylene, polythiophene, polysaccharide, polyglycol, polysiloxane or a combination thereof.

4. The polymer composition of claim 1, wherein the main chain comprises polysiloxane of the chemical formula —O—[$R_2SiO$]$_n$—, wherein n is between 3 and 10,000, inclusive, and R is alkyl, alkenyl, alkynyl, aryl, alkoxy, halo or heteroaryl, each of which is optionally substituted.

5. The polymer composition of claim 1, wherein the main chain comprises polydimethylsiloxane (PDMS) having a molecular weight between about 300 and about 3000 Da.

6. The polymer composition of claim 1, wherein the polymer comprises two said terminal moieties coupled to opposing ends of the main chain.

7. The polymer composition of claim 1, wherein Z is a carbon atom, X is 1, and $R^1$ and $R^2$, together with the carbon atoms bonded thereto, $R^2$ and $R^3$, together with the carbon atom and the nitrogen atom bonded thereto, and/or $R^1$ and $R^4$, together with the carbon atom and the nitrogen atom bonded thereto, form unsubstituted or substituted aryl or heteroaryl.

8. The polymer composition of claim 1, wherein X is 0, $R^1$ is hydrogen, halo, hydroxyl, amino, alkoxy, alkyl, alkenyl, alkynyl, cycloalkyl, heterocycloalkyl, aryl, aralkyl, heteroaryl, heteroaralkyl, carbonyl, carboxyl or cyano, and $R^2$ and $R^3$, together with the carbon atom and the nitrogen atom bonded thereto, form unsubstituted or substituted heteroaryl.

9. The polymer composition of claim 1, wherein the terminal moiety comprises one of the following structural formulas:

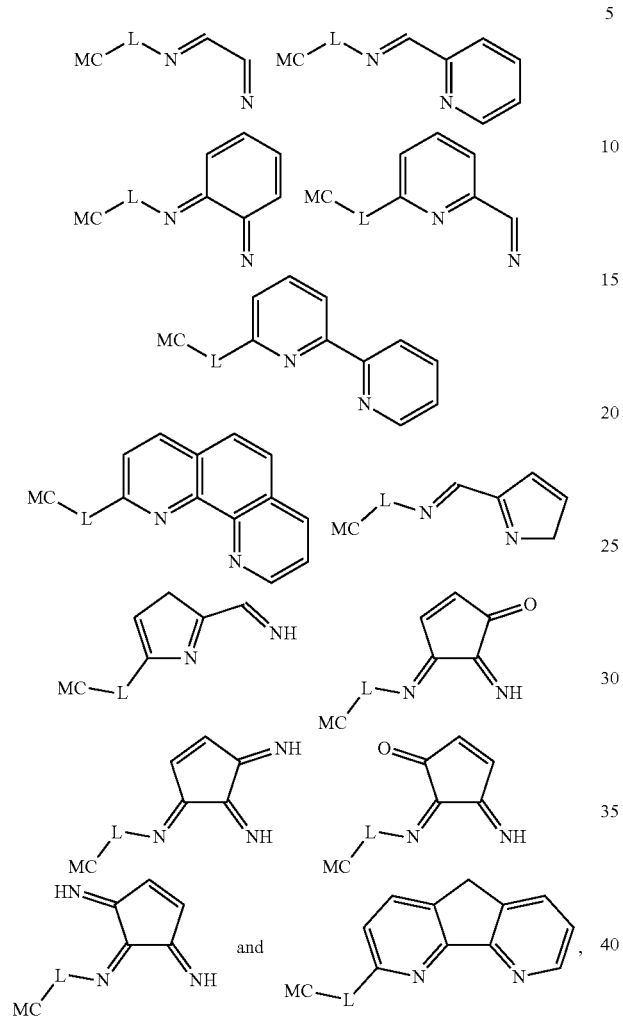

wherein one or more of the carbon atoms and the nitrogen atoms in the structural formulas are optionally substituted.

10. The polymer composition of claim 1, wherein the coordination complex has a geometry selected from the group consisting of tetrahedral, square planar, trigonal bipyramidal and octahedral.

11. The polymer composition of claim 1, wherein the coordination complex is formed with the terminal moieties of two or three of said polymers, and wherein each said terminal moiety is a bidentate ligand.

12. The polymer composition of claim 1, wherein the polymer comprises structural formula (III):

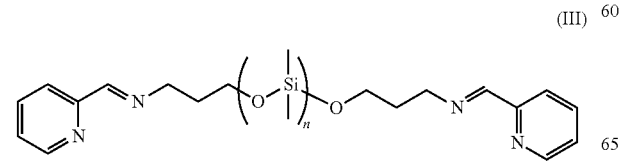

(III)

wherein n is 20 to 30.

13. The polymer composition of claim 1, wherein the coordination complex comprises structural formula (IV):

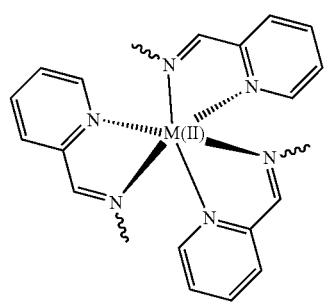

wherein M(II) is the central atom or ion, the central atom or ion being $Fe^{2+}$, $Zn^{2+}$ or $Co^{2+}$, and a wavy line represents MC, L and Z.

14. The polymer composition of claim 1, wherein the polymer composition is self-healing.

15. The polymer composition of claim 1, wherein the polymer composition is prepared by contacting the polymer and a compound comprising the central atom or ion and a counterion, wherein the central atom or ion is $Fe^{2+}$, $Zn^{2+}$ or $Co^{2+}$, and the conunterion is tetrafluoroborate, perchlorate or trifluoromethanesulfonate.

16. A method of preparing a self-healing polymer composition, the method comprising contacting a polymer and a central atom or ion, the polymer having a main chain and a plurality of terminal moieties coupled to the main chain, and forming a coordination complex with the central atom or ion and said terminal moieties operating as ligands, wherein each said terminal moiety has one of the following structural formulas:

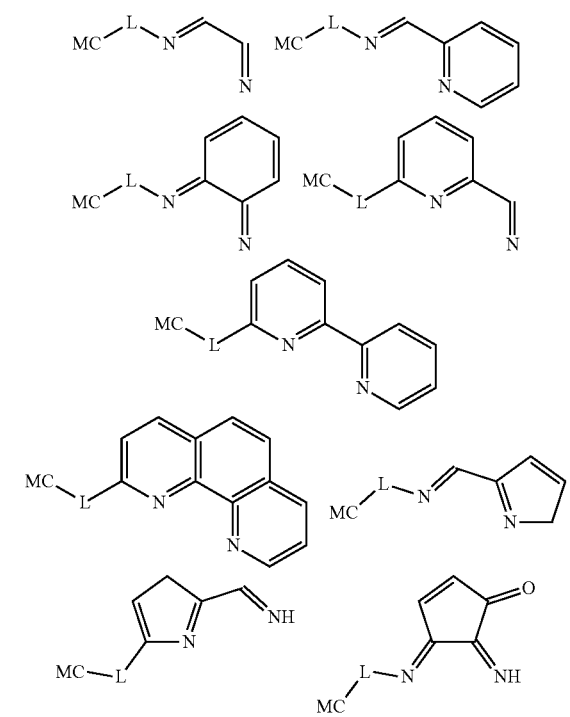

-continued

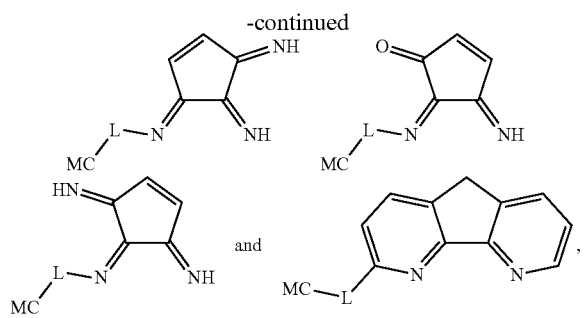

wherein MC is the main chain, L is a bond or a linker selected from the group consisting of methylene, ethylene, n-propylene, isopropylene and butylene, and one or more of the carbon atoms and the nitrogen atoms in the structural formulas are optionally substituted.

17. The method of claim 16, wherein said contacting comprises contacting the polymer with a compound having the central atom or ion and a counterion, wherein the central atom or ion comprises a transition metal selected from the group consisting of $Fe^{2+}$, $Zn^{2+}$ or $Co^{2+}$.

18. The method of claim 17, wherein the counterion is tetrafluoroborate, perchlorate or trifluoromethanesulfonate.

19. The use method of claim 16, wherein the main chain comprises polysiloxane of the chemical formula —O—[$R_2SiO$]$_n$—, wherein n is between 3 and 10,000, inclusive, and R is alkyl, alkenyl, alkynyl, aryl, alkoxy, halo or heteroaryl, each of which is optionally substituted.

20. The method of claim 16, wherein the coordination complex has a geometry selected from the group consisting of tetrahedral, square planar and octahedral, and the coordination complex is formed with the terminal moieties of two or three of said polymers, each said terminal moiety being a bidentate ligand.

21. The method of claim 16, wherein the polymer comprises structural formula (III):

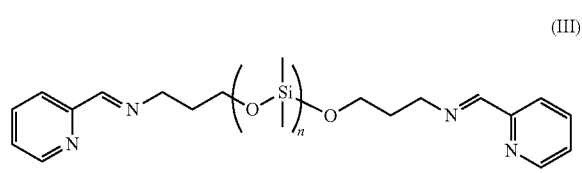

(III)

wherein n is 20 to 30.

22. The method of claim 16, wherein the coordination complex comprises structural formula (IV):

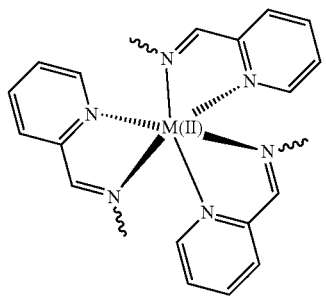

(IV)

wherein M(II) is the central atom or ion, the central atom or ion being $Fe^{2+}$, $Zn^{2+}$ or $Co^{2+}$, and a wavy line represents MC, L and Z.

* * * * *